US011790403B2

(12) United States Patent
Garden et al.

(10) Patent No.: US 11,790,403 B2
(45) Date of Patent: Oct. 17, 2023

(54) VEHICLE WITH CONTEXT SENSITIVE INFORMATION PRESENTATION

(71) Applicant: Zume Inc., Mountain View, CA (US)

(72) Inventors: Alexander John Garden, Tiburon, CA (US); Joshua Gouled Goldberg, San Bruno, CA (US)

(73) Assignee: Congruens Group, LLC, San Carlos, CA (US)

( * ) Notice: Subject to any disclaimer, the term of this patent is extended or adjusted under 35 U.S.C. 154(b) by 117 days.

(21) Appl. No.: 16/677,468

(22) Filed: Nov. 7, 2019

(65) Prior Publication Data

US 2020/0090226 A1 Mar. 19, 2020

Related U.S. Application Data

(63) Continuation-in-part of application No. 16/611,784, filed as application No. PCT/US2018/037537 on Jun. 14, 2018.

(Continued)

(51) Int. Cl.
*G06Q 30/02* (2023.01)
*G06Q 30/0251* (2023.01)
(Continued)

(52) U.S. Cl.
CPC ..... *G06Q 30/0266* (2013.01); *G06Q 30/0252* (2013.01); *G06V 20/56* (2022.01);
(Continued)

(58) Field of Classification Search
CPC ........... G06Q 30/0266; G06Q 30/0252; G06K 9/00362; G06K 9/00791; G06F 13/22
See application file for complete search history.

(56) References Cited

U.S. PATENT DOCUMENTS

| 4,632,836 A | 12/1986 | Abbott |
| 5,493,294 A | 2/1996 | Morita |

(Continued)

FOREIGN PATENT DOCUMENTS

| CN | 105556562 | 5/2016 |
| JP | 4741267 | 8/2011 |

(Continued)

OTHER PUBLICATIONS

Minnesota Health Department, "Keep Your Food at the Appropriate Temperatures", health.state.mn.us/cook/temperature (Year: 2022).*

(Continued)

*Primary Examiner* — Scott C Anderson
(74) *Attorney, Agent, or Firm* — Merchant and Gould, PC

(57) ABSTRACT

Technologies are generally described for context sensitive display of information on a consumable delivery vehicle with en route preparation. An on-board controller may receive different sets of sensor data associated with time, location, temperature, humidity, captured images, and/or captured audio from sensors on the vehicle or at a destination location. The sensor data may be analyzed/processed at the on-board controller or by a remote control system and instructions may be generated for display of context sensitive information based on received sensor data and/or processed sensor data. One or more displays on the vehicle may display images are associated with a branding, a menu, a pricing, and/or an advertisement based on the generated instructions.

23 Claims, 30 Drawing Sheets

Related U.S. Application Data

(60) Provisional application No. 62/757,413, filed on Nov. 8, 2018, provisional application No. 62/633,456, filed on Feb. 21, 2018, provisional application No. 62/628,390, filed on Feb. 9, 2018, provisional application No. 62/522,583, filed on Jun. 20, 2017.

(51) Int. Cl.
  *G09F 13/22* (2006.01)
  *G06V 20/56* (2022.01)
  *G06V 40/10* (2022.01)

(52) U.S. Cl.
  CPC .............. *G06V 40/10* (2022.01); *G09F 13/22* (2013.01); *G09F 2013/227* (2013.01)

(56) References Cited

U.S. PATENT DOCUMENTS

| | | | |
|---|---|---|---|
| 8,126,938 | B2 | 2/2012 | Cohen |
| 8,732,087 | B2 | 5/2014 | Cohen |
| 8,860,587 | B2 | 10/2014 | Nordstrom |
| 9,292,889 | B2 | 3/2016 | Garden |
| 10,019,143 | B1 | 7/2018 | Haitani et al. |
| 10,140,587 | B2 | 11/2018 | Garden |
| 2004/0192351 | A1 | 9/2004 | Duncan |
| 2006/0111838 | A1 | 5/2006 | Hughes |
| 2008/0201215 | A1 | 8/2008 | Lin |
| 2009/0146846 | A1 | 6/2009 | Grossman |
| 2010/0063885 | A1 | 3/2010 | Merkin et al. |
| 2010/0179878 | A1 | 7/2010 | Dawson |
| 2012/0303458 | A1 | 11/2012 | Schuler, Jr. |
| 2013/0125571 | A1* | 5/2013 | Goode .................... F25D 23/12 62/426 |
| 2013/0232029 | A1 | 9/2013 | Rovik et al. |
| 2013/0282438 | A1* | 10/2013 | Hunter ............... G06Q 30/0201 705/7.32 |
| 2014/0370167 | A1 | 12/2014 | Garden |
| 2015/0025975 | A1* | 1/2015 | Wallach ............. G06Q 30/0266 705/14.63 |
| 2015/0161446 | A1 | 6/2015 | Kirkpatrick |
| 2015/0283939 | A1 | 10/2015 | Parkes et al. |
| 2016/0063435 | A1 | 3/2016 | Shah |
| 2016/0277999 | A1* | 9/2016 | Graves .................. H04L 67/563 |
| 2016/0364679 | A1* | 12/2016 | Cao ........................ G06Q 50/30 |
| 2017/0025921 | A1* | 1/2017 | Kirker ...................... F16D 1/10 |
| 2017/0115009 | A1 | 4/2017 | Ramphos et al. |
| 2017/0146361 | A1 | 5/2017 | Lucas et al. |
| 2017/0178072 | A1 | 6/2017 | Poomachandran |
| 2017/0275077 | A1 | 9/2017 | Chiang et al. |
| 2017/0290345 | A1 | 10/2017 | Garden et al. |
| 2018/0032997 | A1* | 2/2018 | Gordon ............. G06Q 30/0269 |
| 2018/0071939 | A1 | 3/2018 | Garden et al. |
| 2018/0322413 | A1* | 11/2018 | Yocam .................. G07C 5/085 |
| 2018/0328591 | A1 | 11/2018 | Eggers |
| 2019/0188640 | A1 | 6/2019 | Yamaguchi et al. |
| 2020/0070717 | A1 | 3/2020 | Garden |
| 2021/0097905 | A1 | 4/2021 | Garden |

FOREIGN PATENT DOCUMENTS

| | | |
|---|---|---|
| TW | 201303784 | 1/2013 |
| TW | 201351313 | 12/2013 |
| WO | 2014026273 A1 | 2/2014 |
| WO | 2014205041 A1 | 12/2014 |
| WO | 2017165415 A1 | 9/2017 |
| WO | 2017177041 A2 | 10/2017 |
| WO | 2018052842 A1 | 3/2018 |

OTHER PUBLICATIONS

Minnesota Health Department, "Time/Temperature Control for Food Safety", health.state.mn.us/docs/tcsfoods (Year: 2022).*
International Search Report and Written Opinion for International Application No. PCT/US2018/037537 dated Oct. 1, 2018, pp. 40.
European Search Report in Application 18820444.0, dated Oct. 26, 2020, 9 pages.
Indian Exam Report in Application 201917048482, dated Dec. 28, 2020, 7 pages.
PCT International Preliminary Report on Patentability in Application PCT/US2018/037537, dated Jan. 2, 2020, 42 pages.
Taiwanese Exam Report and Search Report in Application 107120483, dated Sep. 6, 2021, 9 pages.
American Planning Association, PAS Essential Info Packet, PAS EIP-36, Regulating FoodTrucks, Nov. 2015, 353 pages.

* cited by examiner

| STEAK SANDWICH | $15 |
|---|---|
| PASTA CARBONARA | $12 |
| BBQ RIBS | $18 |
| ROASTED POTATOES | $8 |
| CAESAR SALAD | $9 |
| SAN PELLEGRINO | $4 |
| DRAFT BEER | $8 |
| MERLOT | $9 |
| CHARDONNAY | $9 |
| WATER | $4 |

| HOT DOG | $5 |
|---|---|
| HAMBURGER | $7 |
| PIZZA | $5 |
| FRENCH FRIES | $3 |
| POTATO CHIPS | $3 |
| POTATO SALAD | $3 |
| PEPSI | $2 |
| DR. PEPPER | $2 |
| COKE | $2 |
| WATER | $2 |

| ROAST BEEF SANDWICH | $9 |
|---|---|
| TURKEY SANDWICH | $8 |
| PASTRAMI SANDWICH | $8 |
| COLE SLAW | $4 |
| MIXED RELISH | $4 |
| GARDEN SALAD | $4 |
| SNAPPLE | $3 |
| MILK SHAKE | $4 |
| LEMONADE | $3 |
| WATER | $3 |

VEHICLE WITH CONTEXT SENSITIVE INFORMATION PRESENTATION

CROSS-REFERENCE TO RELATED APPLICATIONS

This application is a continuation-in-part (CIP) under 35 U.S.C. 120 of co-pending U.S. patent application Ser. No. 16/611,784 filed on Nov. 7, 2019, which is the national phase filing of the PCT Application No. PCT/US18/37537 filed on Jun. 14, 2018 by the same inventors, commonly assigned herewith. This application also claims priority under 35 U.S.C. 119(e) to U.S. Provisional Patent Application Ser. No. 62/757,413 filed on Nov. 8, 2018 by the same inventors, commonly assigned herewith. Therefore, the foregoing applications are herein incorporated by reference in their entireties.

TECHNICAL FIELD

This description generally relates to consumable delivery vehicles, in particular, vehicles, components, and methods for presenting context sensitive information in conjunction with consumable delivery.

BACKGROUND

Vehicles have long been used to sell goods directly to consumers. In some instances, these vehicles have sold reusable goods, e.g., pots and pans, while in other instance these vehicles have sold perishable goods, e.g., fruit, vegetables, and prepared foods. Vehicles commonly used to sell prepared foods, extend from the familiar ice cream vendor's truck, the "canteen trucks" that are common at job worksites, to the increasingly popular "food trucks" that are becoming ubiquitous in urban areas.

Historically, vehicles have be customized and relegated to selling a single genre of items. For example, ice cream vendor's trucks typically included a freezer and carried prepared foods (i.e., foods prepared prior to initial transit of the vehicle to the place where those same foods would be sold). Canteen trucks typically include refrigerators, possibly micro-wave ovens, and often carry prepared foods. Food trucks typically include relatively complete kitchens including a freezer, a refrigerator, as well as cooking appliances for example stove with burners, oven, deep fryer, micro-wave oven, and/or sous vide heater. Yet even food trucks tend to be limited to a single genre or cuisine of food (e.g., Mexican, Italian, Thai, German, Cajun/Creole).

BRIEF SUMMARY

According to some examples, a consumable delivery vehicle with en route preparation is described. The vehicle may include a body that includes at least one exterior surface, a display visible from an exterior of the vehicle, one or more sensors, and a controller communicatively coupled to the display and the one or more sensors. The controller may be configured to receive a first set of sensor data and a second set of sensor data from the one or more sensors, cause the display to present a generic set of images and a first set of images based on the first set of sensor data, and cause the display to present the generic set of images and a second set of images based on the second set of sensor data.

According to other examples, the first set of sensor data and the second set of sensor data may be received at one or more of different times or different vehicle locations. The controller may also process the first set of sensor data and the second set of sensor data, and cause the display to present the generic set of images and the first set of images or the second set of images based on the processed first set of sensor data or second set of sensor data.

According to further examples, a method to display information on a consumable delivery vehicle with en route preparation is described. The method may include receiving, at a controller, a first set of sensor data and a second set of sensor data from one or more sensors associated with the vehicle; causing, by the controller, a display visible from an exterior of the vehicle to present a generic set of images and a first set of images based on the first set of sensor data as the vehicle approaches or is at a delivery destination; and causing, by the controller, the display visible from the exterior of the vehicle to present the generic set of images and a second set of images based on the second set of sensor data as the vehicle approaches or is at the delivery destination.

According to yet other examples, the first set of sensor data and the second set of sensor data may include one or more of time, location, temperature, or humidity. The method may also include processing the first set of sensor data and the second set of sensor data; and causing the display to present the first set of images and the second set of images based on the processed first set of sensor data and the processed second set of sensor data.

According to some examples, a consumable delivery system, which may include a remote control system configured to manage routing, en route consumable preparation, and information display of a consumable delivery vehicle; and the consumable delivery vehicle. The delivery vehicle may include a body that includes at least one exterior surface, where an interior of the vehicle is equipped with one or more consumable preparation devices and one or more consumable preparation surfaces; a display visible from an exterior of the vehicle; one or more sensors; a communication system wirelessly coupled to the remote control system; and an on-board controller communicatively coupled to the display, the communication system, and the one or more sensors. The controller may be configured to receive a first set of sensor data and a second set of sensor data from the one or more sensors at one or more of different times or different vehicle locations; transmit the first set of sensor data and the second set of sensor data to the remote control system; receive instructions from the remote control system; cause the display to present a generic set of images and a first set of images based on a first set of instructions; and cause the display to present the generic set of images and a second set of images based on a second set of instructions, where the first set of instructions are generated by the remote control system based on the first set of sensor data and the second set of instructions are generated by the remote control system based on the second set of sensor data.

According to other examples, the remote control system may also process the first set of sensor data and the second set of sensor data; generate the first set of instructions based on the first set of sensor data or the processed first set of sensor data; and generate the second set of instructions based on the second set of sensor data or the processed second set of sensor data.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 9A is a front view of a display screen presenting a first set of images in the form of a first menu, according to at least one illustrated implementation.

FIG. 9B is a front view of a display screen presenting a second set of images in the form of a second menu, according to at least one illustrated implementation.

DETAILED DESCRIPTION

Figure 1A:
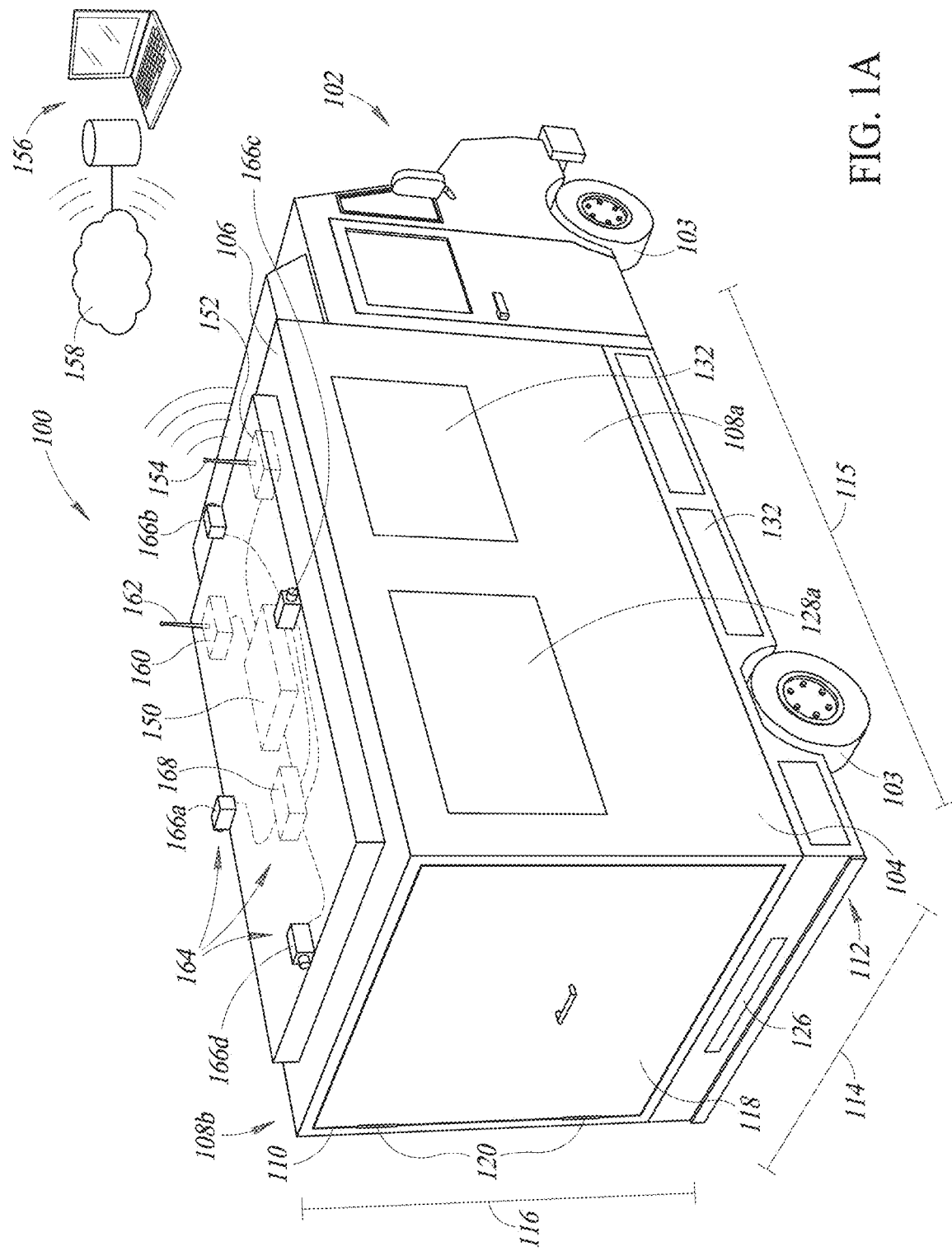
FIG. 1A is an isometric exterior view of a vehicle having updateable signage, the vehicle which may, for example, take the form of a food truck used to prepare and sell food (e.g., hot food and beverages) at one or more locations, according to at least one illustrated implementation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, certain structures associated with food preparation devices such as ovens, skillets, and other similar devices, closed-loop controllers used to control cooking conditions, food preparation techniques, wired and wireless communications protocols, wired and wireless transceivers, radios, communications ports, geolocation, and optimized route mapping algorithms have not been shown or described in detail to avoid unnecessarily obscuring descriptions of the embodiments. In other instances, certain structures associated with conveyors, robots, and/or vehicles have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

As used herein the terms "food item" and "food product" refer to any item or product intended for human consumption. Although illustrated and described herein in the context of pizza to provide a readily comprehensible and easily understood description of one illustrative embodiment, one of ordinary skill in the culinary arts and food preparation will readily appreciate the broad applicability of the systems, methods, and apparatuses described herein across any number of prepared food items or products, including cooked and uncooked food items or products, including beverages, and ingredients or components of food items and products.

As used herein the term "cooking unit" refers to any device, system, or combination of systems and devices useful in cooking or heating of a food product. While such preparation may include the heating of food products during preparation, such preparation may also include the partial or complete cooking of one or more food products. Additionally, while the term "oven" may be used interchangeably with the term "cooking unit" herein, such usage should not limit the applicability of the systems and methods described herein to only foods which can be prepared in an oven. For example, one or more burners, either gas or electric or inductive, a hot skillet surface or griddle, a deep fryer, a microwave oven, toaster, immersion heater, sous vide heater, and/or rice maker can be considered a "cooking unit" that is included within the scope of the systems, methods, and apparatuses described herein. Further, the cooking unit may be able to control more than temperature. For example, some cooking units may control pressure and/or humidity. Further, some cooking units may control airflow therein, thus able to operate in a convective cooking mode if desired, for instance to decrease cooking time.

As used herein the term "vehicle" refers to any car, truck, van, or any other vehicle that can be used in preparation, cooking, heating, sale and/or delivery of a food item to a customer. The size and shape of the vehicle may depend in part on licensing requirements of the locality in which the vehicle is intended to operate. In some instances, the size and shape of the vehicle may depend on the street layout and the surrounding environment of the locality in which the vehicle is intended to operate. For example, small, tight city streets may require a vehicle that is comparatively shorter and/or narrower than a vehicle that can safely and conveniently navigate larger, suburban thoroughfares.

It can be expensive to outfit a vehicle for preparation, sale, and/or deliver of items, for instance food trucks for the preparation, sale and delivery of food (including beverages). Typically, those vehicles are outfitted for a specific role, for instance preparation, sale and/or delivery of a particular cuisine. This limits the ability to maximize the investment made in the vehicle. Furthermore, conventional food trucks may have signage. However, such signage is typically static or does not dynamically change based on contextual information, such as the age, cultural background, numbers, etc. of persons in the vicinity of the food truck, or the area of the food truck to which they direct their attention.

Briefly stated, technologies are generally described for context sensitive display of information on a consumable delivery vehicle with en route preparation. An on-board controller may receive different sets of sensor data associated with time, location, temperature, humidity, captured images, and/or captured audio from sensors on the vehicle or at a destination location. The sensor data may be analyzed/processed at the on-board controller or by a remote control system and instructions may be generated for display of context sensitive information based on received sensor data and/or processed sensor data. One or more displays on the vehicle may display images are associated with a branding, a menu, a pricing, and/or an advertisement based on the generated instructions.

The processed sensor data used in determining type and content of the displayed information may include a detected language, a detected accent, a number of people in a vicinity of the vehicle, an estimated age of the people in the vicinity of the vehicle, an estimated size of the people in the vicinity of the vehicle, an ethnicity of the people in the vicinity of the vehicle, a gender of the people in the vicinity of the vehicle, a focus of a gaze of one or more people in the vicinity of the vehicle, and/or a mood of the people in the vicinity of the vehicle. The raw sensor information, which may also be used to determine the type and content of the displayed information may include time, location, temperature, humidity, wind levels, and/or noise levels at the destination location.

Figure 1B:
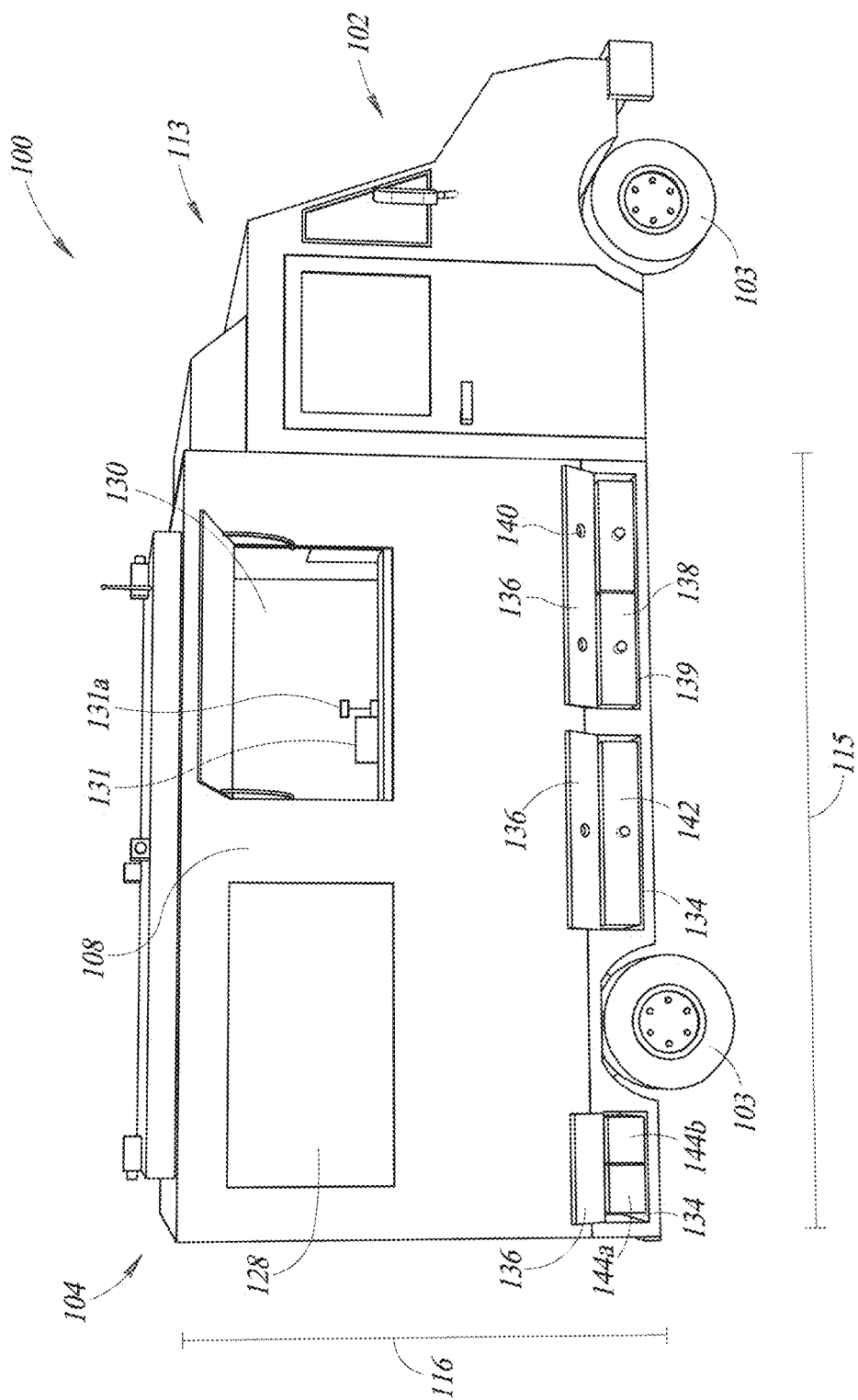
FIG. 1B is a right side elevational view of the vehicle of FIG. 1A, according to at least one illustrated implementation.
Figure 1C:
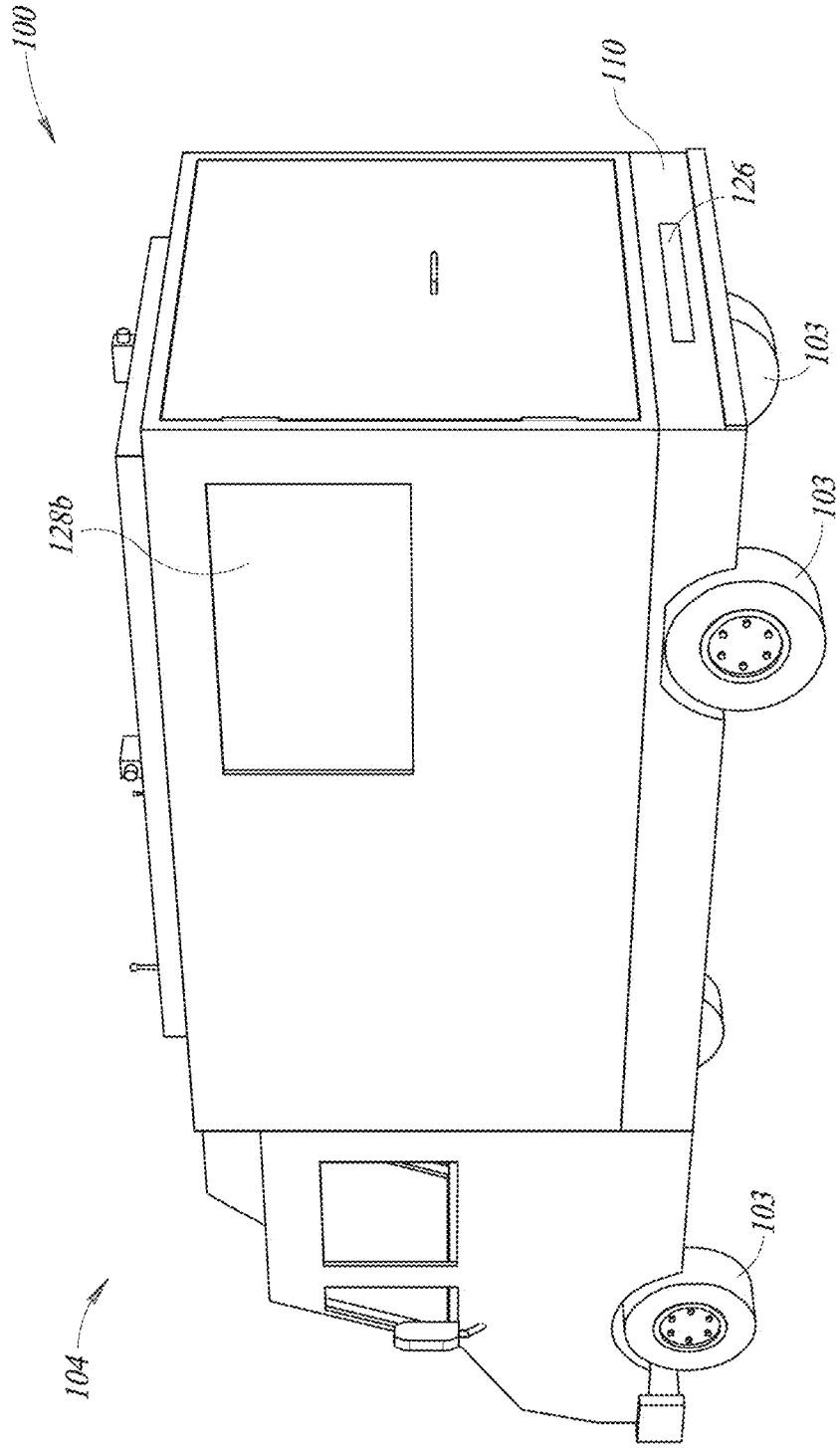
FIG. 1C is a left side elevational view of the vehicle of FIG. 1A, according to at least one illustrated implementation.

FIGS. 1A, 1B and 1C show a vehicle 100 that includes a cab portion 102 and a cargo portion 104, according to at least one illustrated implementation. The vehicle 100 may, for example, take the form of a wheeled vehicle, and thus include one or more wheels 103 that are in contact with the ground and support the vehicle 100 in a position above the ground.

The cab portion 102 typically includes one or more seats for a driver and passenger(s). While not illustrated, the cargo portion 104 of the vehicle 100 may have various types of equipment installed and supplies stocked or loaded therein.

The cargo portion 104 may include a top side 106, a left exterior side wall 108a and a right exterior side wall 108b (collectively exterior side walls 108), a back wall 110, and a bottom side 112. The cargo portion 104 may have a width 114, a length 115, and a height 116. The dimensions of the width 114, length 115, and height 116 of the cargo portion 104 may be based on local or state ordinances regarding delivery, such as, for example, local or state ordinances governing food delivery vehicles. In some implementations, the dimensions of the width 114, length 115, and height 116 of the cargo portion 104 may be smaller than the maximum dimensions allowed by local or state ordinances. Smaller cargo portions 104 may be advantageous, for example, when the vehicle 100 is to travel in or through neighborhoods or areas with narrow roads and/or tight turns.

The back wall 110 may include one or more loading doors 118 that are sized and dimensioned to provide access to a cargo area (discussed below) enclosed within the cargo portion 104 of the vehicle 100. In some implementations, the loading door(s) 118 may be a single door that stretches substantially across the width 114 along the back wall 110. In such an implementation, the loading door 118 may include a single set of hinges 120 that may physically and rotationally couple the loading doors 118 to the vehicle 100, and be used to open the loading door 118. In some implementations, the loading door 118 may comprise multiple doors, such as a set of double doors, that together stretch substantially across the width 114 along the back wall 110. In such an implementation, each door may be physically and rotationally coupled to the cargo portion 104 of the vehicle 100 by a respective set of hinges.

The cargo portion may further optionally include a ramp 126 that may be selectively deployed when the vehicle 100 is in a stationary, parked position to stretch from a ground-level location behind the back wall 110 of the vehicle 100 to the cargo area towards the bottom side 112 of the cargo portion 104. The ramp 126 may be used to roll supplies, equipment, or other material into and out of the cargo area. When not deployed, the ramp 126 may be stowed within a cavity proximate the bottom side 112 of the cargo portion 104.

One or both of the exterior side walls 108 may include a display or monitor 128a, 128b (only two shown, collectively 128) oriented to present display images, e.g., video images, viewable as signage from the exterior of the vehicle 100. The display or monitor 128 may be any type of display screen or monitor, such as, for example, a thin profile liquid crystal display (LCD), organic liquid crystal display (OLED), polymer liquid crystal display (PLED), plasma display panel (PDP), an electroluminescent display (ELD), or, even more advantageously an electronic paper (e-paper, e-ink) display which consumer little energy and is general easily read even in bright outdoor light. The display or monitor 128 may display any type of programming, including still images or moving images. In some implementations, such display or monitor 128 may provide advertisements and/or a menu for the products being sold by the vehicle 100. In some implementations, the display on the display or monitor 128 may progressively or randomly provide different displays (e.g., iterating through portions of a given menu) for defined periods of time. The content presented via the display 128 may be controlled manually by an operator of the vehicle and/or controlled automatically or autonomously via a control system or controller, for example as described elsewhere herein. In some implementations, for instance, display 128 may be controlled dynamically to position graphics or video responsive to input from a processing system, such as control system 150, as set forth below.

One or both of the exterior side walls 108 may include a service window 130 that may be used to take order and/or deliver items (e.g., a hot, prepared food item, for instance a pizza, salads, beverages), that have been packaged for delivery. The service window 130 may be sized, dimensioned, and located to facilitate transactions between customers and operators of the vehicle 100 and/or robots thereof. A cover 132 may be moveable from a closed position (FIG. 1A) in which access between an exterior and an interior of the vehicle 100 is prevented, to an open position (FIG. 1B) which allows access between the exterior and the interior of the vehicle 100. The location of the service window 130 may be modified based upon the layout of equipment within the cargo area. The lower edge of the service window 130 may be about four and one-half to five and one-half feet above the ground. The service window 130 may be about four feet high, and between three feet to seven feet wide.

The service window 130 may be aligned with a counter and/or payment system (cash register, card reader, point-of-sale (POS) terminal, etc.) 131 (FIG. 1B) that may be controlled by an operator of the vehicle 100. A POS terminal 131 may include a wireless access point 131a, which allows orders to be placed and paid for by a customer via a mobile device (e.g., smartphone, tablet computer). This may allow of customer to place and pay for an order before arriving at the vehicle 100, so freshly prepared food is ready on the customer's arrival. This may also allow the customer to pick up and order with minimal or even no human interaction with a server, cook or other human. The service window 130 may be conveniently located at or close to the end of a food preparation assembly line or area at which hot, prepared food will be placed to be sold or conveyed to customers. The service window 130 may be used to take orders and/or deliver items (e.g., food items) after the food item has been prepared within the cargo area.

The cargo portion 104 of the vehicle 100 may include one or more compartments 134 that are covered by one or more access covers 136. The access covers 136 may selectively, removably and/or rotationally couple to one of the exterior side walls 108 of the vehicle 100 to selectively provide access to the respective compartment 134, for instance from an exterior of the vehicle 100. Each access cover 136 may be sized and dimensioned to completely cover the corresponding compartment 134. Each access cover may be physically coupled to the exterior side wall 108 of the cargo portion 104 via one or more of hinges, hooks, fasteners, locks, locking devices, latches, or other devices or mechanisms that may be used to secure a panel to wall or other vertical surface to cover an aperture.

The compartments 134 may be used to store various tanks of liquids or gases that may be used to prepare and serve food items. For example, the compartments 134 may store a potable water tank 138 that carries potable water, a waste fluid tank 140 that carries waste fluids, and a pressurized gas tank 142 that may hold a supply of pressurized gas (e.g., air, nitrogen, carbon dioxide).

The water tank 138 may carry a supply of potable water for use during food preparation operations. The potable water tank 138 may carry, for example, up to 40 gallons of potable water. The waste fluid tank 140 may carry the waste fluids that are generated during food preparation or other operations. The waste fluid tank 140 may be at least as large as the potable water tank 138. In some implementations, the waste fluid tank 140 may be larger, such as, for example, 10%, 15%, or 20% larger in volume than the potable water tank 138. In some situations, local or state ordinances may specify the absolute and/or relative sizes of the potable water tank 138 and the waste fluid tank 140.

One or more pressurized gas tanks 142 may carry a supply of pressurized gas (e.g., air, nitrogen, carbon dioxide) for use during food preparation operations. Air in the pressurized gas tank 142 may be comprised of air similar to that in the regular environment, although stored at a pressure that is higher than 1 atmosphere. In some implementations, the gas in the pressurized gas tank 142 may be comprised of a stable, inert, non-combustible gas, such nitrogen. In some implementations, the gas in the pressurized gas tank 142 may be comprised of carbon dioxide. In some implementations, the pressurized gas tank 142 may have a volume of 10 gallons, 15 gallons, or more. Additionally or alternatively, the vehicle 100 may include one or more compressors, operable to selectively supply a flow of a pressurized gas, either from the ambient environment (e.g., air) or from a tank that stores the gas (e.g., nitrogen, carbon dioxide).

One or more of the compartments 134 may be used to house a power supply 144, for example a battery, electrical power generator, or other energy storage/generation component. The power supply 144 may provide power to the systems in the vehicle 100 in general, as well as to the devices, robots, and other electrical equipment used to prepare food during food preparation operations. The power supplies 144 (two shown, a power generator 144a and power storage 144b, collectively power supplies 144) may be electrically coupled to one or more electrical power busses that may provide power to the cargo area at one or more voltages, as discussed below. The power supplies 144 may be one or more of: a battery or set of batteries, a gas generator, a propone generator, a chemical battery cell(s), an ultracapacitor cell(s), or some other form of power supply. In some implementations, for example, the power supplies 144 may include at least two different power supplies (e.g., power generator 144a, and power storage 144b) that provide at least two separate voltages to the vehicle 100. In some implementations, the access cover 136 may enable fuel supply tanks, such as propone tanks, to be coupled to the appropriate power generator when food is being prepared within the cargo area of the vehicle 100.

As is best illustrated in FIG. 1A, the vehicle 100 may carry a control system 150, which is communicatively coupled to control various components, for example the displays 128. The control system 150 is discussed more thoroughly with reference to FIGS. 2-8.

The vehicle 100 may also carry one or more wireless communications systems, for example one or more cellular radios or transceivers or satellite radios or transceivers 152 and associated antenna 154 which provide for bi-directional communications between the vehicle 100 and off-board components or systems, for example an off-board control system 156 that is remotely located from the vehicle 100. Communications can be via one or more communications channels 158, for example cellular communications channels, radio frequency or microwave frequency communications channels, infrared communications channels. The wireless communications system(s) is communicatively coupled to the control system 150, for example via one or more buses or communications channels. The one or more antenna 154 may, for example, be located on or above the roof of the vehicle 100 or an equipment module mounted to the vehicle 100, for instance on the roof or top side 106. The wireless transceiver(s) 152 and associated antenna 154 is discussed more thoroughly with reference to FIGS. 2-8.

The vehicle 100 may also carry one or more spatial positioning receivers 160 and associated antenna 162, for example one or more on-board Global Positioning System (GPS) receivers, and, or, one or more on-board Global Navigation Satellite System (GLONASS) receivers, and antenna to receive signals from satellites or terrestrial sources (e.g., wireless service provider cellular towers, WI-FI hotspots). The spatial positioning receiver(s) 160 may be communicatively coupled to the control system 150, for example via one or more buses or communications channels. The spatial positioning receiver(s) 160 and associated antenna 162 is discussed more thoroughly with reference to FIGS. 2-8.

The vehicle 100 may also carry one or more image-based position detection systems 164, operable to ascertain an at least approximate position of the vehicle at each of a plurality of times or context of an external environment in a vicinity of the vehicle at each of a plurality of times. The image-based position detection system may include one or more cameras 166a, 166b, 166c, 166d (four shown, collectively 166) oriented to capture images (e.g., still images, moving images) of the external environment, and one or more image processing systems 168 operable to process captured images, for example comparing features in captured images against a reference set of features or using other image recognition techniques. For example, cameras 166 may be oriented to capture images of an environment surrounding vehicle 100, and image processing systems 168 may be operable to process the captured images to determine or approximate localization or positional data related to a location of vehicle 100 relative to known landmarks, structures, buildings, and the like. For example, cameras 166 may be oriented to capture images of a person's head, body, extremities, or a combination of some or all of these, and image processing systems 168 may be operable to process the captured images to determine demographics, age, body posture, and location, direction, or position of a person's gaze. The image-based position detection system 164 may be communicatively coupled to the control system 150, for example via one or more buses or communications channels. The image-based position detection system 164 is discussed more thoroughly with reference to FIGS. 2-8.

Figure 2:
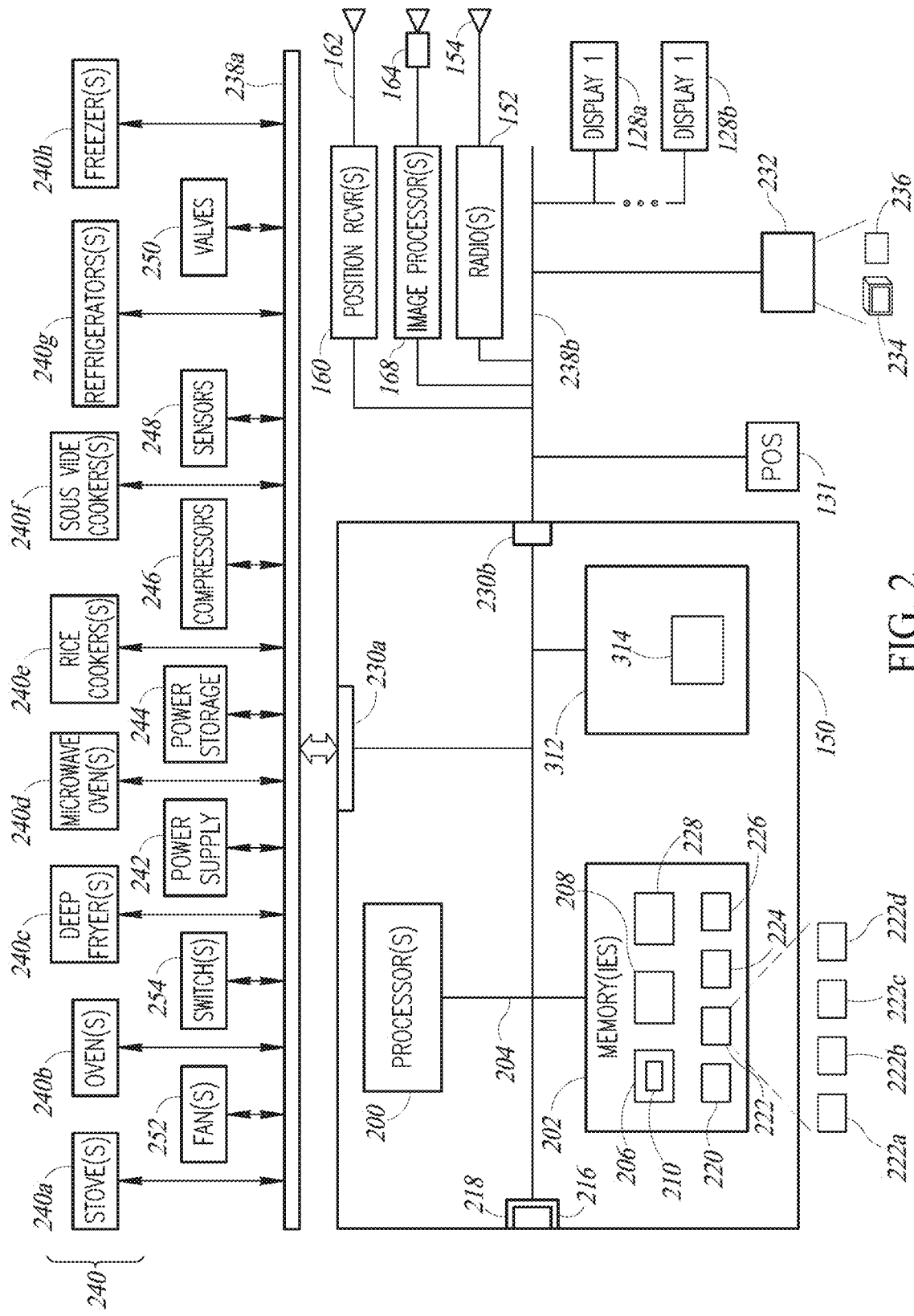
FIG. 2 is a schematic view of a portion of the vehicle of FIGS. 1A-1C, in particular showing various systems, subsystems and components, communicatively coupled to implement various operations including operations associated with contextual presentation of information, according to at least one illustrated implementation.

FIG. 2 shows a portion of the vehicle of FIGS. 1A-1C, in particular showing various systems, subsystems and components, communicatively coupled to implement various operations including operations associated with contextual presentation of information, according to at least one illustrated implementation.

The vehicle 100 may include an on-board control system 150. The on-board control system 150 may take the form of any current or future developed computing system capable of executing one or more instruction sets. The on-board control system 150 includes one or more processors (i.e., circuitry) 200, one or more system memories 202 and one or more system buses 204 that communicably couples various system components including the system memory 202 to the processor(s) 200. The on-board control system 150 will at times be referred to in the singular herein, but this is not intended to limit the embodiments to a single system, since in certain embodiments, there will be more than one system or other networked computing device involved.

The processor(s) 200 may be any logic processing unit, such as one or more central processing units (CPUs), microprocessors, digital signal processors (DSPs), application-specific integrated circuits (ASICs), field programmable gate arrays (FPGAs), programmable logic controllers (PLCs), etc. Non-limiting examples of commercially available processors, but are not limited to, an Atom, Pentium, or 80×86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation.

The system bus 204 can employ any known bus structures or architectures, including a memory bus with memory controller, a peripheral bus, and a local bus. The system memory 202 may include read-only memory ("ROM") 206 and random access memory ("RAM") 208. A basic input/output system ("BIOS") 210, which can be stored by the ROM 206, contains basic routines that help transfer information between elements within the control system 150, such as during start-up. Some embodiments may employ separate buses for data, instructions and power.

The on-board control system 150 also includes one or more internal nontransitory storage systems 212. Such internal nontransitory storage systems 212 may include, but are not limited to, any current or future developed persistent storage device 214. Such persistent storage devices 214 may include, without limitation, magnetic storage devices such as hard disc drives, electromagnetic storage devices such as memristors, molecular storage devices, quantum storage devices, electrostatic storage devices such as solid state drives, and the like.

The on-board control system 150 may also include one or more optional removable nontransitory storage systems 216. Such removable nontransitory storage systems 216 may include, but are not limited to, any current or future developed removable persistent storage device 218. Such removable persistent storage devices 218 may include, without limitation, magnetic storage devices, electromagnetic storage devices such as memristors, molecular storage devices, quantum storage devices, and electrostatic storage devices such as secure digital ("SD") drives, USB drives, memory sticks, or the like.

The one or more internal nontransitory storage systems 212 and the one or more optional removable nontransitory storage systems 216 communicate with the processor(s) 200 via the system bus 204. The one or more internal nontransitory storage systems 212 and the one or more optional removable nontransitory storage systems 216 may include interfaces or device controllers (not shown) communicably coupled between nontransitory storage system and the system bus 204, as is known by those skilled in the relevant art. The nontransitory storage systems 212, 216, and their associated storage devices 214, 218 provide nonvolatile storage of computer-readable instructions, data structures, program modules and other data for the on-board control system 150. Those skilled in the relevant art will appreciate that other types of storage devices may be employed to store digital data accessible by a computer, such as magnetic cassettes, flash memory cards, RAMs, ROMs, smart cards, etc.

Program modules can be stored in the system memory 202, such as an operating system 220, one or more application programs 222, other programs or modules 224, drivers 226 and program data 228.

The application programs 222 may include, for example, one or more machine executable instruction sets (i.e., configuration module 222a) that configures at least the presentation (e.g., image, aural) of information based on context (e.g., location, destination, day, date, time, event, event type, demographic or other cultural information related to people in proximity of vehicle 100, body posture of people in proximity of vehicle 100, location, direction, or position of peoples' gaze in proximity of vehicle 100, total number of people in proximity of vehicle 100, speed of movement of people in proximity to vehicle 100, dress of people in proximity of vehicle 100, weather). The one or more machine executable instruction sets (i.e., configuration module 222a) may optionally configure operation of a point-of-sale system 131 based on context (e.g., location, destination, day, date, time, event, demographic or other cultural information related to people in proximity of vehicle 100, body posture of people in proximity of vehicle 100, location, direction, or position of peoples' gaze in proximity of vehicle 100, number of people in proximity of vehicle 100, speed of movement of people in proximity to vehicle 100, weather). The on-board control system 150 executing the instructions can dynamically revise a list of available items or menu based on contextual information, for presentation via, for example the displays 128 and, or for entering orders and payment via, for example the POS 131. Contextual information can include an event type, which may be mapped to a specific menu appropriate for the event. For example, a first menu may be presented when the vehicle 100 is at a venue presenting a concert of classical music or a play, while a second, different, menu may be presented when the vehicle 100 is at a venue presenting at a rock concert, and a third, different, menu presented when the vehicle 100 is at a venue presenting a sports event. In the above example, the venues may each be different from one another, or the venue can be a single venue at which different events are presented on different days and/or different times. Additionally, a first menu may be presented when a certain number of people or percentage of a population within proximity of vehicle 100 are minors, while a second, different, menu may be presented when a certain number of people or percentage of a population within proximity of vehicle 100 are young adults, and a third, different, menu presented when a certain number of people or percentage of a population within proximity of vehicle 100 are elderly. Additionally, a first menu may be presented when a certain number of people or percentage of a population within proximity of vehicle 100 are male, while a second, different, menu may be presented when a certain number of people or percentage of population within proximity of vehicle 100 are female.

Additionally, a first menu may be presented when a certain number of people or percentage of a population within proximity of vehicle 100 look at or assemble near a first area of vehicle 100, while a second, different, menu may be presented when a certain number of people or percentage of a population within proximity of vehicle 100 look at or assemble near a second area of vehicle 100, and a third, different, menu presented when a certain number of people or percentage of a population within proximity of vehicle 100 look at or assemble near a third area of vehicle 100. Additionally, a first menu may be presented when a certain number of people or percentage of a population within proximity of vehicle 100 are Caucasian, while a second, different, menu may be presented when a certain number of people or percentage of a population within proximity of vehicle 100 are African American, and a third, different, menu presented when a certain number of people or percentage of a population are Asian. It will be appreciated that such contextual interpretations may be based upon or influenced by, for example, height, body posture, nature of dress, skin tone, hairstyle, speed of movement, or a combination of these and a variety of other factors. As noted above, the foregoing functionality may be enabled or facilitated by application programs 222 in cooperation with control system 150 or any of its suitable constituent hardware components, such as associated cameras 166, image processors 168, and, or processors 200, The application programs 222 may include, for example, one or more machine executable instruction sets (i.e., routing module 222b) capable of providing provide routing instructions (e.g., text, voice, and/or graphical routing instructions) to navigation equipment in some or all of the cab portions 102 of the vehicle 100 and/or providing positional information or coordinates (e.g., longitude and latitude coordinates) to other components of the on-board control system 212 and/or to the off-board control system 156 (FIG. 1A). The application programs 222 may further include one or more machine executable instructions sets (i.e., cooking module 222c) that outputs queuing and cooking instructions or commands to various components, e.g., appliances such as ovens, refrigerators, freezers, in the cargo portion 104 (FIG. 1A) of each vehicle 100. In some implementations, an order dispatch and en route cooking control application 222d may provide navigation, queuing, and cooking instructions.

The on-board control system 150 executing the instructions can dynamically generate specific cooking instructions or commands, using any number of inputs including at least, the food type in a particular appliance, e.g., oven, and the available cooking time before each respective food item is delivered to a consumer destination location, and optionally the contextual information. Such a cooking module machine executable instruction set may be executed in whole or in part by one or more controllers in the cooking module 222c installed in the on-board control system 150 and/or the off-board control system 156 (FIG. 1A).

In some embodiments, the on-board control system 150 operates in an environment using one or more of the communications interfaces 230a, 230b to optionally communicably couple to one or more remote computers, servers, display devices, and/or other devices via one or more communications channels, for example, one or more buses (e.g., Controller Area Network (CAN) bus) 238a and/or other communications channels 238b (e.g., local area networks (LANs), wide area networks (WANs), wireless networks, wired and wireless communications channels, serial or parallel communications channels). These logical connections may facilitate any known method of permitting computers to communicate, such as through one or more LANs and/or WANs. Such networking environments are well known in wired and wireless enterprise-wide computer networks, intranets, extranets, and the Internet. In some implementations, the communications interfaces or channels may be one or more of parallel cables or serial cables capable of high speed communications, for instance, via one or more of FireWire®, Universal Serial Bus® (USB), Thunderbolt®, or Gigabit Ethernet®. In some implementations, the communications interfaces or channels may include optical fiber. In some implementations, the communications interfaces or channels may include a wireless transceiver that communicates wirelessly with the control system 312 via a short-range wireless communications protocol (e.g., Bluetooth®, Bluetooth® Low Energy, WIFI®, NFC).

For example, one or more communications interfaces 230a may communicatively couple the on-board control system 150 with one or more appliances 240, for example one or more of: one or more stoves 240a having burners, one or more ovens 240*b*, one or more deep fryers 240*c*, one or more micro-wave ovens 240*d*, one or more rice cookers 240*e*, one or more sous vide cookers 240*f*, one or more refrigerators 240*g*, one or more freezers 240*h*.

Also for example, one or more communications interfaces 230*a* may communicatively couple the on-board control system 150 with one or more power supplies (e.g., power converters, power inverters, active rectifiers) 242 and/or one or more power storage devices (e.g., primary battery cells, secondary battery cells, super- or ultra-capacitor cells, gasoline storage tank, hydrogen storage tank, propane storage tank) 244. Also for example, one or more communications interfaces 230*a* may communicatively couple the on-board control system 150 with one or more compressors 246 and/or one or more valves 248 that are selectively controllable to control a flow of fluid (e.g., liquid or gas). Also for example, one or more communications interfaces 230*a* may communicatively couple the on-board control system 150 with one or more sensors 250, for example temperature sensors or thermo-couples, pressure sensors, humidity sensors, volume sensors, etc. Also for example, one or more communications interfaces 230*a* may communicatively couple the on-board control system 150 with one or more fans 252, for instance exhaust fans positioned above cooking equipment or appliances. Also for example, one or more communications interfaces 230*a* may communicatively couple the on-board control system 150 with one or more switches (e.g., mechanical switches, electro-mechanical switches, electrical switches, relay switches) 254, for instance exhaust fans positioned above cooking equipment or appliances.

Further, one or more communications interfaces 230*b* may be used for establishing communications with other components of the vehicle 100. For example, one or more communications interfaces 230*b* may communicatively couple the on-board control system 150 with one or more displays 128*a*, 128*b*, allowing the on-board control system 150 to control the content presented via the displays 128*a*, 128*b*, for example, based upon or influenced by contextual information. Also for example, one or more communications interfaces 230*b* may communicatively couple the on-board control system 150 with one or more one or more radios 152 and associated antenna 154, for example to provide communications between the vehicle 100 and off-vehicle components. Also for example, one or more communications interfaces 230*b* may communicatively couple the on-board control system 150 with one or more one or more positioning receivers (e.g., GPS receiver, GLOSNOSS receiver) 160 and associated antenna 162 to receive contextual information (e.g., spatial or position coordinates, real-world time) about the current or intended circumstances of the vehicle 100, for instance position, destination or current time. Also for example, one or more communications interfaces 230*b* may communicatively couple the on-board control system 150 with one or more image processors 168 and associated cameras 166 to receive contextual information (e.g., spatial or position coordinates, real-world time, demographic or other cultural information related to people in proximity of vehicle 100, body posture of people in proximity of vehicle 100, location, direction, or position of peoples' gaze in proximity of vehicle 100, number of people in proximity of vehicle 100, speed of people in proximity of vehicle 100, weather) about the current or intended circumstances of vehicle 100, for instance position, destination or current time.

As a further example, one or more communications interfaces 230*b* may communicatively couple the on-board control system 150 with one or more pieces of navigation equipment 232. The navigation equipment 232 may be used, for example, to provide location and/or navigation information to the vehicle 100 (e.g. autonomous vehicle) or to an operator of the vehicle 100 for upcoming destinations or locations. The navigation equipment 232 may, for example, include a display screen 234 and/or location tracking equipment 236 such as receivers that can receive and determine coordinate information from a GPS and/or GLONASS positioning system, and/or from cellular towers. The display screen 234 may be located in the cab portion 102 and may provide the driver of the vehicle 100 with routing information in the form of text directions, voice instructions, or a map. In addition, the display screen 234 can also provide the driver of the vehicle 100 with a manifest of destinations and items or supplies for a particular destination.

In some implementations, navigation equipment 232 may supply a human operator of the vehicles 100 may be provided with the routing and delivery instructions. In some implementations in which the vehicle 100 is an autonomous, self-driving vehicle, the routing and/or delivery instructions may be provided to an autonomous navigation component of the vehicle 100. The routing and/or destination instructions may be updated based upon current and/or expected or predicted travel conditions. The routing and/or destination instructions can be transmitted by the off-board control system 156 or some third party system may be used by the on-board control system 150 to control the operation of one or more appliances and/or other pieces of equipment that may be installed or loaded in the vehicles 100.

As yet a further example, one or more communications interfaces 230*b* may communicatively couple the on-board control system 150 with one or point-of-sale systems (POSs) 238. The POSs 238 may be used, for example, to complete transactions, for instance order and payment for items, for instance food items being made, cooked, or sold. The on-board control system 150 may, for example, configure the POSs 238 based on contextual information, for instance allowing only sales or transactions that are allowable or suitable based on a current location of vehicle 100 and/or, based on a current date, day, and/or time, and/or based on the context of persons in proximity of vehicle 100 (i.e. demographics, body posture, location, direction or position of gaze). The POSs 238 may include one or more readers that read information from financial transaction media, for instance magnetic stripe readers to read information encoded in magnetic stripes of credit and debit cards, hardwired interfaces to read information encoded in memory chips in credit and debit cards, radios to wireless read information (e.g., NFC, ApplePay, Samsung Pay) from smartphones and similar mobile devices, machine-readable symbol readers to read information encoded in one- and, or two-dimensional machine-readable symbols. The POSs 238 may include one or more radios or wired interfaces that provide communications with banks and credit or debit card servicing facilities.

Figure 3:
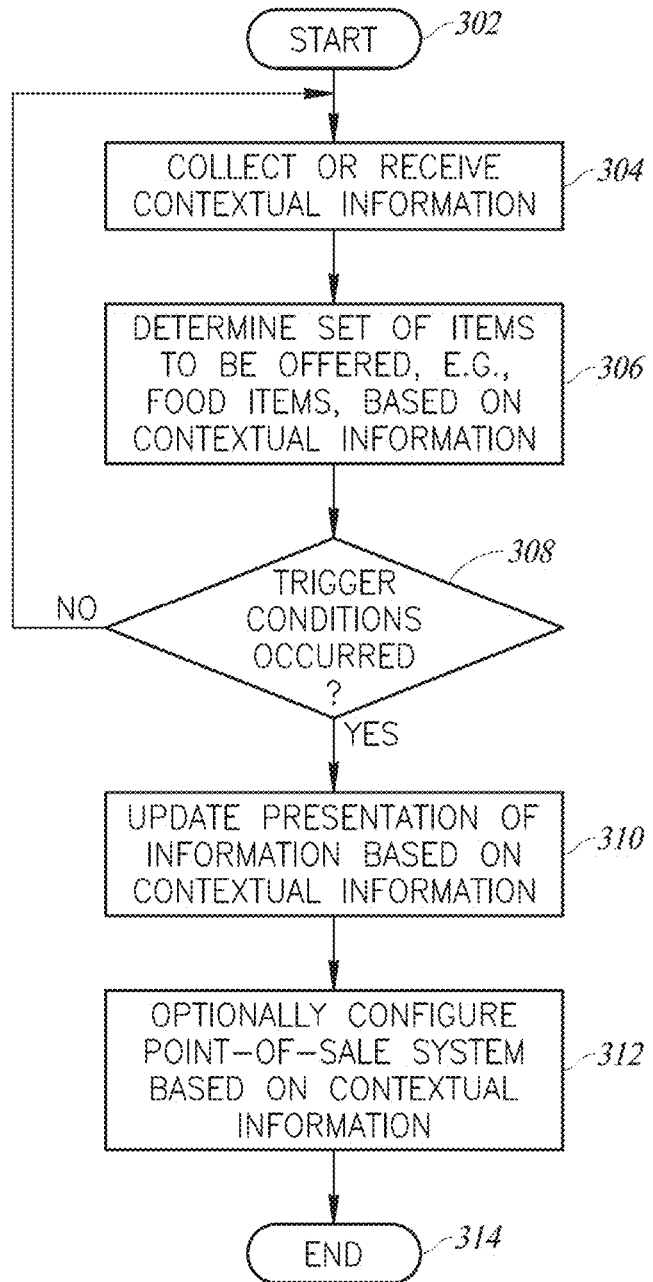
FIG. 3 is a logic flow diagram of a high level method 300 of operation of a vehicle, according to at least one illustrated implementation.

FIG. 3 shows a high level method 300 of operation of a vehicle 100, according to at least one illustrated implementation.

The method 300 starts at 302, for example in response to a call by a calling routine, application of power to the vehicle or to on-board control system 150.

At 304, a processor-based device, for example, the on-board control system 150 collects or receives contextual information. Additionally or alternatively, the on-board control system 150 may receive information from an off-board system, for example destination information, current date, day, and/or time, event information that identifies a specific event or type of event, weather information, demographic information (e.g., size of crowd, ethnicity, speed of movement of crowd, dress, age composition) for a set of people expected to be at a defined location during a defined period of time.

At 306, a processor-based device, for example, the on-board control system 150 determines a set of items to be offered, e.g., food items, based on contextual information. One or more sets of items may be defined and mapped to tuples of contextual information. For example, a menu of relatively higher cost food items, including beverages, may be logically associated in a data collection with a specific location, a venue, a specific event, a type of event, a date, day and/or time, a type of weather, and, or a different type or size of crowd. Also or example, a menu of relatively lower cost food items, including beverages, may be logically associated in a data collection with a different specific location, a different venue, a different specific event, a different type of event, a different date, day and/or time, a different type of weather, and, or a different type or size of crowd. Additionally or alternatively, menu items may be modified based on which items currently being offered are determined to be attractive to a greater percentage or predetermined threshold of people in a vicinity of vehicle 100. While three examples are given, there may be four or even more sets of items to be offered, each based on specific or dynamically adjustable combinations of contextual information.

At 308, a processor-based device, for example, the on-board control system 150 determines whether one or more trigger conditions have occurred. Various trigger conditions can include one or more of: location, occurrence of date, day, time, whether a certain number of persons or percentage of a population in a vicinity of vehicle 100 satisfies a demographic criterion or set of criteria or indicia, and/or whether a certain number of persons or percentage of a population in a vicinity of vehicle 100 looks at, focuses on, or assembles near, a certain area of the vehicle 100 or menu item. The trigger conditions are typically a combination of a location and one or more of date, day, time. Various approaches to determining whether trigger conditions have occurred are discussed below with reference to FIGS. 6-8.

At 310, a processor-based device, for example, the on-board control system 150 updates a presentation of information based on contextual information. For example, the on-board control system 150 causes one or more displays to present corresponding information. For example, the on-board control system 150, may cause one or more displays to present corresponding information when a certain number of persons or a percentage of a population in a vicinity of vehicle 100 satisfies a demographic criterion or set of criteria or indicia, and/or whether a certain number of persons or percentage of a population in a vicinity of vehicle 100 looks at, focuses on, or assembles near, a certain area of the vehicle 100 or menu item.

At 312, a processor-based device, for example, the on-board control system 150 optionally configures a point-of-sale system based on contextual information. For example, the on-board control system 150 configures one or more POS to register (i.e., "ring up") only items that are in the set of items that are available based on the current contextual information. For example, when vehicle 100 is in the first defined geographic area and, or time, the POS is configured to permit sales of items only from a first order mix, and when vehicle 100 is in the second defined geographic area and, or time, the POS is configured to permit sales of items only from a second order mix. Also for example, when vehicle 100 is in the first defined geographic area and, or time, the POS is configured to permit sales of items from the first order mix and not from the second order mix, and when vehicle 100 is in the second defined geographic area and, or time the POS is configured to permit sales of items only from the second order mix and not from the first order mix. Also for example, when a number of persons or percentage of a population in a vicinity of vehicle 100 is less than a defined number of persons or percentage of the population in the vicinity of vehicle 100 of a defined demographic criterion or set of criteria or indicia, the POS is configured to permit sales of items from the first order mix and not from the second order mix, and when the number of persons or percentage of the population in the vicinity of vehicle 100 is greater than a defined number of persons or percentage of the population in the vicinity of vehicle 100 of a defined demographic criterion or set of criteria or indicia, the POS is configured to permit sales of items only from the second order mix and not from the first order mix. Also for example, when a first defined number of persons or percentage of a population in a vicinity of vehicle 100 look at, focus on, or assemble near, a first defined area of vehicle 100, the POS is configured to permit sales of items from the first order mix and not from the second order mix, and when a second defined number of persons or percentage of the population in the vicinity of the vehicle 100 look at, focus on, or assemble near, a second defined area of the vehicle the POS is configured to permit sales of items only from the second order mix and not from the first order mix.

The method 300 terminates at 314, for example until invoked again. Alternatively, the method 300 may repeat continuously or repeatedly, or may execute as multiple instances of a multi-threaded process.

Figure 4:
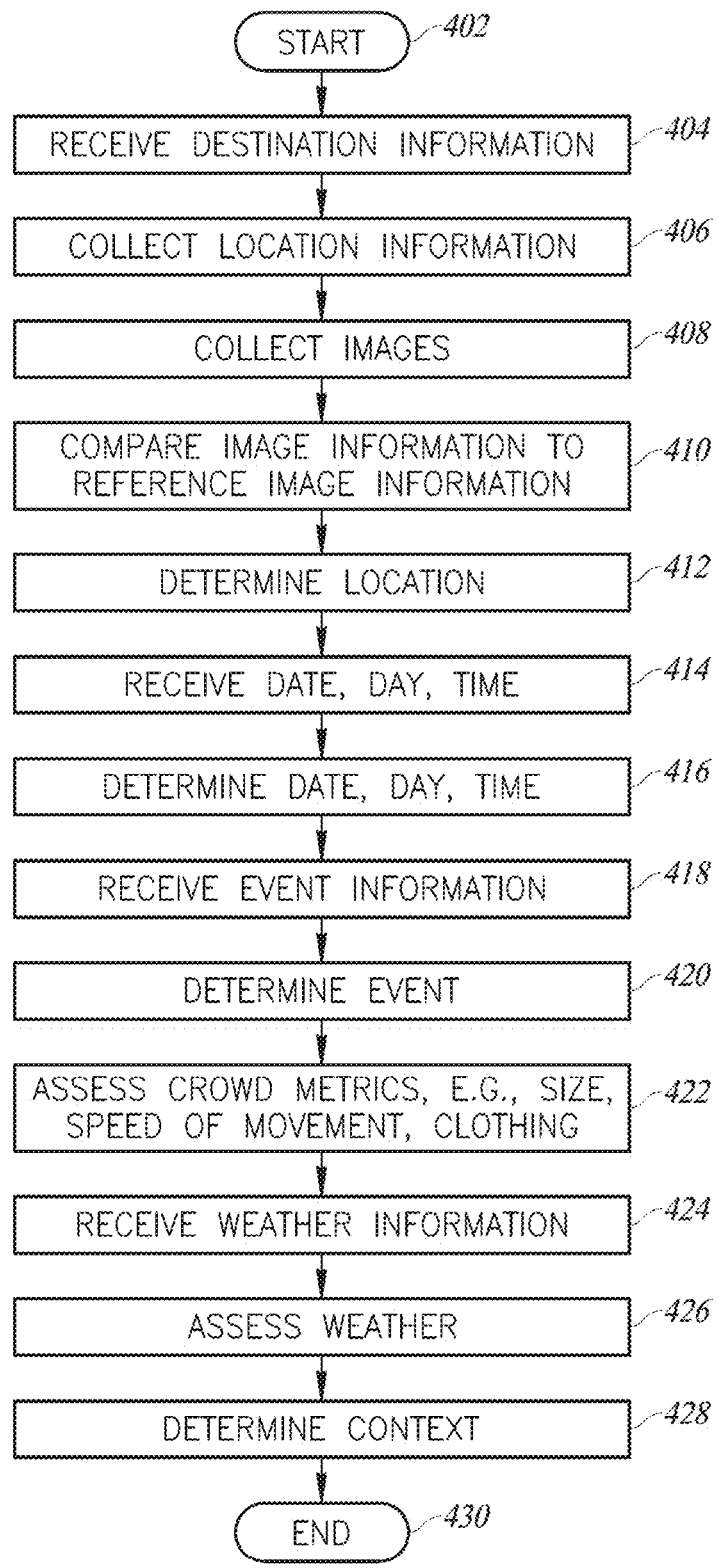
FIG. 4 is a logic flow diagram of a low level method of obtaining contextual information and determining a context in operation of a vehicle, according to at least one illustrated implementation.

FIG. 4 shows a low level method 400 of obtaining contextual information and determining a context in operation of a vehicle 100, according to at least one illustrated implementation. The method 400 may be executed in the collection or receipt of contextual information 304 (FIG. 3).

The method 400 starts at 402, for example in response to a call by a calling routine, application of power to the vehicle or to on-board control system 150.

At 404, a processor-based device, for example, the on-board control system 150 optionally receives destination information. For example, the on-board control system 150 may wirelessly receive destination information via a radio from an off-board controls system, for instance located remotely with respect to the vehicle.

At 406, a processor-based device, for example, the on-board control system 150 optionally collects location information. For example, the on-board control system 150 or the positioning system (e.g., GPS or GLOSNOSS receiver) or image based system may collect information, for instance spatial coordinates via signals from satellites or cellular towers and, or cellular base stations.

At 408, a processor-based device, for example, the on-board control system 150 optionally collects images. For example, the on-board control system 150 or the image based system may collect information, for instance images of a surrounding area.

At 410, a processor-based device, for example, the on-board control system 150 or graphical processor unit optionally compares image information to reference image information, identifying locations based on matches to image information of known locations. Additionally or alternatively, the on-board control system 150 or graphical processor unit optionally compares image information to reference image information or other contextual data related to demographic indicia, other cultural information, body posture, or eye gaze. The graphical processor unit may use a number of features that appear in the images and the reference image information, rather than attempt a pixel by pixel comparison. Various machine-learning techniques can be employed to refine or improve the ability to identify locations and demographic indicia based on image features.

At 412, a processor-based device, for example, the on-board control system 150 optionally determines location. For example, the on-board control system 150 may determine location based on one or more of received and, or collected information. In the foregoing examples, on-board control system 150 may be provided with location information, ascertain location information from other information, or both. For example, GPS coordinates, map coordinates, or other location data may be received (such as from a GPS satellite, a wireless network, or a combination of these and other broadcast media) or derived, such that on-board control system 150 may determine a location of vehicle 100 in the vicinity or area of a park, a stadium, a beach, or other venue as in the examples above.

At 414, a processor-based device, for example, the on-board control system 150 optionally receives any one or more of a current date, day, and time. For example, the on-board control system 150 may wirelessly receive current date, day, and time information via a radio from an off-board controls system, for instance located remotely with respect to the vehicle.

At 416, a processor-based device, for example, the on-board control system 150 optionally determines current date, day, or time. For example, the on-board control system 150 may derive the current date, day, and time information from GPS information, or even from collected images, for instance based on an amount of light in the images, shadows in the image, or events that are occurring and which are captured in the images.

At 418, a processor-based device, for example, the on-board control system 150 optionally receives event information. For example, the on-board control system 150 may wirelessly receive event information (e.g., name of event, type of event, date, day, and time of event) via a radio from an off-board controls system, for instance located remotely with respect to the vehicle. Additionally or alternative, the on-board control system 150 may derive the event information for instance based on a location and time, or even from collected images, for instance based signage that appears in the images.

At 420, a processor-based device, for example, the on-board control system 150 optionally determines the event. For example, the on-board control system 150 may determine a name of the event and, or a type or class of the event based on received, collected or derived event information.

At 422, a processor-based device, for example, the on-board control system 150 optionally assesses crowd metrics for later use, substantially as set forth with respect to 428 below. For example, the on-board control system 150 may assess a population in proximity to the vehicle or size of crowd, and, or may assess an average or median speed of movement of people in the vicinity of vehicle 100, and, or may assess demographic information, for instance based on clothing worn by people in the vicinity of vehicle 100, their age, and, or, their ethnicity, and, or may assess body posture of the people in the vicinity of vehicle 100, and, or may assess the location, direction, or focus of gaze of people in the vicinity of vehicle 100.

At 424, a processor-based device, for example, the on-board control system 150 optionally receives weather information. For example, the on-board control system 150 may wirelessly receive current or forecasted weather information for a location and time period via a radio from an off-board controls system, for instance located remotely with respect to the vehicle.

At 426, a processor-based device, for example, the on-board control system 150 optionally assesses weather. For example, the on-board control system 150 may derive the weather information from collected images, for instance based on an amount of light in the images, shadows in the image, type of clothing worn by people in the vicinity of the vehicle.

At 428, a processor-based device, for example, the on-board control system 150 optionally determines a context based on any one or more aspects of the contextual information. In this implementation, display 128 may be controlled to alter content, to position graphics or video, or both, selectively or dynamically responsive to input from a processing system, such as control system 150, as a function of or influenced by the contextual information (e.g., location, weather, event, demographic or cultural information, body posture, eye gaze, location of assembly near the vehicle 100). For instance, the on-board control system 150 may determine that the context supports a higher quality, more refined and possibly more expensive set of items (e.g., steak, lobster) to be offered at a given location and time. Alternatively, the on-board control system 150 may determine that the context supports a lower quality, less refined and possibly less expensive set of items (e.g., hot dogs, pizza) to be offered at a given location and time. Some contextual information may be consistent with one or more intermediate levels of offerings.

Also for example, if vehicle 100 is located near a park, a beach, or other recreation area and on-board control system 150 determines (e.g., based upon image data captured by cameras 166) that a certain threshold percentage of people in proximity to vehicle 100 are below a predetermined height and appear to be assembling near a portion of display 128 advertising candies or sweets, then on-board control system 150 may selectively alter output of display 128 to display ice cream treats at or near that location of display 128. As another example, if vehicle 100 is located near a stadium or athletic venue and on-board control system 150 determines (e.g., based upon image data captured by cameras 166) that a certain threshold percentage of people in proximity to vehicle 100 are above a certain height and appear to be assembling near a portion of display 128 advertising alcoholic beverages, then on-board control system 150 may selectively alter output of display 128 to display beer or tailgating fare at or near that location of display 128. Also for example, if on-board control system 150 determines (e.g., based upon image data captured by cameras 166) that a certain threshold percentage of people in proximity to vehicle 100 are Asian and appear to be assembling near a portion of display 128 advertising food, then on-board control system 150 may selectively alter output of display 128 to display Asian food at or near that location of display 128. Also for example, if on-board control system 150 determines (e.g., based upon image data captured by cameras 166) that a certain threshold percentage of people in proximity to vehicle 100 are focusing on an area of display 128 advertising hot beverages, then on-board control system 150 may selectively alter output of display 128 to display hot food at or near that area of display 128.

The method 400 terminates at 430, for example until invoked again. Alternatively, the method 400 may repeat continuously or repeatedly, or may execute as multiple instances of a multi-threaded process.

Figure 5:
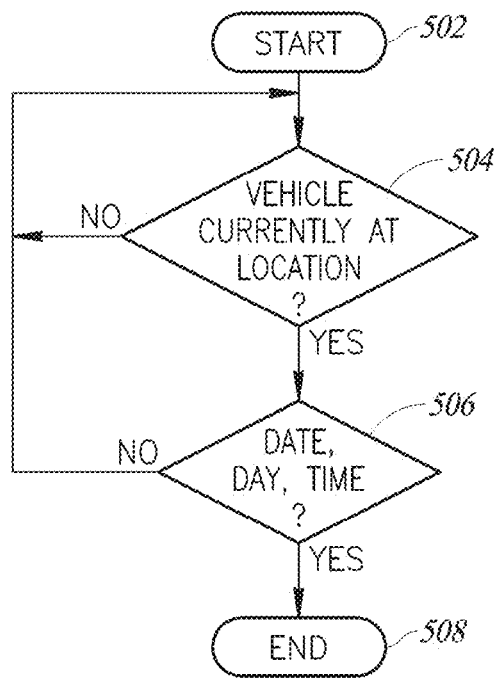
FIG. 5 is a logic flow diagram of low level method of determining whether one or more trigger conditions have occurred in operation of a vehicle, according to at least one illustrated implementation.

FIG. 5 shows a low level method 500 of determining whether one or more trigger conditions have occurred in operation of a vehicle 100, according to at least one illustrated implementation. The method 500 may be executed in determining whether one or more trigger conditions have occurred 308 (FIG. 3).

The method 500 starts at 502, for example in response to a call by a calling routine, application of power to the vehicle or to on-board control system 150.

At 504, a processor-based device, for example, the on-board control system 150 determines whether the vehicle is currently at a defined location. The on-board control system 150 may use location information collected in any of a variety of ways, including spatial coordinates supplied via GPS/GLOSSNOS receivers, location information derived from images, routing information, destination or manifest information and date and time.

At 506, a processor-based device, for example, the on-board control system 150 determines whether a specified date, day, and, or time is occurring.

The on-board control system 150 may determine that the trigger conditions have occurred if one, or typically both, of the above described individual criteria are met.

The method 500 terminates at 508, for example until invoked again. Alternatively, the method 500 may repeat continuously or repeatedly, or may execute as multiple instances of a multi-threaded process.

Figure 6:
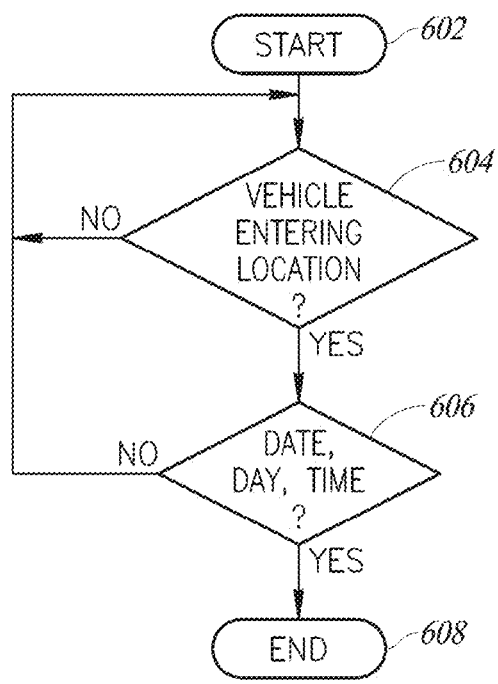
FIG. 6 is a logic flow diagram low level method of determining whether one or more trigger conditions have occurred in operation of a vehicle, according to at least another illustrated implementation.

FIG. 6 shows a low level method 600 of determining whether one or more trigger conditions have occurred in operation of a vehicle 100, according to at least one illustrated implementation. The method 600 may be executed in determining whether one or more trigger conditions have occurred 308 (FIG. 3).

The method 600 starts at 602, for example in response to a call by a calling routine, application of power to the vehicle or to on-board control system 150.

At 604, a processor-based device, for example, the on-board control system 150 determines whether the vehicle is entering a defined location or area. The on-board control system 150 may use location information collected in any of a variety of ways, including spatial coordinates supplied via GPS/GLOSSNOS receivers, location information derived from images, routing information, destination or manifest information and date and time.

At 606, a processor-based device, for example, the on-board control system 150 determines whether a specified date, day, and, or time is occurring.

The on-board control system 150 may determine that the trigger conditions have occurred if one, or typically both, of the above described individual criteria are met.

The method 600 terminates at 608, for example until invoked again. Alternatively, the method 600 may repeat continuously or repeatedly, or may execute as multiple instances of a multi-threaded process.

Figure 7:
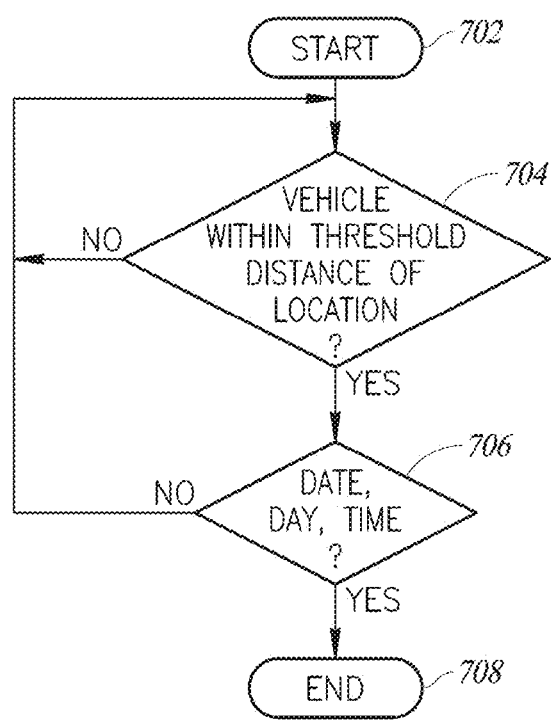
FIG. 7 is a logic flow diagram low level method 500 of determining whether one or more trigger conditions have occurred in operation of a vehicle, according to at least another illustrated implementation.

FIG. 7 shows a low level method 700 of determining whether one or more trigger conditions have occurred in operation of a vehicle 100, according to at least one illustrated implementation. The method 700 may be executed in determining whether one or more trigger conditions have occurred 308 (FIG. 3).

The method 700 starts at 702, for example in response to a call by a calling routine, application of power to the vehicle or to on-board control system 150.

At 704, a processor-based device, for example, the on-board control system 150 determines whether the vehicle is within a threshold distance of defined location or area. The on-board control system 150 may use location information collected in any of a variety of ways, including spatial coordinates supplied via GPS/GLOSSNOS receivers, location information derived from images, routing information, destination or manifest information and date and time.

At 706, a processor-based device, for example, the on-board control system 150 determines whether a specified date, day, and, or time is occurring.

The on-board control system 150 may determine that the trigger conditions have occurred if one, or typically both, of the above described individual criteria are met.

The method 700 terminates at 708, for example until invoked again. Alternatively, the method 700 may repeat continuously or repeatedly, or may execute as multiple instances of a multi-threaded process.

Figure 8:
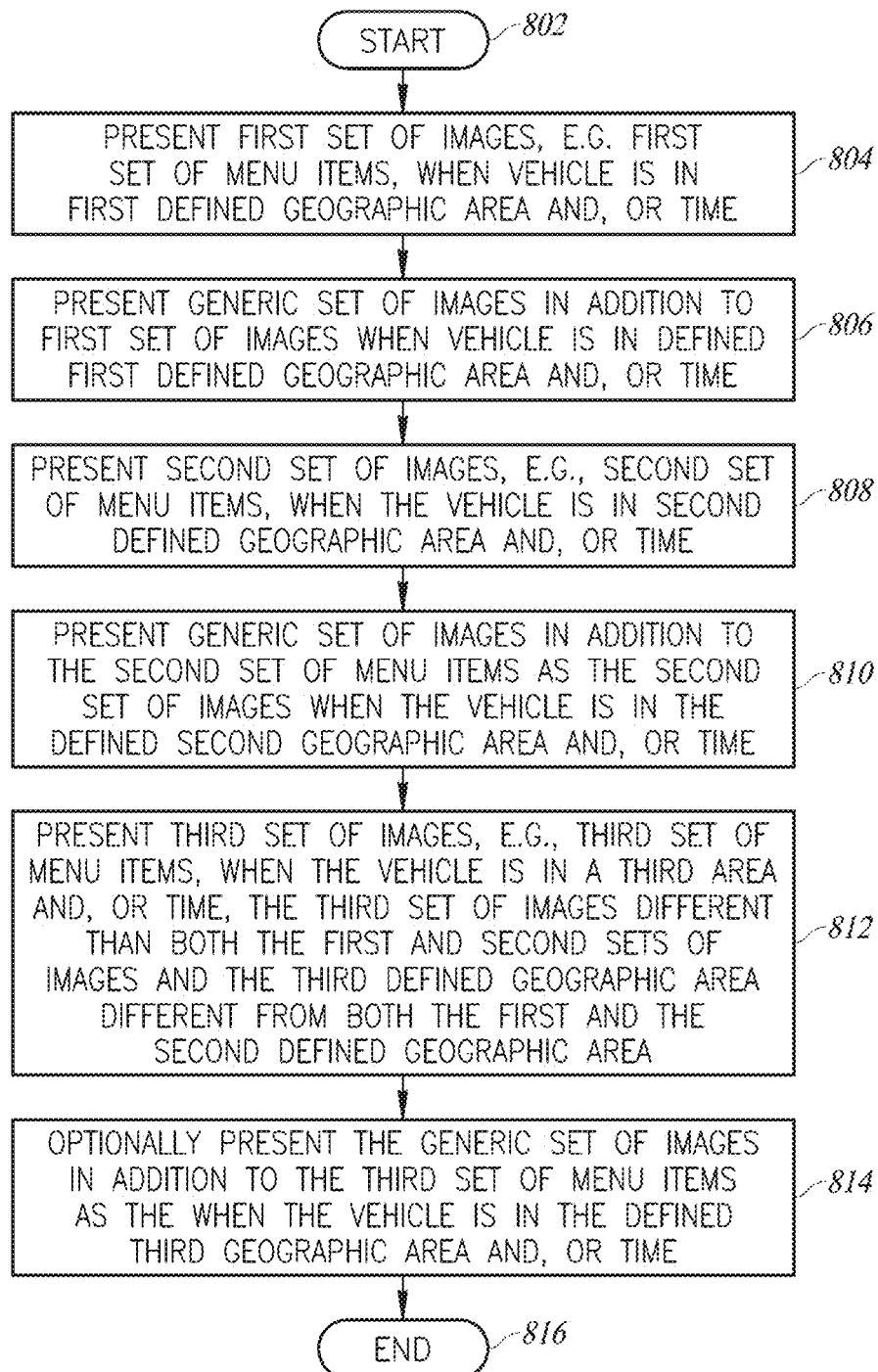
FIG. 8 is a logic flow diagram of a low level method of updating a presentation of information in operation of a vehicle, according to at least one illustrated implementation.

FIG. 8 shows a low level method 800 of updating a presentation of information in operation of a vehicle 100, according to at least one illustrated implementation. The method 800 may be executed in order to update presentation of information based on contextual information 310 (FIG. 3).

The method 800 starts at 802, for example in response to a call by a calling routine, application of power to the vehicle or to on-board control system 150.

At 804, a processor-based device, for example, the on-board control system 150 causes a presentation of a first set of images when vehicle is in first defined geographic area and, or time. The first set of images may, for example comprise a first set of menu items 900a (FIG. 9A) which can be ordered or requested or bought, for instance a set of relatively expensive menu items. The on-board control system 150 may, for example, cause one or more displays to present a first menu. The presentation can present the entire first menu simultaneously, or may sequentially present portions of the first menu, for example via scrolling or paging presentations.

At 806, a processor-based device, for example, the on-board control system 150 optionally causes a presentation of a generic set of images in addition to the first set of images when the vehicle is in the first defined geographic area and, or time. The generic images may correspond to branding that is generic to multiple sets of items that can be offered, for example a trademark for a company that operates the vehicle.

At 808, a processor-based device, for example, the on-board control system 150 causes a presentation of a second set of images when the vehicle is in a second defined geographic area and, or time. The second set of images is different than the first set of images, and may even be mutually exclusive. The second defined geographic area may be different from the first defined geographic area, or in some instances may be the same, for example where two different events occur at the same venue at different respective times. The second time is different from the first time. The second set of images may, for example comprise a second set of menu items 900b (FIG. 9B) which can be ordered or requested or bought, for instance a set of relatively inexpensive menu items. The on-board control system 150 may, for example, cause one or more displays to present a second menu. The presentation can present the entire second menu simultaneously, or may sequentially present portions of the second menu, for example via scrolling or paging presentations.

At 810, a processor-based device, for example, the on-board control system 150 optionally causes a presentation of the generic set of images in addition to the second set of menu items as the second set of images when the vehicle is in the second defined geographic area and, or time. Again, the generic images may correspond to branding that is generic to multiple sets of items that can be offered, for example a trademark for a company that operates the vehicle.

At 812, a processor-based device, for example, the on-board control system 150 causes a presentation of a third set of images, when the vehicle is in a third area and, or time. The third set of images is different than the first and the second sets of images, and may even be mutually exclusive. The third defined geographic area may be different from the first and the second defined geographic areas, or in some instances may be the same, for example where two different events occur at the same venue at different respective times. The third time is different from the second time. The third set of images may, for example comprise a third set of menu items 900c (FIG. 9C) which can be ordered or requested or bought, for instance a set of menu items that are relatively more expensive compared to the second set of menu items and relatively less expensive than the first set of menu items. The on-board control system 150 may, for example, cause one or more displays to present a third menu. The presentation can present the entire third menu simultaneously, or may sequentially present portions of the third menu, for example via scrolling or paging presentations.

At 814, a processor-based device, for example, the on-board control system 150 optionally causes a presentation of the generic set of images in addition to the third set of menu items as the when the vehicle is in the defined third geographic area and, or time.

The method 800 terminates at 816, for example until invoked again. Alternatively, the method 800 may repeat continuously or repeatedly, or may execute as multiple instances of a multi-threaded process.

EXAMPLE

In operation, during a first trip period a vehicle stocks a first order mix and a second order mix. The first order mix may be associated with a first set of branding and the second order mix may be associated with a second set of branding. The system causes a presentation, for example via at least one display, of a first set of branding as a first set of images when the vehicle is in the first defined geographic area during a first period during the first trip. The system then causes a presentation, for example via at least one display, of a second set of branding as a second set of images when the vehicle is in the second defined geographic area during a second period during the first trip, where the second period is different from the first period. The second geographic area may be different from the first geographic area or may be the same locale.

The first order mix may include a first plurality of items and the second order mix may include a second plurality of items. The first and second order mixes may, for example be mutually exclusive of one another. The items of the first order mix may have a first average price and the items of the second order mix may have a second average price, the second average price different than the first average price. The first order mix may include a first item of a first item type and the second order mix may include a second item of the first item type, the first item of the first item type bearing a first brand and the second item of the first item type bearing a second brand, the second brand different than the first brand. For instance, the first order mix may include a first brand of coffee from a first coffee roaster and a second brand of coffee from a second coffee roaster, the first brand of coffee more expensive than the second brand of coffee. Additionally or alternatively, the first order mix may include at least one of a number of pastries or a number of bagels and exclude any donuts, while the second order mix may include a number of donuts and exclude any pastries and excludes any bagels. Additionally or alternatively, the first order mix includes a number of hot entrees and excludes any cold entrees, while the second order mix includes a number of cold entrees and excludes any hot entrees. Additionally or alternatively, the first order mix may include a number of alcoholic beverages, and the second order mix may exclude any alcoholic beverages. Additionally or alternatively, the first order mix may include a number of premium food items, and the second order mix may exclude any premium food items.

Figures 9C, 10:
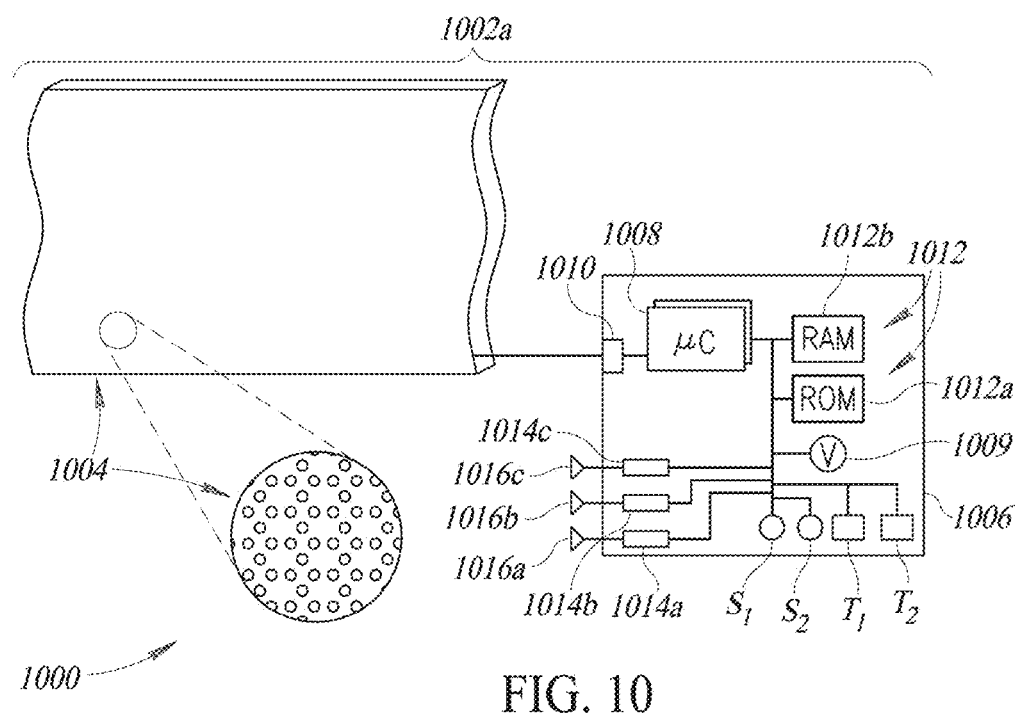
FIG. 9C is a front view of a display screen presenting a third set of images in the form of a third menu, according to at least one illustrated implementation.
FIG. 10 is a schematic diagram of an appearance configuration device including a portion of a vehicle that comprises a plurality of addressable pixels and a control subsystem operatively coupled to control a visual appearance produced by the addressable pixels to, according to at least one illustrated implementation.

FIG. 10 shows an appearance configuration device 1000, according to at least one illustrated implementation.

The appearance configuration device 1000 comprises a plurality of addressable pixels 1002 and a control subsystem 1004 operatively coupled to control a visual appearance produced by the addressable pixels 1002. The plurality of addressable pixels 1002 may take the form of electronic paper, or alternatively a flexible organic light emitting diode (OLED) array. The plurality of addressable pixels 1002 may form a material, a fabric, a wrap or a skin, that can be wrapped or otherwise applied over a portion of a vehicle, for example over all of, a majority of, or even a small portion of, a visible surface of the vehicle (i.e., a surface of the vehicle that is visible from an exterior of the vehicle as the vehicle travels from one location to another location). For example, the plurality of addressable pixels 1002 may be permanently attached (e.g., adhered, sewn) to a body or walls of a vehicle. Alternatively, the plurality of addressable pixels 1002 may be removably or detachably coupled to a body or walls of the vehicle. Alternatively, the plurality of addressable pixels 1002 and the body or walls of the vehicle may constitute a single unitary structure.

The plurality of addressable pixels 1002 may cover all or a substantial (i.e., equal to or greater than 50%) of a visible surface area of the vehicle. That is the plurality of addressable pixels 1002a may cover all or a substantial surface area of the vehicle that is typically visible by others when the vehicle travels along a route. Alternatively, the plurality of addressable pixels 1002 may cover one or more sub-portions or sub-regions areas of the visible surface area of the vehicle.

As illustrated in the magnified view, the plurality of addressable pixels 1002 may each be individually addressable pixels 1002a (only one called out to avoid clutter). Each of the addressable pixels 1002 may be operable to take on one of at least two distinct visual appearances. For example, where the plurality of addressable pixels 1002 take the form of electronic paper, each addressable pixels 1002 is typically operable to switch between two distinct optical appearances (e.g., black, white). For example, where the plurality of addressable pixels 1002 take the form of OLEDs, each addressable pixels 1002 is typically operable to switch between two distinct optical appearances (e.g., black, red; black, blue; black, green).

The display or monitor 128 may be one that uses a minimal amount of electrical power during operation, for example an electronic paper. While illustrated as extending over only a portion of the vehicle 100a, the display or monitor 128 may extend over a majority or even all of the visible surface of the vehicle 100*a*. For example, a skin of the vehicle may comprise or be covered with one or more sheets of electronic paper. For example, the vehicle or a portion thereof may be wrapped with one or more sheets of electronic paper.

Electronic paper may advantageously consume less power than, for example OLEDs. The electronic paper comprises one or more pluralities of individually addressable pixels. The individually addressable pixels are each operable to change a respective optical appearance thereof, for example in response to an electrical potential (e.g., +, −) or charge or polarization applied via one or more drive circuits, which may be controlled by one or more control circuits or controller subsystems. Application of an electrical potential or charge can cause any individual pixel to flip from rendering a first optical appearance (e.g., black) to a second optical appearance (e.g., white). The individually addressable pixels may be arranged in groups or sets, for example a triplet where each pixel in the triplet is operable to render two colors, i.e., black and one color selected from red, green or blue. Alternatively, each pixel in the triplet is operable to render two colors, e.g., white and one color selected from red, green or blue. This can allow triplets to produce other colors which are combinations of red, green, and blue.

OLEDs may advantageously produce a wider variation in appearance, for example rendering a wider range of colors than electronic papers. Some implementations may employ a simple two binary scheme (e.g., black, white) and render a color scheme, logo, name, branding, insignia, graphic, and, or text using only those two colors. Such implementations may advantageously employ groups of pixels or drive levels to render grey scale. Some implementations may employ a three color scheme (e.g., red, blue, green) and render a color scheme, logo, name, branding, insignia, graphic, and, or text using those base colors to render a large variety of colors.

The control subsystem 1004 may include one or more processors 1006, for example one or more of: one or more micro-controllers, microprocessors, central processing units (CPUs), digital signal processors (DSPs), graphical processing units (GPUs), application specific integrated circuits (ASICs), field programmable gate arrays (FPGAs), programmable logic controllers (PLCs) or other logic circuits. Non-limiting examples of commercially available processors include, but are not limited to, an Atom, Pentium, or 80×86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation. The one or more processors 1006 are operable to execute logic, and control operation accordingly. For example, the one or more processors 1006 can execute one or more set of processor-executable instructions and, or data. While the control subsystem 1004 and processor 1006 will at times be referred to in the singular herein, this is not intended to limit the embodiments to a single subsystem or single processor, since in certain embodiments, there will be more than one subsystem, more than one processor, or other networked computers involved.

The control subsystem 1004 may include one or more drive circuits 1008, communicatively coupled to control the appearance of the plurality of addressable pixels 1002, for example by changing a polarity of a voltage or changing a charge applied to the addressable pixels 1002, for instance via a power source (e.g., primary battery cell(s), secondary battery cell(s), ultra- or super-capacitor array, fuel cell(s), alternator) 1009.

The control subsystem 1004 may include one or more nontransitory processor-readable storage media 1010 which store at least one of processor-executable instructions and, or data, which when executed by the at least one of processor 1006, cause the at least one of processor 1006 to control operation of the appearance configuration device 1000, for instance controlling the appearance of the plurality of addressable pixels 1002. For example, the control subsystem 1004 may include one or more non-volatile memories, for instance Read Only Memory (ROM) 1010*a*, Flash memory, electronically programmable erasable memory (EEPROM), etc. Also for example, the control subsystem 1004 may include one or more persistent storage media (not shown), which may include, without limitation, magnetic storage devices such as hard disc drives, electromagnetic storage devices such as memristors, molecular storage devices, quantum storage devices, electrostatic storage devices such as solid state drives, and the like. As a further example, the control subsystem may include one or more one or more volatile memories, for instance Random Access Memory (RAM) 1010*b*. Also for example, the control subsystem 1004 may include one or more spinning media storage devices (not shown), for instance one or more magnetic hard disk drives and, or optical disk drives. As a further example, the control subsystem may include one or more solid state drives (SSDs) (not shown in FIG. 10).

One or more of nontransitory processor-readable storage media 1010 may be internal to the appearance configuration device. One or more of nontransitory processor-readable storage media 1010 may be external to the appearance configuration device. One or more of nontransitory processor-readable storage media 1010 (e.g., USB thumb drives, memory sticks, or the like) may be removably receivable by the appearance configuration device. The appearance configuration device 1000 may include interfaces or device controllers (not shown) communicably coupled between nontransitory processor-readable storage media and the other components of the control subsystem 1004. Those skilled in the relevant art will appreciate that other types of nontransitory processor-readable storage media may be employed to store digital data accessible by a computer or processor, such as magnetic cassettes, flash memory cards, RAMs, ROMs, smart cards, etc.

The control subsystem 1004 may include one or more switches $S_1$, $S_2$, operable to receive user input. The switches $S_1$, $S_2$, can take any of a large variety of forms, for example contact switches, push button switches, key switches, momentary switches, rocker switches, and, or relay switches. The switches $S_1$, $S_2$, may be assessable by an operator of the vehicle, who is located at the vehicle or remotely from the vehicle. The switches $S_1$, $S_2$, may be operable to, for example, toggle through a plurality of defined visual appearances.

The control subsystem 1004 may include one or more sensors or transducers $T_1$, $T_2$, operable to sense or identify various environmental characteristics or environmental contexts, for instance proximity, location, movement, acceleration, direction, and, or orientation. The sensors or transducers $T_1$, $T_2$, can take any of a large variety of forms, for example PRI motion sensors, proximity sensors, one-, two- or three-axis accelerometers, capacitive sensors, inductive sensors, resistance sensors, temperature sensors, humidity sensors, ferrous metal sensors, magnetic sensors (e.g., Reed sensor). The sensors or transducers $T_1$, $T_2$, may be an integral part of a circuit board or housing that holds other components of the control subsystem 1004, or can be located remotely therefrom, for example at other locations on the vehicle, or remote locations.

In some implementations, the appearance configuration device 1000 operates in an environment using one or more of the network interfaces to optionally communicably couple to one or more remote computers, servers, display devices, satellites, and/or other devices via one or more communications channels, for example, one or more networks such as the network. These logical connections may facilitate any known method of permitting computers to communicate, such as through one or more LANs, WANs, cellular networks. Any such networking environments may be employed including wired and wireless enterprise-wide computer networks, intranets, extranets, and the Internet.

The control subsystem 1004 may include one or more transmitters, receivers, or transceivers. For example, the control subsystem may include one or more radios, for instance one or more cellular radios 1012a and associated antennae 1014a for communications via one or more cellular networks (e.g., GSM, TDMA, CDMA), one or more wireless local area networks (W-LANs) radios (e.g., WI-FI® radios) 1012b and associated antennae 1014b, and, or, one or more wireless short range communications channel radios (e.g., BLUETOOTH® radios) 1012c and associated antennae 1014c (radios collectively 1012, antenna collectively 1014). Such allows the processor(s) 1006 to receive instructions and, or information, and to control operation accordingly. For example, as discussed in detail elsewhere herein, the processor(s) 1006 can receive information that identifies a current location of the vehicle, for instance with respect to a destination, a geo-fenced area, or a vehicle, and automatically update an appearance of the vehicle accordingly.

The control subsystem 1004 may include one or more communications channels, for example one or more buses 1016 that communicably couple various components of the control subsystem 1004 including the processor(s) 1006, drive circuitry 1008, nontransitory processor-readable storage media 1010, switches $S_1$, $S_2$, sensors or transducers $T_1$, $T_2$ and, or transmitters, receivers, transceivers or radios 1012. The bus(es) 1016 can employ any known bus structures or architectures, including a memory bus with memory controller, a peripheral bus, a local bus, and, or a power bus. Some implementations may employ separate buses 1016 for data, instructions and power.

The nontransitory processor-readable storage media 1010 provides storage of processor-executable instructions, data structures, program modules and other data for the appearance configuration device. Program modules may, for example, include one or more of a basic input/output system ("BIOS"), an operating system, one or more application programs, other programs or modules, and, or drivers, along with associated program data.

For example, one or more of the nontransitory processor-readable storage media (e.g., ROM 1010a) 1010 may store a basic input/output system ("BIOS"), which contains basic routines that help transfer information between elements within the appearance configuration device, such as during start-up.

For example, one or more of the nontransitory processor-readable storage media (e.g., ROM 1010a) 1010 may store application programs.

The application programs may include, for example, one or more machine executable instruction sets (i.e., appearance control module) that makes determinations of whether one or more defined conditions or contexts, if any, have been met, and that controls the appearance presented by the appearance configuration device by control of a plurality of addressable pixels thereof, for instance via drive circuitry. Various methods performable via execution of the processor-executable instructions and data of the appearance control module are set out in the flow diagrams of FIGS. 11-27, and discussed below.

The application programs may include, for example, one or more machine executable instruction sets (i.e., input handling module) that monitors one or more of switches, sensors, transducers, for input information or signals, which optionally processes the input or signals, and which provides input or processed input to the appearance control module.

The application programs may include, for example, one or more machine executable instruction sets (i.e., communications handling module) that monitors one or more of: receivers, transceivers, radios, network interfaces or other communications channels for incoming information (i.e., information being received by the appearance configuration device from an external source). Such can include receiving positioning information via a positioning system (e.g., GPS receiver). The one or more machine executable instruction sets (i.e., communications handling module) may also controls one or more of: transmitters, transceivers, radios, network interfaces or other communications channels to transmit outgoing information (i.e., information being transmitted from the appearance configuration device to an external destination).

The plurality of addressable pixels 1002 may display any type of programming, including still images or moving images. In some implements, the plurality of addressable pixels 1002 may display a video feed captured by one or more cameras located within the cargo area of the vehicle 100a. In some implementations, such plurality of addressable pixels 1002 may provide advertisements, signage, color schemes, and/or a menu for the products being sold or vended by the vehicle 100a. In some implementations, as discussed below, the vehicle 100a may make pizzas to order using one or more robots and/or assembly lines located within the cargo area of the cargo portion of the vehicle. In such an implementation, the cameras may capture live images, or alternatively pre-recorded images, from the cargo area of the movements and positioning of the various robots when assembling food items. Such images may be displayed by the plurality of addressable pixels 1002 as a form of advertisement and/or entertainment for current and potential customers. In some implementations, the display on the plurality of addressable pixels 1002 may progressively or randomly provide different displays (e.g., menu, interior shot, advertisement) for defined periods of time. As noted above, such displays may be influenced by or dynamically adjusted or altered responsive to contextual information.

A control system can cause the plurality of addressable pixels 1002 (e.g., electronic paper) to render certain color schemes, graphics, logos, names, branding, or signage. The control system may, for example cause the plurality of addressable pixels 1002 (e.g., electronic paper) to present still or moving images. The control system may, for example cause the presentation by the plurality of addressable pixels 1002 (e.g., electronic paper) to be updated or changed in response to certain events or triggers. For example, the control system may cause the plurality of addressable pixels 1002 (e.g., electronic paper) to be updated or changed in response to signals that indicate a present location of the vehicle. For example, the control system may cause the plurality of addressable pixels 1002 (e.g., electronic paper)

to be updated or changed in response to signals that indicate a present location of the vehicle relative to a defined destination. For example, the control system may cause the plurality of addressable pixels 1002 (e.g., electronic paper) to be updated or changed in response to signals that indicate that the vehicle is in a defined spatial relationship to a geo-fenced location. For example, the control system may cause the plurality of addressable pixels 1002 (e.g., electronic paper) to be updated or changed in response to signals that indicate that the vehicle is in a defined spatial relationship to a geo-fenced destination location. For example, the control system may cause the plurality of addressable pixels 1002 (e.g., electronic paper) to be updated or changed in response to signals that indicate that the vehicle is within a defined distance or defined estimate time of arrival to destination location, for example based on a travel time dynamically predicted based on historical and, or real time parameters (e.g., traffic conditions, traffic congestion, detours, accidents, weather, time of day, day of week, season, routing information, intervening destinations). For example, the control system may cause the plurality of addressable pixels 1002 (e.g., electronic paper) to be updated or changed in response to signals that indicate an item is in a defined proximity of the vehicle. For example, the control system may cause the plurality of addressable pixels 1002 (e.g., electronic paper) to be updated or changed in response to signals that indicate a type of an item to be delivered or vended via the vehicle. For example, the control system may cause the plurality of addressable pixels 1002 (e.g., electronic paper) to be updated or changed in response to signals that indicate an item to be delivered or vended is in a defined spatial relationship to a geo-fenced location. For example, the control system may cause the plurality of addressable pixels 1002 (e.g., electronic paper) to be updated or changed in response to signals that indicate a seller of an item to be delivered or vended via the vehicle. For example, the control system may cause the plurality of addressable pixels 1002 (e.g., electronic paper) to be updated or changed in response to signals that indicate a courier service hired to deliver or vend an item. For example, the control system may cause the plurality of addressable pixels 1002 (e.g., electronic paper) to be updated or changed in response to signals that indicate a type of a service to be rendered. For example, the control system may cause the plurality of addressable pixels 1002 (e.g., electronic paper) to be updated or changed in response to signals that indicate a business that offers a service to be rendered. For example, the control system may cause the plurality of addressable pixels 1002 (e.g., electronic paper) to be updated or changed in response to signals that indicate a vehicle to be used in delivering at least one of items or services. For example, the control system may cause the plurality of addressable pixels 1002 (e.g., electronic paper) to be updated or changed in response to signals that indicate that persons of a defined demographic criterion are in a vicinity of the vehicle. For example, the control system may cause the plurality of addressable pixels 1002 (e.g., electronic paper) to be updated or changed in response to signals that indicate that persons are looking at or focusing on an area of the vehicle. For example, the control system may cause the plurality of addressable pixels 1002 (e.g., electronic paper) to be updated or changed in response to signals that indicate that persons are assembling in an area near the vehicle.

For example, the control system may cause the plurality of addressable pixels 1002 (e.g., electronic paper) to display at least one of a name or a logo of a first company or a first brand, and display at least one of a name or a logo of a second company or a second brand, different than the first company or the first brand. For example, the control system may cause the plurality of addressable pixels 1002 (e.g., electronic paper) to display a first color scheme associated with a first company or a first brand, and display a second color scheme associated with at least one of a name or a logo of a second company or a second brand, different than the first company or the first brand. For example, the control system may cause the plurality of addressable pixels 1002 (e.g., electronic paper) to display a first advertisement, and display a second advertisement, the second advertisement different than the first advertisement. Thus, dependent on the item being delivered or vended, or service being rendered, the signage or appearance of the vehicle can be modified or updated correspondingly. For example, when delivering or vending product from a first business, the vehicle may bear the signage, logo, name and, or color scheme of the first business. When subsequently delivering or vending product from a second business, the vehicle may bear the signage, logo, name and, or color scheme of the second business. Changes to the appearance of the vehicle can be made in almost real time (e.g., less than a minute), and can be applied across a majority or substantial all of the visible surface area of the vehicle.

Causing the respective optical appearance of the individually addressable pixels to form at least a first identifying indicia at a first time and at least a second identifying indicia at a second time may, for example, include causing presentation of a first sequence of a first plurality of images at the first time, and causing presentation of a second sequence of a second plurality of images at the second time, the second plurality of images different than the first plurality of images. Causing the respective optical appearance of the individually addressable pixels to form at least a first identifying indicia at a first time and at least a second identifying indicia at a second time may, for example, include causing presentation of a first sequence of a first plurality of color schemes at the first time, and causing presentation of a second sequence of a second plurality of color schemes at the second time, the second plurality of color schemes different than the first plurality of color schemes.

The control system may be responsive to signals transmitted by a radio (e.g., cellular radio, WI-FI radio, Bluetooth radio, GPS, GNSS, or GLONASS receiver), a beacon, or an active or a passive wireless transponder (e.g., RFID transponder). The source of the signals may be remote from the vehicle, present at the vehicle, or at a destination that the vehicle approaches.

In some implementations, additional devices may be used to attract attention to and provide additional marketing related to the vehicle. For example, in some implementations, the vehicle may include lighting that runs around the edges and/or exterior side walls, a projector that may be used to project images onto the vehicle and/or onto objects (e.g. buildings) in the surrounding environment, and/or smart glass displays that may be used to create and/or optionally display advertisements along the exterior side walls 1006 of the vehicle.

Figure 11:
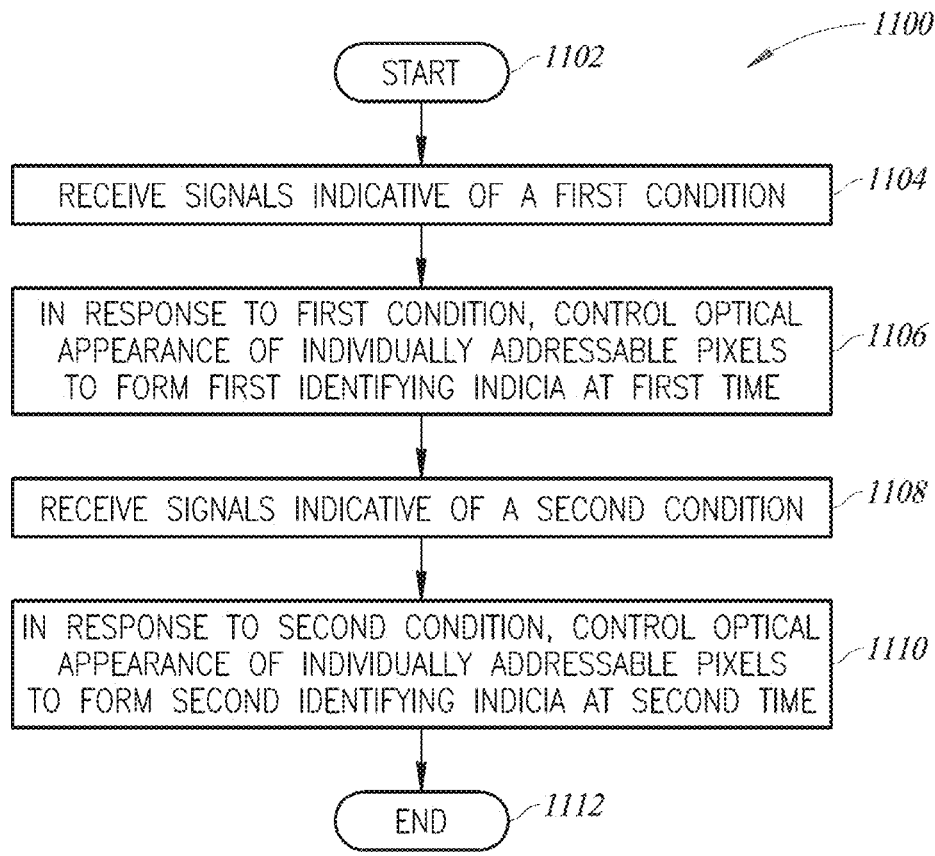
FIG. 11 is a logic flow diagram showing a high level method of operation of a device, for instance an appearance configuration device such as described with reference to FIG. 10, according to one illustrated implementation.

FIG. 11 shows a method 1100 of operation of a device, according to one illustrated implementation. The method 1100 can, for example, be executed by one or more processor-based devices, for instance an appearance configuration device such as described with reference to FIG. 10.

The method 1100, and other methods illustrated and, or described herein may advantageously be performed autonomously, for example without specific user input or intervention. For example, various sensors or transducers may monitor an environment and produce signals indicative of aspects of the environment, for instance absolute position, relative position, distance, time, speed, proximity. Sensors or transducers may additionally, or alternatively, read information, for instance information stored in one or more wireless transponders, for example wireless transponders associated with items to be delivered, tools and, or supplies to be used in rendering services, wireless transponders associated with vehicles to be used in delivering or vending items or making service calls, wireless transponders associated with vehicles and, or with individuals. Such can advantageously allow an appearance of a vehicle to be automatically adjusted to match or correspond to any given situation or set of conditions. For example, an appearance of a vehicle can automatically and, or autonomously adjust based on: a current location of the vehicle, a proximity to a location, for instance a destination such as a delivery destination, based on an item to be delivered or vended or a service to be rendered, a seller of an item or service, a buyer of an item or service, a courier charged with delivering an item, a type of time to be delivered, etc. In some implementations, one or more user inputs can be employed, although completely autonomous operation (i.e., in response to detected conditions without human user input beyond for example ordering the item or services or piloting a vehicle or walking toward a destination) is preferred.

The method 1100 starts at 1102, for example in response to being turned on, receipt of a user input, receipt of a signal, or a call from a calling routine or program.

At 1104, a processor-based device receives signals indicative of a first condition. The signals may be received or collected via one or more sensors, for example sensors that are part of an appearance configuration device or otherwise attached to a vehicle. The signals may be received from one or more processor-based systems that are located remotely from the vehicle and associated appearance configuration device. The signals may provide raw information for which the processor-based device may determine whether a defined condition has be fulfilled or satisfied. For example, the signals may specify a current location of the vehicle, and the processor-based device determines whether the current location of the vehicle is at or within a defined distance of a target location. The signals may provide processor information, for example representing a determination of whether a defined condition has be fulfilled or satisfied.

The signals may, for example, indicate a presence or a proximity of the vehicle (e.g., delivery vehicle) to an item, a tool, or part (e.g., item to be delivered or vended, tool or part to be used in a service call). The signals may, for example, indicate a departure or other movement of the vehicle from a location (e.g., dispatch center, hub). The signals may, for example, indicate presence of the vehicle at, or proximity of the vehicle to, a location, for instance a destination (e.g., delivery destination, service call destination). Proximity may be defined in terms of distance over a non-straight line path, distance over a straight line path (i.e., "as the crow flies"), or estimated travel time, for instance based on real-time conditions. The signals may, for example, indicate reaching or entering a geo-fenced area, for instance a geo-fenced area associated with a destination (e.g., delivery destination, service call destination). Information identifying a location may be, for example, a set of coordinates (e.g., latitude and longitude), an address, an intersection, a defined area (e.g., within 100 feet of an arena entrance), or any other identifying information (e.g., parking lot of the local grocery store).

At 1106, in response to first condition one or more processor-based devices, for instance an appearance configuration device, controls an optical appearance of individually addressable pixels to form first identifying indicia at first time.

As previously explained, the first condition can be a simple existence/non-existence determination (e.g., present/absent). As previously explained, the first condition can require a more substantive determination, e.g., evaluating a current position of the vehicle versus a desired location or position, evaluating a travel time, determining an extent of a geo-fenced area and a relative position (e.g., within, without) the geo-fenced area.

To control an optical appearance of individually addressable pixels to form first identifying indicia at first time, the appearance configuration device or a component thereof (e.g., processor, drive circuitry) sends a set of signals to cause each of a plurality of pixel to enter a defined state. For example, the appearance configuration device or a component thereof (e.g., processor, drive circuitry) can send signals to cause each of a plurality of cells of electronic paper to enter one of two states by, for example applying an electrical potential or polarity to a pair of electrodes of the cell. The cell may be operable between two states (e.g., black, white), and the application may cause the cell to be in one of those two states. The cell remains in the state until the electrical potential or polarity is changed. Alternatively, the appearance configuration device or a component thereof (e.g., processor, drive circuitry) can send signals to cause each of a plurality of pixel of flexible OLED to emit a desired color, for example applying an electrical potential or polarity to a pair of electrodes of the pixel.

The appearance configuration device or a component thereof (e.g., processor, drive circuitry) can employ a set of drive information which may defined a number of visual appearances. Drive information may be pre-defined; that is respective sets of drive information for each of a number of visual appearances may be defined and stored in a memory of the appearance configuration device before receipt of the signals, the selected based on the signals or based on a determination of whether a defined condition is met. Alternatively, some visual appearances can be defined dynamically, for example producing a logo or color scheme that was not previously stored in a memory of the appearance configuration device before receipt of corresponding signals.

At 1108, a processor-based device receives signals indicative of a second condition. This can be similar or even identical to what occurs at 1104, although the signals themselves may be different and represent different specific information, although of the same type of information as represented at 1104.

At 1110, in response to the second one or more processor-based devices, for instance an appearance configuration device, controls an optical appearance of individually addressable pixels to form first identifying indicia at first time. This can be similar or even identical to what occurs in 1106, although the visual appearance will differ in some respect.

The method 1100 may terminate at 1112 until called again, although in at least some implementations there may be numerous iterations of the various acts prior to termination.

Figure 12:
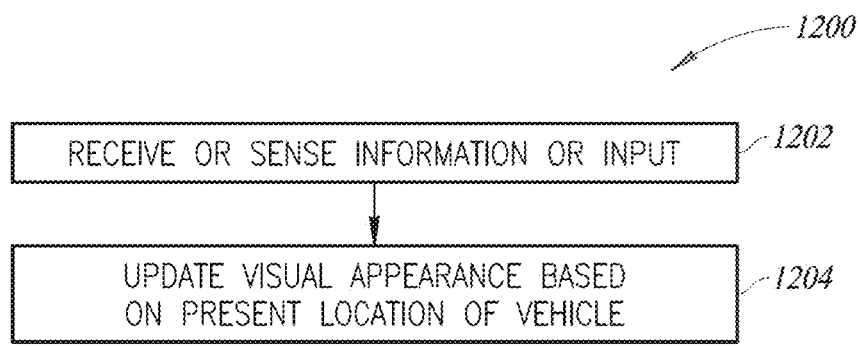
FIG. 12 is a logic flow diagram showing a low level method of operation of a device, for instance an appearance configuration device such as described with reference to FIG. 10, based on a condition, according to one illustrated implementation.

FIG. 12 shows a method 1200 of operation of a device, according to one illustrated implementation. The method 1200 can, for example, be executed by one or more processor-based devices, for instance an appearance configuration device such as described with reference to FIG. 10. The method 1200 may be executed as part of the execution of method 1100 (FIG. 11).

At 1202, a processor-based device receives signals or senses information or input that is indicative of a condition, for example a location of an appearance configuration device, and hence a location of an associated vehicle.

At 1204, a processor-based device or component thereof updates a visual appearance of the vehicle based on a present location of the vehicle. For example, a processor-based device or component thereof (drive circuitry) may send a set of drive signals to set a state of one or more addressable pixels (e.g., pixels of electronic paper, pixels of flexible OLED) that is part of, or carried by the vehicle.

Figure 13:
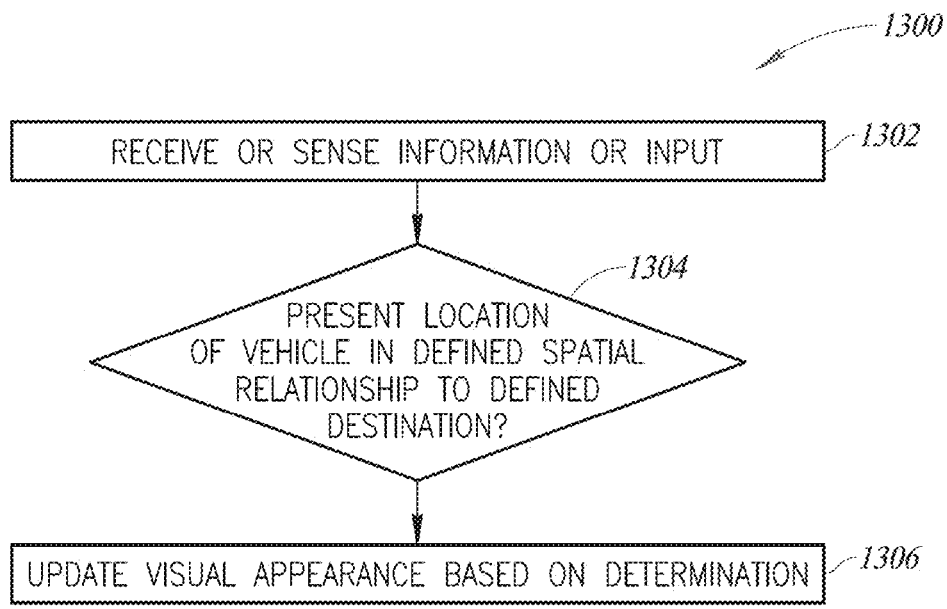
FIG. 13 is a logic flow diagram showing a low level method of operation of a device, for instance an appearance configuration device such as described with reference to FIG. 10, based on a condition, according to one illustrated implementation.

FIG. 13 shows a method 1300 of operation of a device, according to one illustrated implementation. The method 1300 can, for example, be executed by one or more processor-based devices, for instance an appearance configuration device such as described with reference to FIG. 10. The method 1300 may be executed as part of the execution of method 1100 (FIG. 11).

At 1302, a processor-based device receives signals or senses information or input that is indicative of a condition, for example a defined spatial relationship of a location of an appearance configuration device with respect to a defined destination, and hence a defined spatial relationship of an associated vehicle with respect to the defined destination.

At 1304, a processor-based device or component thereof determines whether a present location of the appearance configuration device, and hence the vehicle, is in a defined spatial relationship with respect to a defined destination.

At 1306, a processor-based device or component thereof updates a visual appearance of the vehicle based at least in part on the determination whether a present location of the appearance configuration device, and hence the vehicle, is in a defined spatial relationship with respect to a defined destination. For example, a processor-based device or component thereof (drive circuitry) may send a set of drive signals to set a state of one or more addressable pixels (e.g., pixels of electronic paper, pixels of flexible OLED) that is part of, or carried by the vehicle.

Figure 14:
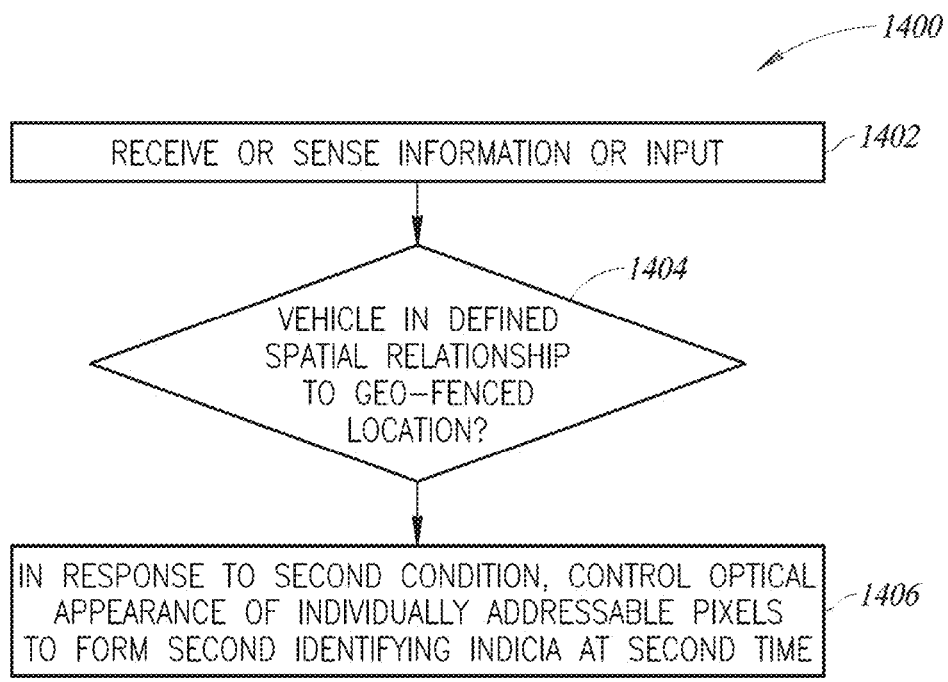
FIG. 14 is a logic flow diagram showing a low level method of operation of a device, for instance an appearance configuration device such as described with reference to FIG. 10, based on a condition, according to one illustrated implementation.

FIG. 14 shows a method 1400 of operation of a device, according to one illustrated implementation. The method 1400 can, for example, be executed by one or more processor-based devices, for instance an appearance configuration device such as described with reference to FIG. 10. The method 1400 may be executed as part of the execution of method 1100 (FIG. 11).

At 1402, a processor-based device receives signals or senses information or input that is indicative of a condition, for example a defined spatial relationship of a location of an appearance configuration device with respect to a geo-fenced location or geo-fenced area, and hence a defined spatial relationship of an associated vehicle with respect to the geo-fenced location or geo-fenced area.

At 1404, a processor-based device or component thereof determines whether a present location of the appearance configuration device, and hence the vehicle, is in a defined spatial relationship with respect to a defined geo-fenced location or defined geo-fenced area.

At 1406, a processor-based device or component thereof updates a visual appearance of the vehicle based at least in part on the determination whether a present location of the appearance configuration device, and hence the vehicle, is in a defined spatial relationship with respect to a defined geo-fenced location or defined geo-fenced area. For example, a processor-based device or component thereof (drive circuitry) may send a set of drive signals to set a state of one or more addressable pixels (e.g., pixels of electronic paper, pixels of flexible OLED) that is part of, or carried by the garment.

Figure 15:
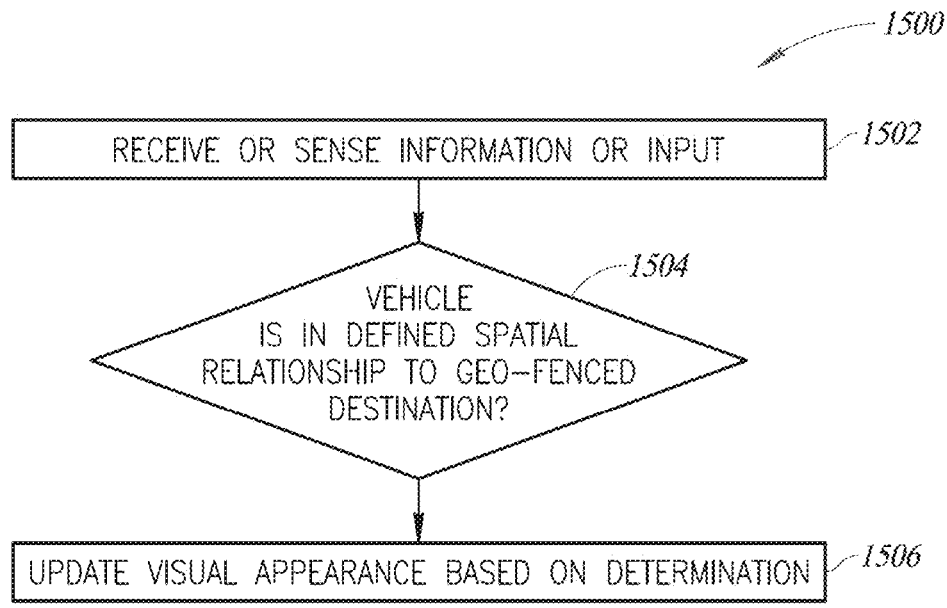
FIG. 15 is a logic flow diagram showing a low level method of operation of a device, for instance an appearance configuration device such as described with reference to FIG. 10, based on a condition, according to one illustrated implementation.

FIG. 15 shows a method 1500 of operation of a device, according to one illustrated implementation. The method 1500 can, for example, be executed by one or more processor-based devices, for instance an appearance configuration device such as described with reference to FIG. 10. The method 1500 may be executed as part of the execution of method 1100 (FIG. 11).

At 1502, a processor-based device receives signals or senses information or input that is indicative of a condition, for example a defined spatial relationship of a location of an appearance configuration device with respect to a geo-fenced location or geo-fenced area, and hence a defined spatial relationship of an associated vehicle with respect to the geo-fenced destination.

At 1504, a processor-based device or component thereof determines whether a present location of the appearance configuration device, and hence the vehicle, is in a defined spatial relationship with respect to a defined geo-fenced destination.

At 1506, a processor-based device or component thereof updates a visual appearance of the vehicle based at least in part on the determination whether a present location of the appearance configuration device, and hence the vehicle, is in a defined spatial relationship with respect to a defined geo-fenced destination. For example, a processor-based device or component thereof (drive circuitry) may send a set of drive signals to set a state of one or more addressable pixels (e.g., pixels of electronic paper, pixels of flexible OLED) that is part of, or carried by the vehicle.

Figure 16:
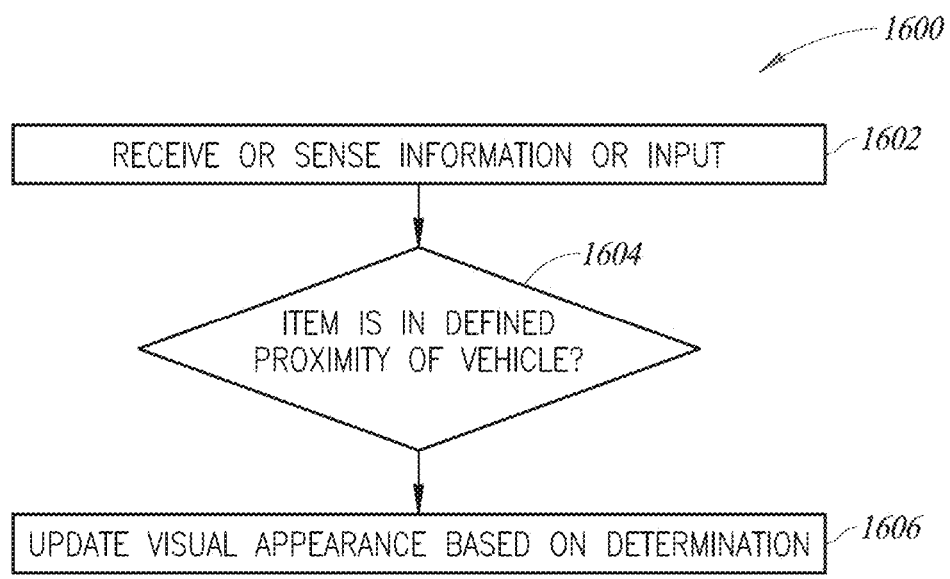
FIG. 16 is a logic flow diagram showing a low level method of operation of a device, for instance an appearance configuration device such as described with reference to FIG. 10, based on a condition, according to one illustrated implementation.

FIG. 16 shows a method 1600 of operation of a device, according to one illustrated implementation. The method 1600 can, for example, be executed by one or more processor-based devices, for instance an appearance configuration device such as described with reference to FIG. 10. The method 1600 may be executed as part of the execution of method 1100 (FIG. 11).

At 1602, a processor-based device receives signals or senses information or input that is indicative of a condition, for example a present location of an item, tool or supplies relative to a present location of an appearance configuration device, and hence a present location of an associated vehicle.

At 1604, a processor-based device or component thereof determines whether an item, tool or supplies are in or within a defined proximity of a present location of an appearance configuration device, and hence a defined proximity of an associated vehicle.

At 1606, a processor-based device or component thereof updates a visual appearance of the vehicle based at least in part on the determination whether the item, tool or supplies are in or within a defined proximity of the present location of an appearance configuration device, and hence a defined proximity of an associated vehicle. For example, a processor-based device or component thereof (drive circuitry) may send a set of drive signals to set a state of one or more addressable pixels (e.g., pixels of electronic paper, pixels of flexible OLED) that is part of, or carried by the vehicle.

Figure 17:
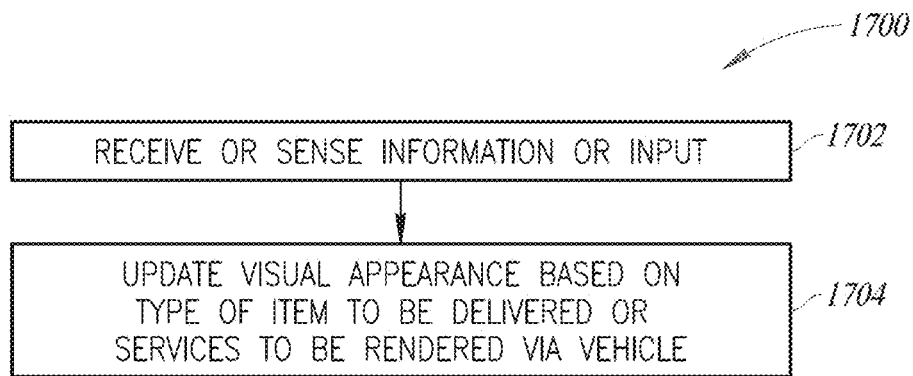
FIG. 17 is a logic flow diagram showing a low level method of operation of a device, for instance an appearance configuration device such as described with reference to FIG. 10, based on a condition, according to one illustrated implementation.

FIG. 17 shows a method 1700 of operation of a device, according to one illustrated implementation. The method 1700 can, for example, be executed by one or more processor-based devices, for instance an appearance configuration device such as described with reference to FIG. 10. The method 1700 may be executed as part of the execution of method 1100 (FIG. 11).

At 1702, a processor-based device receives signals or senses information or input that is indicative of a condition, for example a type of item to be delivered or a type of services to be rendered via the vehicle.

At 1704, a processor-based device or component thereof updates a visual appearance of the vehicle based at least in part on the determination of the type of item to be delivered or the type of services to be rendered. For example, a processor-based device or component thereof (drive circuitry) may send a set of drive signals to set a state of one or more addressable pixels (e.g., pixels of electronic paper, pixels of flexible OLED) that is part of, or carried by the vehicle.

Figure 18:
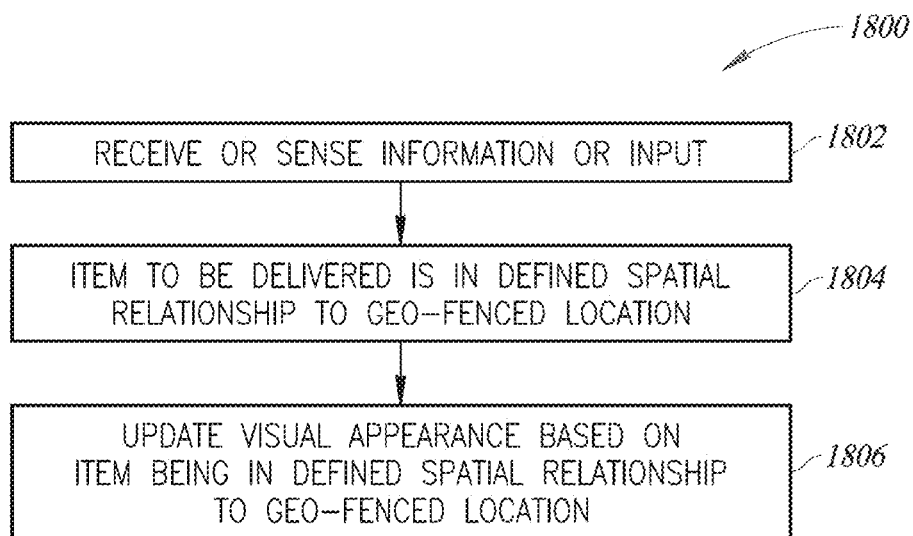
FIG. 18 is a logic flow diagram showing a low level method of operation of a device, for instance an appearance configuration device such as described with reference to FIG. 10, based on a condition, according to one illustrated implementation.

FIG. 18 shows a method 1800 of operation of a device, according to one illustrated implementation. The method 1800 can, for example, be executed by one or more processor-based devices, for instance an appearance configuration device such as described with reference to FIG. 10. The method 1800 may be executed as part of the execution of method 1100 (FIG. 11).

At 1802, a processor-based device receives signals or senses information or input that is indicative of a condition, for example a present location of an item to be delivered, or a tool or supplies to be used in rendering services.

At 1804, a processor-based device or component thereof determines whether a present location of the item, tool or supplies is in or within a defined spatial relationship with respect to a defined geo-fenced location or geo-fenced area.

At 1806, a processor-based device or component thereof updates a visual appearance of the vehicle based at least in part on the determination whether a present location of the item, tool or supplies is in or within a defined spatial relationship with respect to a defined geo-fenced location or geo-fenced area. For example, a processor-based device or component thereof (drive circuitry) may send a set of drive signals to set a state of one or more addressable pixels (e.g., pixels of electronic paper, pixels of flexible OLED) that is part of, or carried by the vehicle.

Figure 19:
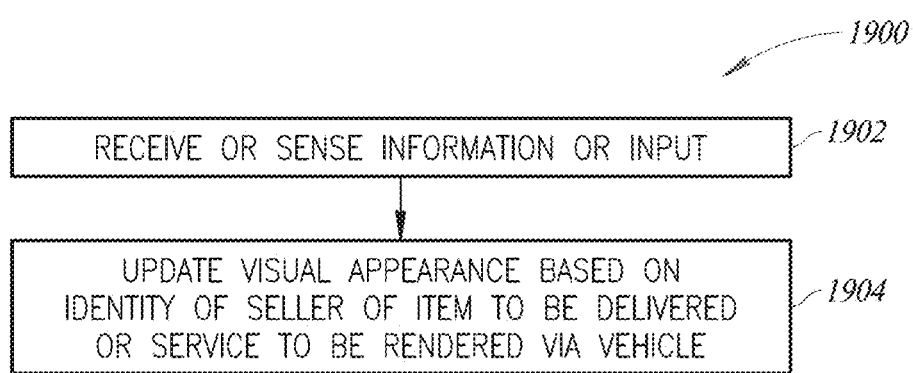
FIG. 19 is a logic flow diagram showing a low level method of operation of a device, for instance an appearance configuration device such as described with reference to FIG. 10, based on a condition, according to one illustrated implementation.

FIG. 19 shows a method 1900 of operation of a device, according to one illustrated implementation. The method 1900 can, for example, be executed by one or more processor-based devices, for instance an appearance configuration device such as described with reference to FIG. 10. The method 1900 may be executed as part of the execution of method 1100 (FIG. 11).

At 1902, a processor-based device receives signals or senses information or input that is indicative of a condition, for example an identity of a seller of an item to be delivered or provider of a service to be rendered via a vehicle.

At 1904, a processor-based device or component thereof updates a visual appearance of the vehicle based at least in part on the determination of the identity of a seller of an item to be delivered or of the provider of a service to be rendered. For example, a processor-based device or component thereof (drive circuitry) may send a set of drive signals to set a state of one or more addressable pixels (e.g., pixels of electronic paper, pixels of flexible OLED) that is part of, or carried by the vehicle.

Figure 20:
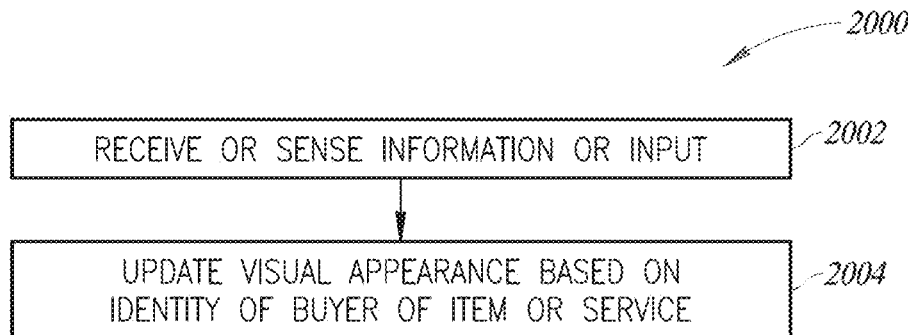
FIG. 20 is a logic flow diagram showing a low level method of operation of a device, for instance an appearance configuration device such as described with reference to FIG. 10, based on a condition, according to one illustrated implementation.

FIG. 20 shows a method 2000 of operation of a device, according to one illustrated implementation. The method 2000 can, for example, be executed by one or more processor-based devices, for instance an appearance configuration device such as described with reference to FIG. 10. The method 2000 may be executed as part of the execution of method 1100 (FIG. 11).

At 2002, a processor-based device receives signals or senses information or input that is indicative of a condition, for example an identity of a buyer of an item to be delivered or of a service to be rendered via a vehicle.

At 2004, a processor-based device or component thereof updates a visual appearance of the vehicle based at least in part on the determination of the identity of a buyer of an item to be delivered or of a service to be rendered. For example, a processor-based device or component thereof (drive circuitry) may send a set of drive signals to set a state of one or more addressable pixels (e.g., pixels of electronic paper, pixels of flexible OLED) that is part of, or carried by the vehicle.

Figure 21:
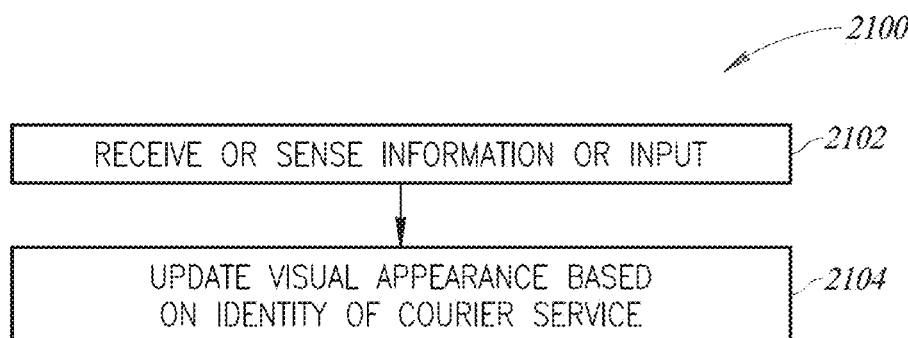
FIG. 21 is a logic flow diagram showing a low level method of operation of a device, for instance an appearance configuration device such as described with reference to FIG. 10, based on a condition, according to one illustrated implementation.

FIG. 21 shows a method 2100 of operation of a device, according to one illustrated implementation. The method 2100 can, for example, be executed by one or more processor-based devices, for instance an appearance configuration device such as described with reference to FIG. 10. The method 2100 may be executed as part of the execution of method 1100 (FIG. 11).

At 2102, a processor-based device receives signals or senses information or input that is indicative of a condition, for example an identity of a courier service charged with delivery of an item or of a service to be rendered via a vehicle.

At 2104, a processor-based device or component thereof updates a visual appearance of the vehicle based at least in part on the determination of the identity of the courier service. For example, a processor-based device or component thereof (drive circuitry) may send a set of drive signals to set a state of one or more addressable pixels (e.g., pixels of electronic paper, pixels of flexible OLED) that is part of, or carried by the vehicle.

Figure 22:
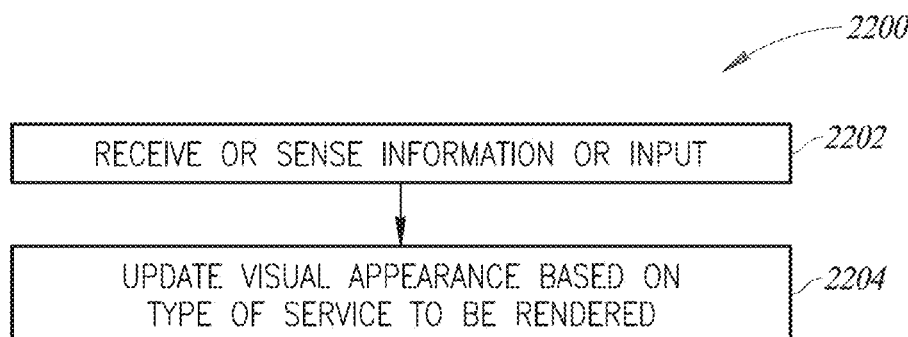
FIG. 22 is a logic flow diagram showing a low level method of operation of a device, for instance an appearance configuration device such as described with reference to FIG. 10, based on a condition, according to one illustrated implementation.

FIG. 22 shows a method 2200 of operation of a device, according to one illustrated implementation. The method 2200 can, for example, be executed by one or more processor-based devices, for instance an appearance configuration device such as described with reference to FIG. 10. The method 2200 may be executed as part of the execution of method 1100 (FIG. 11).

At 2202, a processor-based device receives signals or senses information or input that is indicative of a condition, for example an identification of a type of service to be rendered via the vehicle.

At 2204, a processor-based device or component thereof updates a visual appearance of the vehicle based at least in part on the determination of the identity of the type of service to be rendered via the vehicle. For example, a processor-based device or component thereof (drive circuitry) may send a set of drive signals to set a state of one or more addressable pixels (e.g., pixels of electronic paper, pixels of flexible OLED) that is part of, or carried by the vehicle.

Figure 23:
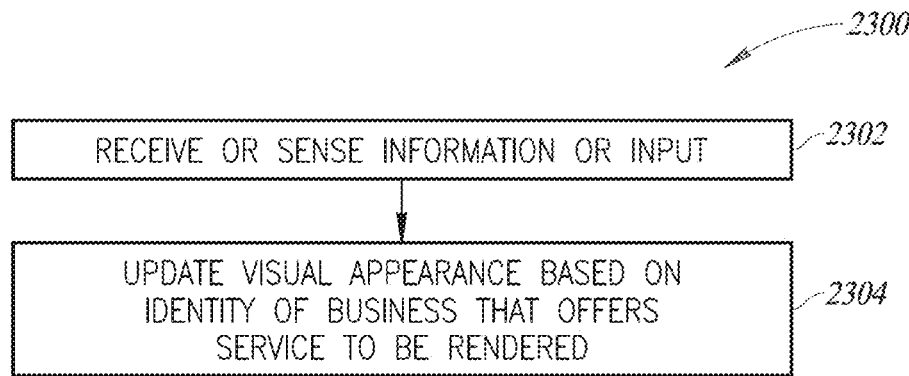
FIG. 23 is a logic flow diagram showing a low level method of operation of a device, for instance an appearance configuration device such as described with reference to FIG. 10, based on a condition, according to one illustrated implementation.

FIG. 23 shows a method 2300 of operation of a device, according to one illustrated implementation. The method 2300 can, for example, be executed by one or more processor-based devices, for instance an appearance configuration device such as described with reference to FIG. 10. The method 2300 may be executed as part of the execution of method 1100 (FIG. 11).

At 2302, a processor-based device receives signals or senses information or input that is indicative of a condition, for example an identity of a business that offers service to be rendered via a vehicle.

At 2304, a processor-based device or component thereof updates a visual appearance of the vehicle based at least in part on the determination of the identity of the business that offers service to be rendered. For example, a processor-based device or component thereof (drive circuitry) may send a set of drive signals to set a state of one or more addressable pixels (e.g., pixels of electronic paper, pixels of flexible OLED) that is part of, or carried by the vehicle.

Figure 24:
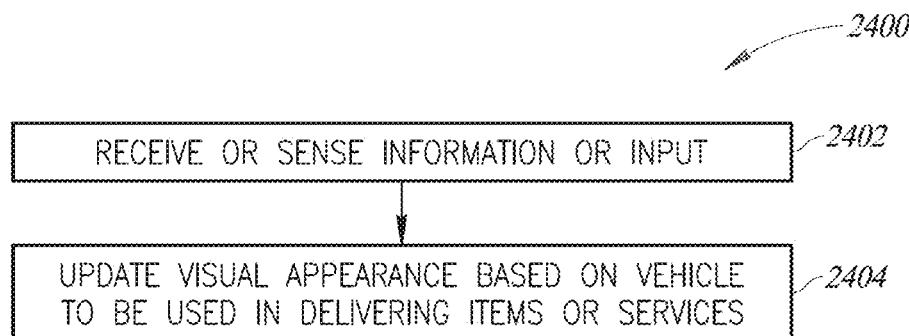
FIG. 24 is a logic flow diagram showing a low level method of operation of a device, for instance an appearance configuration device such as described with reference to FIG. 10, based on a condition, according to one illustrated implementation.

FIG. 24 shows a method 2400 of operation of a device, according to one illustrated implementation. The method 2400 can, for example, be executed by one or more processor-based devices, for instance an appearance configuration device such as described with reference to FIG. 10. The method 2400 may be executed as part of the execution of method 1100 (FIG. 11).

At 2402, a processor-based device receives signals or senses information or input that is indicative of a condition, for example a unique identity (e.g., Vehicle Identification Number (VIN)) of a vehicle, a type of vehicle, and, or a make and model of a vehicle, to be used in the delivery of items or services to be rendered.

At 2404, a processor-based device or component thereof updates a visual appearance of the vehicle based at least in part on the determination of the identity of the vehicle to be used in the delivery of items or services to be rendered. For example, a processor-based device or component thereof (drive circuitry) may send a set of drive signals to set a state of one or more addressable pixels (e.g., pixels of electronic paper, pixels of flexible OLED) that is part of, or carried by the vehicle.

Figure 25:
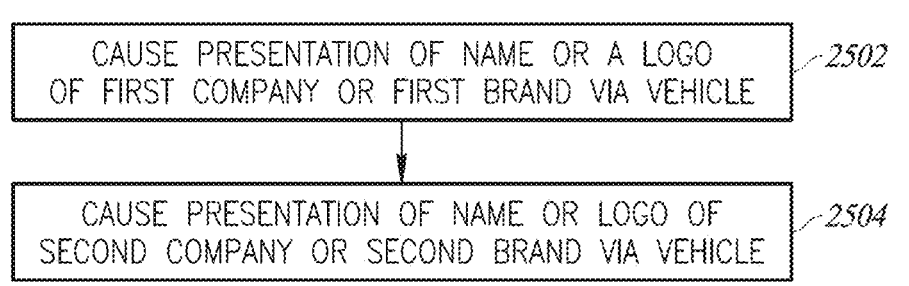
FIG. 25 is a logic flow diagram showing a low level method of operation of a device, for instance an appearance configuration device such as described with reference to FIG. 10, based on a condition, according to one illustrated implementation.

FIG. 25 shows a method 2500 of operation of a device, according to one illustrated implementation. The method 2500 can, for example, be executed by one or more processor-based devices, for instance an appearance configuration device such as described with reference to FIG. 10. The method 2500 may be executed as part of the execution of method 1100 (FIG. 11).

At 2502, a processor-based device or component thereof sets a visual appearance of the vehicle to present a name or a logo of a first company or a first brand. For example, a processor-based device or component thereof (drive circuitry) may send a set of drive signals to set a state of one or more addressable pixels (e.g., pixels of electronic paper, pixels of flexible OLED) that is part of, or carried by the vehicle.

At 2504, a processor-based device or component thereof sets a visual appearance of the vehicle to present a name or a logo of a second company or a second brand. For example, a processor-based device or component thereof (drive circuitry) may send a set of drive signals to set a state of one or more addressable pixels (e.g., pixels of electronic paper, pixels of flexible OLED) that is part of, or carried by the vehicle.

Such can, for example, follow the presentation of the name or logo first color scheme associated with the first company or the first brand via the same vehicle. The name or logo associated with the second company or the second brand may be different in one or more respects from the name or logo associated with the first company or the first brand. The second company may be different from the first company. The second brand may be different from the first brand, and may be owned by a different company than the company that owns the first brand or may be owned by the same company that owns the first brand.

Figure 26:
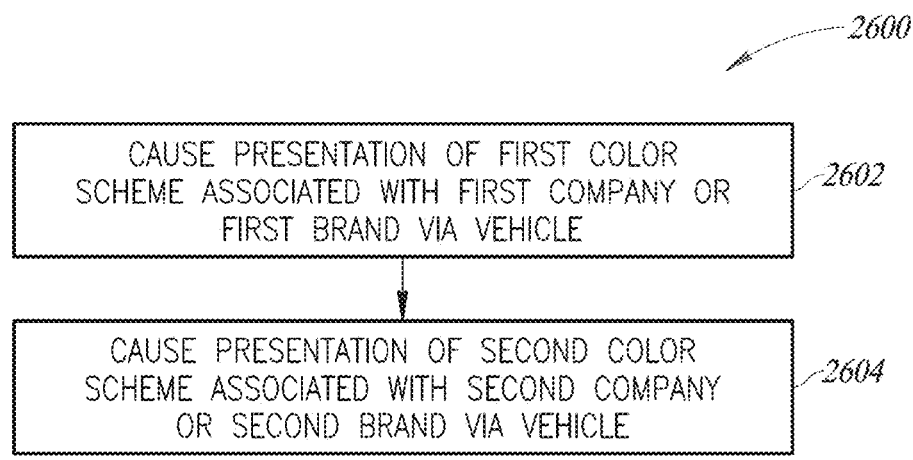
FIG. 26 is a logic flow diagram showing a low level method of operation of a device, for instance an appearance configuration device such as described with reference to FIG. 10, based on a condition, according to one illustrated implementation.

FIG. 26 shows a method 2600 of operation of a device, according to one illustrated implementation. The method 2600 can, for example, be executed by one or more processor-based devices, for instance an appearance configuration device such as described with reference to FIG. 10. The method 2600 may be executed as part of the execution of method 1100 (FIG. 11).

At 2602, a processor-based device or component thereof sets a visual appearance of the vehicle to present a first color scheme associated with a first company or a first brand. For example, a processor-based device or component thereof (drive circuitry) may send a set of drive signals to set a state of one or more addressable pixels (e.g., pixels of electronic paper, pixels of flexible OLED) that is part of, or carried by the vehicle.

At 2604, a processor-based device or component thereof sets a visual appearance of the vehicle to present a second color scheme associated with a second company or a second brand. For example, a processor-based device or component thereof (drive circuitry) may send a set of drive signals to set a state of one or more addressable pixels (e.g., pixels of electronic paper, pixels of flexible OLED) that is part of, or carried by the vehicle.

Such can, for example, follow the presentation of the first color scheme associated with the first company or the first brand via the same vehicle. The second color scheme associated with the second company or the second brand may be different in one or more respects from the first color scheme associated with the first company or the first brand. The second company may be different from the first company. The second brand may be different from the first brand, and may be owned by a different company than the company that owns the first brand or may be owned by the same company that owns the first brand.

Figure 27:
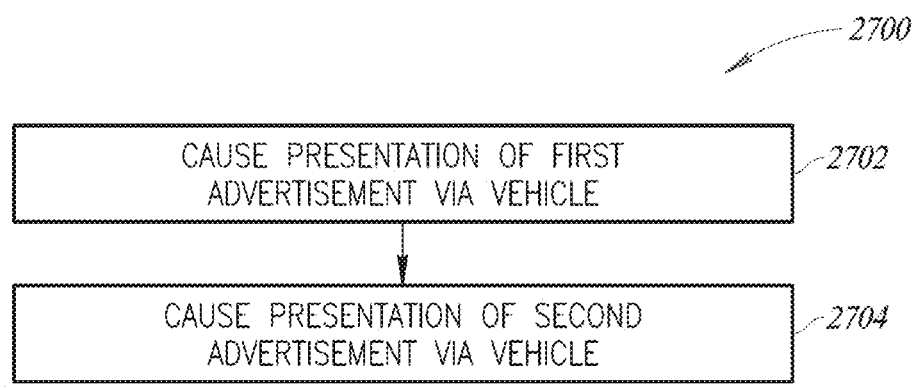
FIG. 27 is a logic flow diagram showing a low level method of operation of a device, for instance an appearance configuration device such as described with reference to FIG. 10, based on a condition, according to one illustrated implementation.

FIG. 27 shows a method 2700 of operation of a device, according to one illustrated implementation. The method 2700 can, for example, be executed by one or more processor-based devices, for instance an appearance configuration device such as described with reference to FIG. 10. The method 2700 may be executed as part of the execution of method 1100 (FIG. 11).

At 2702, a processor-based device or component thereof sets a visual appearance of the vehicle to present a first advertisement. For example, a processor-based device or component thereof (drive circuitry) may send a set of drive signals to set a state of one or more addressable pixels (e.g., pixels of electronic paper, pixels of flexible OLED) that is part of, or carried by the vehicle.

At 2704, a processor-based device or component thereof sets a visual appearance of the vehicle to present a second advertisement. For example, a processor-based device or component thereof (drive circuitry) may send a set of drive signals to set a state of one or more addressable pixels (e.g., pixels of electronic paper, pixels of flexible OLED) that is part of, or carried by the vehicle.

Presentation of the second advertisement can, for example, follow the presentation of the first advertisement via the same vehicle. The first advertisement may, for example, be associated with a first company or a first brand. The second advertisement may, for example, be associated with a second company or a second brand. The second advertisement may be different in one or more respects from the first advertisement. The second company may be different from the first company. The second brand may be different from the first brand, and may be owned by a different company than the company that owns the first brand or may be owned by the same company that owns the first brand.

Figure 28:
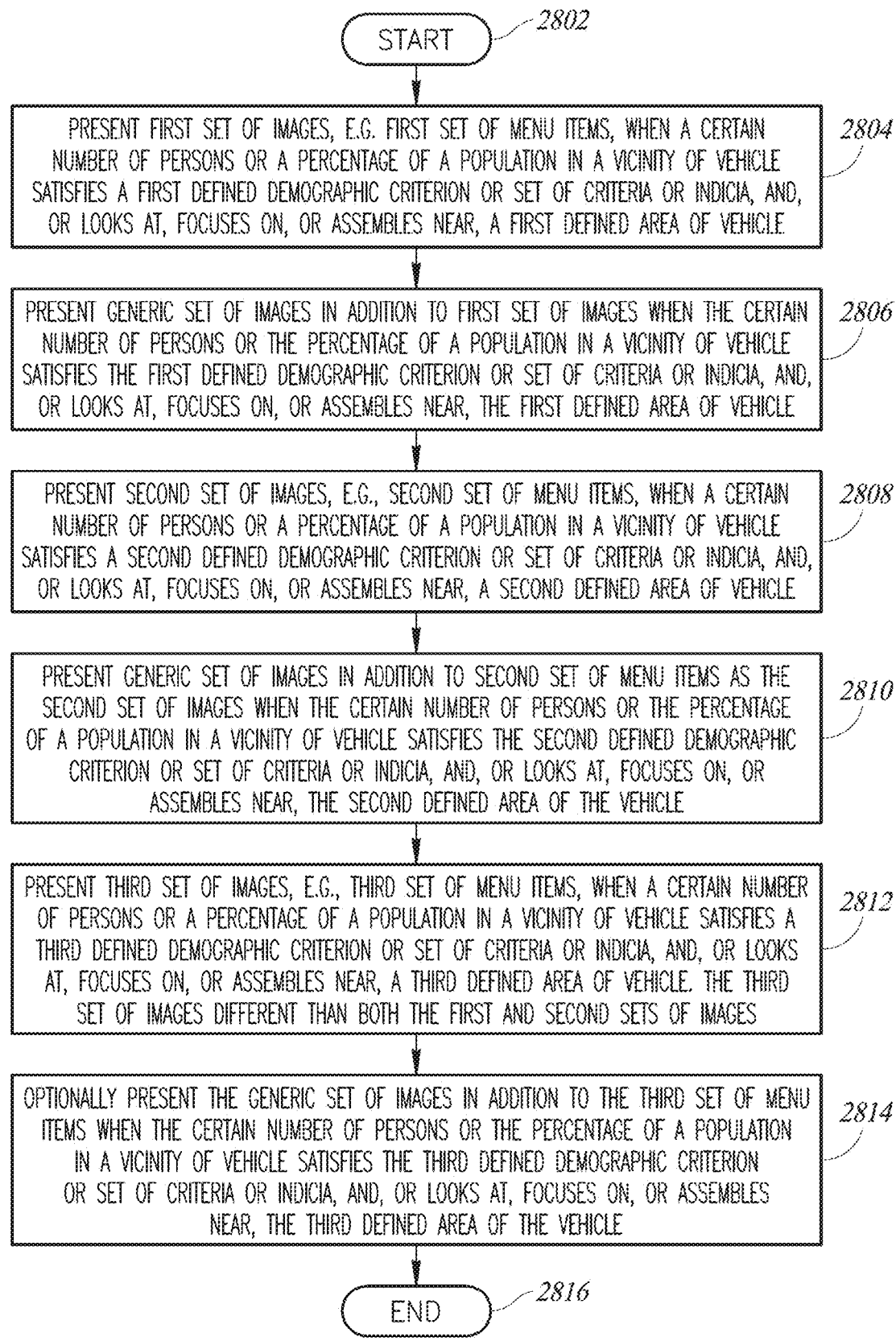
FIG. 28 is a logic flow diagram of a low level method of updating a presentation of information in operation of a vehicle, according to one illustrated implementation.

FIG. 28 shows a low level method 2800 of updating a presentation of information in operation of a vehicle 100, according to at least one illustrated implementation. The method 2800 may be executed in order to update presentation of information based on contextual information 310 (FIG. 3).

The method 2800 starts at 2802, for example in response to a call by a calling routine, application of power to the vehicle or to on-board control system 150.

At 2804, a processor-based device, for example, the on-board control system 150 causes a presentation of a first set of images when a certain number of persons or a percentage of a population in a vicinity of vehicle 100 satisfies a first defined demographic criterion or set of criteria or indicia, and, or when a certain number of persons or a percentage of a population in a vicinity of vehicle 100 looks at, focuses on, or assembles near, a first defined area of vehicle 100. The first set of images may, for example comprise a first set of menu items 900a (FIG. 9A) which can be ordered or requested or bought, for instance a set of relatively expensive menu items. The on-board control system 150 may, for example, cause one or more displays to present a first menu. The presentation can present the entire first menu simultaneously, or may sequentially present portions of the first menu, for example via scrolling or paging presentations.

At 2806, a processor-based device, for example, the on-board control system 150 optionally causes a presentation of a generic set of images in addition to the first set of images when the certain number of persons or the percentage of a population in a vicinity of vehicle 100 satisfies the first defined demographic criterion or set of criteria or indicia, and, or when the certain number of persons or the percentage of a population in a vicinity of vehicle 100 looks at, focuses on, or assembles near, the first defined area of vehicle 100. The generic images may correspond to branding that is generic to multiple sets of items that can be offered, for example a trademark for a company that operates the vehicle.

At 2808, a processor-based device, for example, the on-board control system 150 causes a presentation of a second set of images when a certain number of persons or a percentage of a population in a vicinity of vehicle 100 satisfies a second defined demographic criterion or set of criteria or indicia, and, or when a certain number of persons or a percentage of a population in a vicinity of vehicle 100 looks at, focuses on, or assembles near, a second defined area of vehicle 100. The second set of images is different than the first set of images, and may even be mutually exclusive. The second set of images may, for example comprise a second set of menu items 900b (FIG. 9B) which can be ordered or requested or bought, for instance a set of relatively inexpensive menu items. The on-board control system 150 may, for example, cause one or more displays to present a second menu. The presentation can present the entire second menu simultaneously, or may sequentially present portions of the second menu, for example via scrolling or paging presentations.

At 2810, a processor-based device, for example, the on-board control system 150 optionally causes a presentation of the generic set of images in addition to the second set of menu items such as the second set of images when the certain number of persons or the percentage of a population in a vicinity of vehicle 100 satisfies a second defined demographic criterion or set of criteria or indicia, and, or when the certain number of persons or the percentage of a population in a vicinity of vehicle 100 looks at, focuses on, or assembles near, the second defined area of vehicle 100. Again, the generic images may correspond to branding that is generic to multiple sets of items that can be offered, for example a trademark for a company that operates the vehicle.

At 2812, a processor-based device, for example, the on-board control system 150 causes a presentation of a third set of images, when a certain number of persons or percentage of a population in a vicinity of vehicle 100 satisfies a third defined demographic criterion or set of criteria or indicia, and, or when a certain number of persons or a percentage of a population in a vicinity of vehicle 100 looks at, focuses on, or assembles near, a third defined area of vehicle 100. The third set of images is different than the first and the second sets of images, and may even be mutually exclusive. The third set of images may, for example comprise a third set of menu items 900c (FIG. 9C) which can be ordered or requested or bought, for instance a set of menu items that are relatively more expensive compared to the second set of menu items and relatively less expensive than the first set of menu items. The on-board control system 150 may, for example, cause one or more displays to present a third menu. The presentation can present the entire third menu simultaneously, or may sequentially present portions of the third menu, for example via scrolling or paging presentations.

At 2814, a processor-based device, for example, the on-board control system 150 optionally causes a presentation of the generic set of images in addition to the third set of menu items when the certain number of persons or the percentage of a population in a vicinity of vehicle 100 satisfies the third defined demographic criterion or set of criteria or indicia, and, or when the certain number of persons or the percentage of a population in the vicinity of vehicle 100 looks at, focuses on, or assembles near, the third defined area of vehicle 100.

The method 2800 terminates at 2816, for example until invoked again. Alternatively, the method 2800 may repeat continuously or repeatedly, or may execute as multiple instances of a multi-threaded process.

Figure 29:
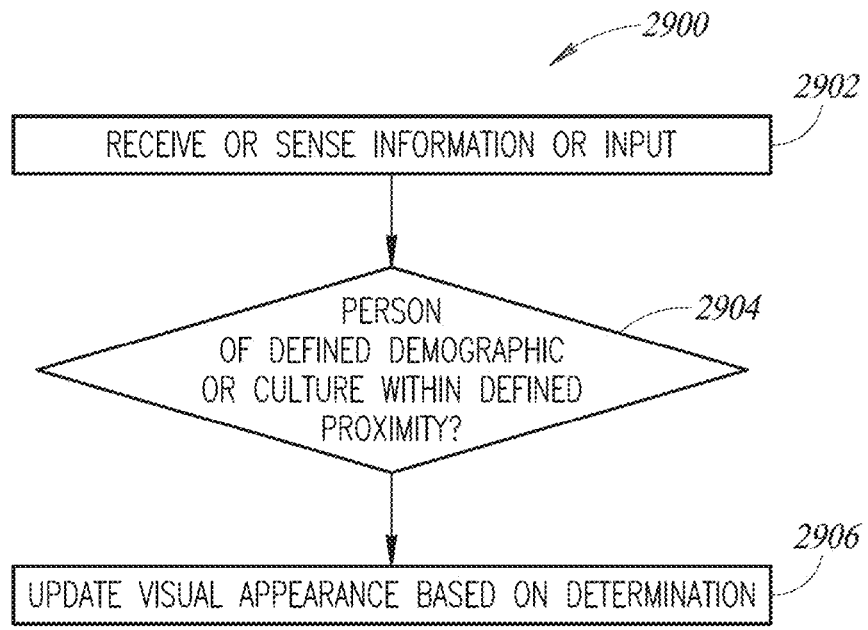
FIG. 29 is a logic flow diagram showing a low level method of operation of a device, for instance an appearance configuration device such as described with reference to FIG. 10, based on a condition, according to one illustrated implementation.

FIG. 29 shows a method 2900 of operation of a device, according to one illustrated implementation. The method 2900 can, for example, be executed by one or more processor-based devices, for instance an appearance configuration device such as described with reference to FIG. 10. The method 2900 may be executed as part of the execution of method 1100 (FIG. 11).

At 2902, a processor-based device receives signals or senses information or input that is indicative of a condition, for example, a present location of a person of a defined demographic relative to a present location of an appearance configuration device or an image-based detection system, and hence a present location of an associated vehicle.

At 2904, a processor-based device or component thereof determines whether a person of a defined demographic or culture is in or within a defined proximity of the appearance configuration device or image-based detection system, and hence a defined proximity of an associated vehicle.

At 2906, a processor-based device or component thereof updates a visual appearance of the vehicle or a portion thereof (such as displays, for instance) based at least in part on the determination whether a person satisfying a defined demographic criterion is in or within a defined proximity of the present location of an appearance configuration device or an image-based detection system, and hence a defined proximity of an associated vehicle. For example, a processor-based device or component thereof (drive circuitry) may send a set of drive signals to set a state of one or more addressable pixels (e.g., pixels of electronic paper, pixels of flexible OLED) that is part of, or carried by the vehicle, or may update, modify, or otherwise selectively control output of one or more displays as set forth above.

Figure 30:
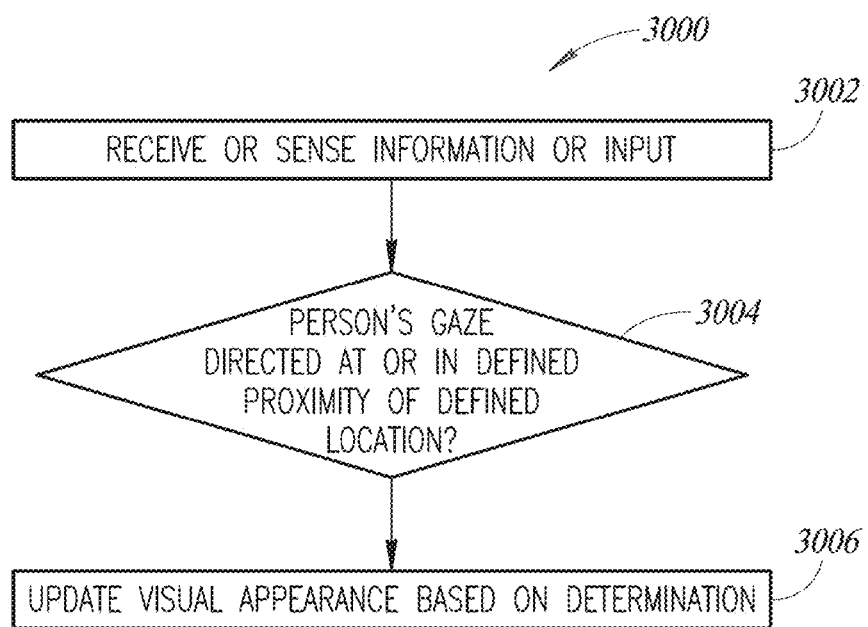
FIG. 30 is a logic flow diagram showing a low level method of operation of a device, for instance an appearance configuration device such as described with reference to FIG. 10, based on a condition, according to one illustrated implementation.

FIG. 30 shows a method 3000 of operation of a device, according to one illustrated implementation. The method 3000 can, for example, be executed by one or more processor-based devices, for instance an appearance configuration device such as described with reference to FIG. 10. The method 3000 may be executed as part of the execution of method 1100 (FIG. 11).

At 3002, a processor-based device receives signals or senses information or input that is indicative of a condition, for example, a present location of a person's gaze relative to a defined location on an appearance configuration device or an image-based detection system.

At 3004, a processor-based device or component thereof determines whether a person's gaze is directed at or within a defined proximity of a defined location on an appearance configuration device or an image-based detection system.

At 3006, a processor-based device or component thereof updates a visual appearance of the vehicle or a portion thereof (such as displays, for instance) based at least in part on the determination whether a person's gaze is directed at or within a defined proximity of a defined location on an appearance configuration device or an image-based detection system. For example, a processor-based device or component thereof (drive circuitry) may send a set of drive signals to set a state of one or more addressable pixels (e.g., pixels of electronic paper, pixels of flexible OLED) that is part of, or carried by the vehicle, or may update, modify, or otherwise selectively control output of one or more displays as set forth above.

Figure 31A:
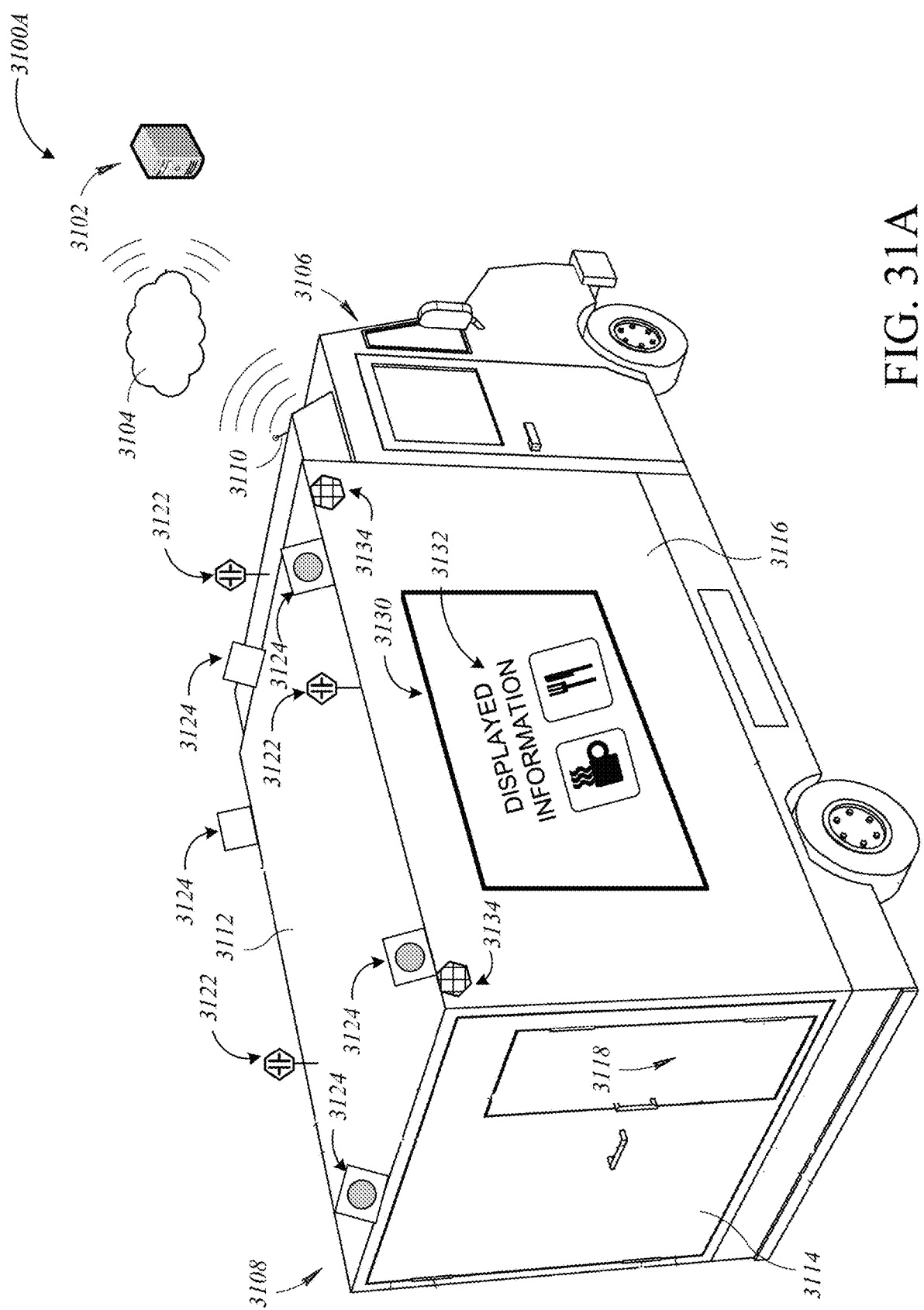
FIG. 31A is an isometric exterior view of a consumable delivery vehicle with a context sensitive display and on-board sensors, according to at least one illustrated implementation.

FIG. 31A is an isometric exterior view of a consumable delivery vehicle with a context sensitive display and on-board sensors, according to at least one illustrated implementation.

Diagram 3100A shows an exterior view of a delivery truck that includes a cab portion 3106 and a cargo portion 3108, according to at least one illustrated implementation. The delivery truck may further include a wireless communications interface, such as one or more antennas 314 coupled to an internally installed transceiver. The one or more antenna 3110 may, for example, be located on or above the roof of the cab portion 3106. The antenna(s) 3110 may be communicatively coupled to enable communication between components on the delivery truck and a remote control system 3102 located remotely from the delivery truck via a communications network 3104. The cargo portion 3108 may include a top side 3112, a left exterior side wall (not shown) and a right exterior side wall 3116 (collectively exterior side walls 3116), a back wall 3114, and a bottom side (not shown). The dimensions (width, length, and height) of the cargo portion 3108 may be based on local or state ordinances regarding delivery, such as, for example, local or state ordinances governing food delivery vehicles, as well as, delivery environment needs (size of streets, parking spaces), delivered/processed food products, etc.

The back wall 3114 may include one or more loading doors that are sized and dimensioned to provide access to a cargo area enclosed within the cargo portion 3108 of the delivery truck. In some implementations, the loading door(s) may be a single door that stretches substantially across (i.e., >50%) the width of the back wall 3114. In such an implementation, the loading door (back wall 3114) may include a single set of hinges that may physically and rotationally couple the loading door to the vehicle, multiple doors, such as a set of double doors, that together stretch substantially across (i.e., >50%) the width of the back wall 2114, or a sliding door that may roll up to the ceiling when opened. The back wall 3114 may also include a personnel door 3118 located within the loading door. The personnel door 3118 may be physically, rotationally coupled to the loading door by a set of one or more hinges. The personnel door 3118 may rotate in the same direction or in the opposite direction as the loading door in which the personnel door 3118 is located. The dimensions, e.g., width and height, of the personnel door 3118 are smaller than the corresponding dimensions of the loading door, for example (<33%) of the width along the back wall 3114. The personnel door 3118 may be set within the loading door relatively closer to one or the other exterior side walls 3116, or the personnel door 3118 may be centered within the loading door relative to the exterior side walls 3116. In some implementations, the loading door 3118 may include one or more additional small doors (not shown) that may be smaller than the personnel door 3118. The small doors may enable consumables (e.g., food products) to be passed from the cargo portion to a person or customer standing outside of the vehicle.

In some scenarios, an exterior surface of one or both of the side walls 3116 may be used to attach a static image, a display monitor 3130, or an electronic paper for informational, advertising, or branding purposes. In case of display monitor 3130 or electronic paper, displayed information 3132 may be context sensitive, that is, it may change depending on context associated with the delivery vehicle such as time, location, temperature, humidity, captured images, and/or captured audio from sensors on the vehicle or at a destination location. Furthermore, the context may be determined based on analyzed and processed sensor data such as a detected language, a detected accent, a number of people in a vicinity of the vehicle, an estimated age of the people in the vicinity of the vehicle, an estimated size of the people in the vicinity of the vehicle, an ethnicity of the people in the vicinity of the vehicle, a gender of the people in the vicinity of the vehicle, a focus of a gaze of one or more people in the vicinity of the vehicle, or a mood of the people in the vicinity of the vehicle. Displayed information 3132 may be pre-loaded to an on-board controller or dynamically changed by the remote controller 3102. In some examples, one or more speakers 3134 may complement the displayed information with audio.

In some examples, the static image, the display monitor 3130, or the electronic paper may be arranged to cover a majority or substantially all of the exterior side walls 3116 and the remaining surfaces of the delivery truck may be generic. That way, by changing the displayed information 3132, a brand identity presented by the delivery truck may be completely changed with minimal effort and time. For example, the delivery truck may be configured to reflect the brand and products of a first business (e.g., a bakery) in the morning. Then, in the afternoon, the brand and products presented on the static image, the display monitor 3130, or the electronic paper may be modified to represent a second business (e.g., a pizza delivery company).

The cargo portion 3108 may be fitted with consumable (e.g., food) preparation equipment to allow preparation of items manually, semi-autonomously, or fully autonomously while the delivery vehicle is en route. One or both of the exterior side walls 3116 may include one or more delivery slots that may be used to deliver a cold, hot, or otherwise prepared consumables, for example a pizza, ready-to-cook food items, regulated consumables, fresh food items, etc. that have been packaged for delivery. The size, dimension, and position of the delivery slots may be based, for example, on the type of consumable item that is to be prepared and delivered.

In some example embodiments, the delivery truck may be used as a delivery hub. For example, the delivery truck may pick up ingredients at a source and drive to a central location for expected deliveries (e.g., a parking lot, a business, etc.). The items may be prepared into finished consumable products (and packaged) ready for delivery by the time the delivery truck arrives at its destination. Once the delivery truck is parked (or in some cases, still en route), completed and packaged consumable products may be provided to human delivery people, airborne or ground-based drones for delivery to end destinations (e.g., homes, businesses, schools, hospitals, etc.). The delivery drones may be manually controlled by a human who is located locally or remotely from the delivery robot, and/or controlled autonomously, for example using location input or coordinate from an on-board GPS or GLONASS positioning system and receiver for from one or more wireless service provider cellular towers. In some implementations, location input and/or positioning may be provided using on-board telemetry to determine position, vision systems coupled with pre-recorded photos of the surrounding environment, peer-to-peer relative positioning with other autonomous or non-autonomous vehicles, and/or triangulation with signals from other autonomous or non-autonomous vehicles. In some implementations involving multiple delivery drones, the delivery drones may make deliveries during overlapping time periods.

In some examples, one or more sensors may be installed on the vehicle, for example, on a top portion 3112 of the cargo portion 3108 or in other locations. The sensors may include image capture devices 3124 such as cameras or similar devices to capture still images or video of surroundings of the vehicle. The sensors may also include other detection devices 3122 such as sensors to detect temperature, humidity, noise, sounds, etc. Data generated by the sensors may be used to determine and change the displayed information 3132 by the on-board controller and/or the remote controller 3102. Sensor data may also include time and/or location.

Figure 31B:
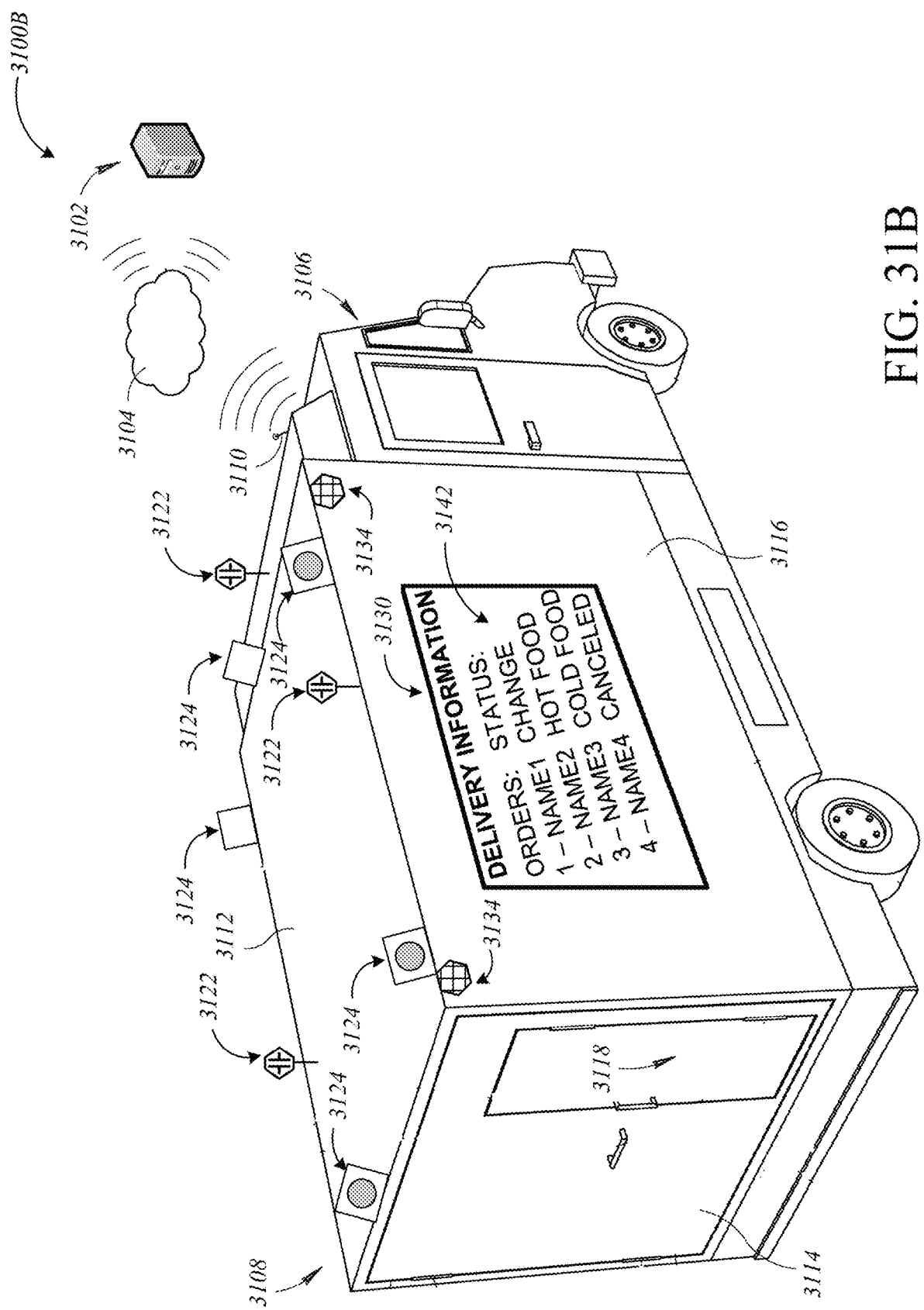
FIG. 31B is an isometric exterior view of a consumable delivery vehicle with a context sensitive display providing information to delivery people at a destination, according to at least one illustrated implementation.

FIG. 31B is an isometric exterior view of a consumable delivery vehicle with a context sensitive display providing information to delivery people at a destination, according to at least one illustrated implementation.

Diagram 3100B shows the delivery vehicle of FIG. 1A with same or similar components and functionality, but the display monitor 3130 presenting final delivery information 3142 as displayed information. In some examples, en route prepared food items or other consumables (e.g., alcohol, tobacco, *cannabis* products, etc.) may be delivered to a requesting person or business by a final delivery person or drone. The final delivery may be in addition to deliveries to customers directly from the vehicle or in place of direct delivery. For example, a delivery truck may park at a parking lot or similar destination and prepared consumables may be picked up from the truck by final delivery people who may deliver the prepared consumables to residences, businesses, schools, hospitals, and other places, and driven by car, truck, van, motorcycle, bicycle, or other forms of transportation including walking.

Whereas the display monitor 3130 may present menus, brand information, and/or advertisements in direct delivery situations (where customers pick up prepared consumables directly from the delivery vehicle), in final delivery configurations, the display monitor 3130 may be used to present information to the final delivery people. The final delivery information 3142 may include, but is not limited to, an order list, order status, delivery instructions, road/traffic conditions, suggested routes, and/or other information useful to the final delivery people. For example, orders ready to be picked up may be ranked based on requested time of delivery, expected duration of final delivery (distance, road/traffic conditions), type of order (hot food, cold food, etc.), grouping of orders (e.g., if the same delivery person is picking up multiple orders to be delivered), etc.

The order status information may inform the final delivery people about whether or not the order has changed, what the expected/requested delivery time is, type of consumable, etc. For example, the displayed information may indicate that an order has been changed to include a hot food item. The added hot food item may change the expected delivery time (faster delivery to avoid cooling the newly added item) and cause the delivery person to bring their insulated food carrier to pick up the order. In another example, an order may include (or may be changed to include) a restricted sale consumable such as alcohol. The displayed information may inform the driver that he/she will need to confirm an age of the recipient before delivering the order. In yet another example, the displayed information may provide up-to-date traffic information and a suggested route to the final delivery location. Providing that information as the final delivery person picks up the order may increase an efficiency of the delivery process allowing the final delivery person to deliver the order quickly to the customer.

Overall, a consumable delivery system with en route preparation and a context sensitive display providing information to final delivery people at a destination of the delivery vehicle may improve and overall efficiency of consumable delivery reducing delivery time and increasing system flexibility, where consumers may order or change their orders up to later times in the process compared to conventional systems. By using a delivery vehicle as the hub, as opposed to fixed (e.g., brick & mortar stores) consumable preparation locations, the system may be further flexible to select the optimal delivery destinations for the final delivery people, reduce stocked ingredient items, and reduce wasted time for preparation and delivery.

Figure 32A:
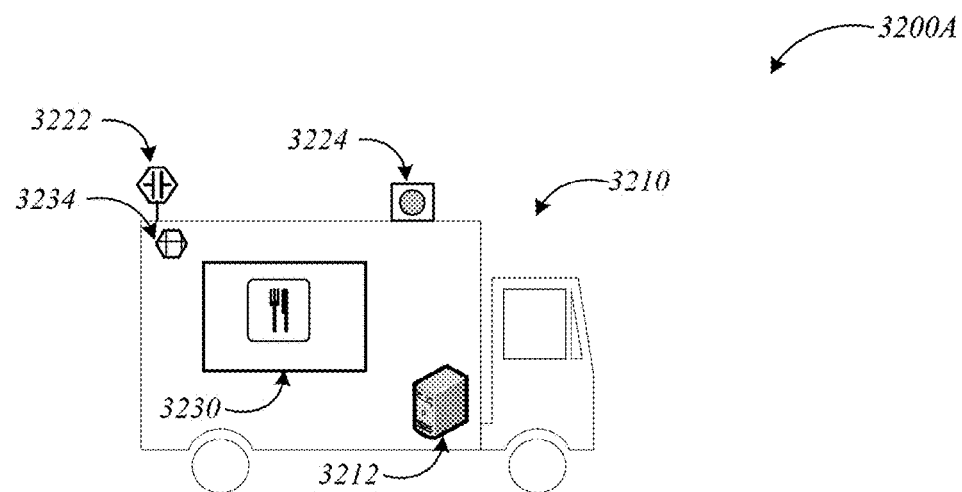
FIG. 32A through 32C illustrate different sensor configurations for a consumable delivery vehicle with context sensitive display, according to at least one illustrated implementation.
Figure 32B:
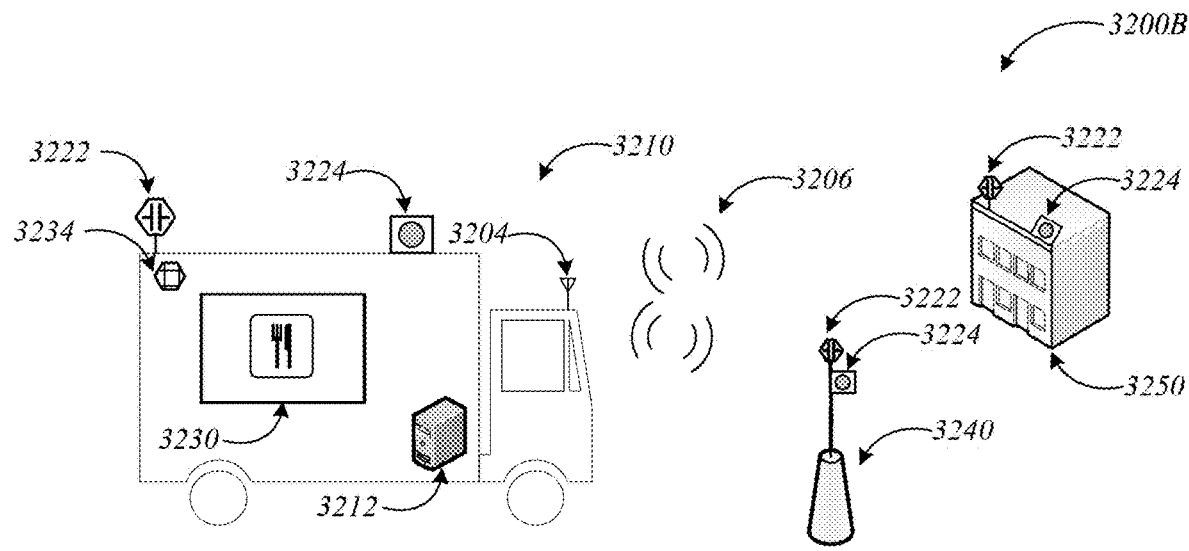
Figure 32C:
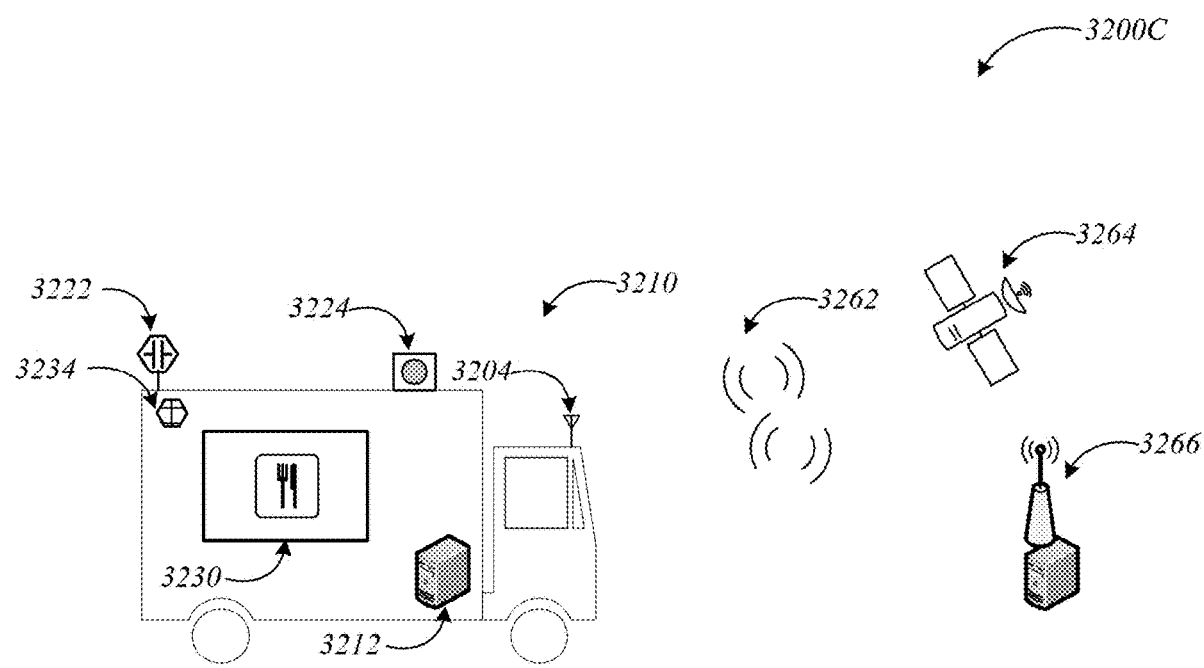

FIG. 32A through 32C illustrate different sensor configurations for a consumable delivery vehicle with context sensitive display, according to at least one illustrated implementation.

Diagram 3200A shows an example consumable delivery vehicle (truck) 3210 with an on-board controller 3212, an exterior display 3230, a speaker 3234, and sensors on the vehicle. The sensors may include an image sensor 3224 and other sensors 3222 representing a range of different sensor devices such as a location sensor, a temperature sensor, a humidity sensor, a wind sensor, a light sensor, or a sound sensor. The sensors may be installed on a top portion of the vehicle 3210, on sidewalls, in the cab portion, on a backwall, or in other locations on or in the vehicle 3210.

Diagram 3200B shows another sensor configuration, where in addition to the on-board sensors, the on-board controller 3212 may communicate wirelessly (3206) through an on-board antenna 3204 with sensors installed in a vicinity of the destination for the delivery vehicle 3210, for example sensors 3222, 3224 installed at a building 3250 or sensors 3222, 3224 installed on a pole 3240 (e.g., a light pole, a special purpose pole, etc.). In some examples, similar sensors may be installed on the vehicle and in other locations. Data from duplicate type sensors may be used to complement collected data and enhance accuracy. In other examples, different types of sensors may be installed at different locations. For example, image, temperature, and/or wind sensors may be located on buildings, whereas audio sensors may be installed on the vehicle.

Diagram 3200C shows yet another sensor configuration, where the on-board controller 3212 may receive some of the sensor data (or data used in determining/changing displayed information) from other devices/systems. For example, time, location, or weather data may be received from satellite systems 3264 or server(s) 3266 via wireless (3262) communication through an on-board antenna 3204.

While specific delivery vehicles and sensors are discussed herein as illustrative examples, embodiments are not limited to those. In addition to trucks, the delivery vehicles may include, containers that may be loaded onto tractor trailer trucks or railroad cars, delivery vans, buses, watercraft, or other similar vehicles. Sensors may include any sensing device to detect an aspect of the environment at a destination location for the vehicle, which may be used to identify factors in determining content to be displayed on display 3230 on the vehicle 3210.

Figure 33:
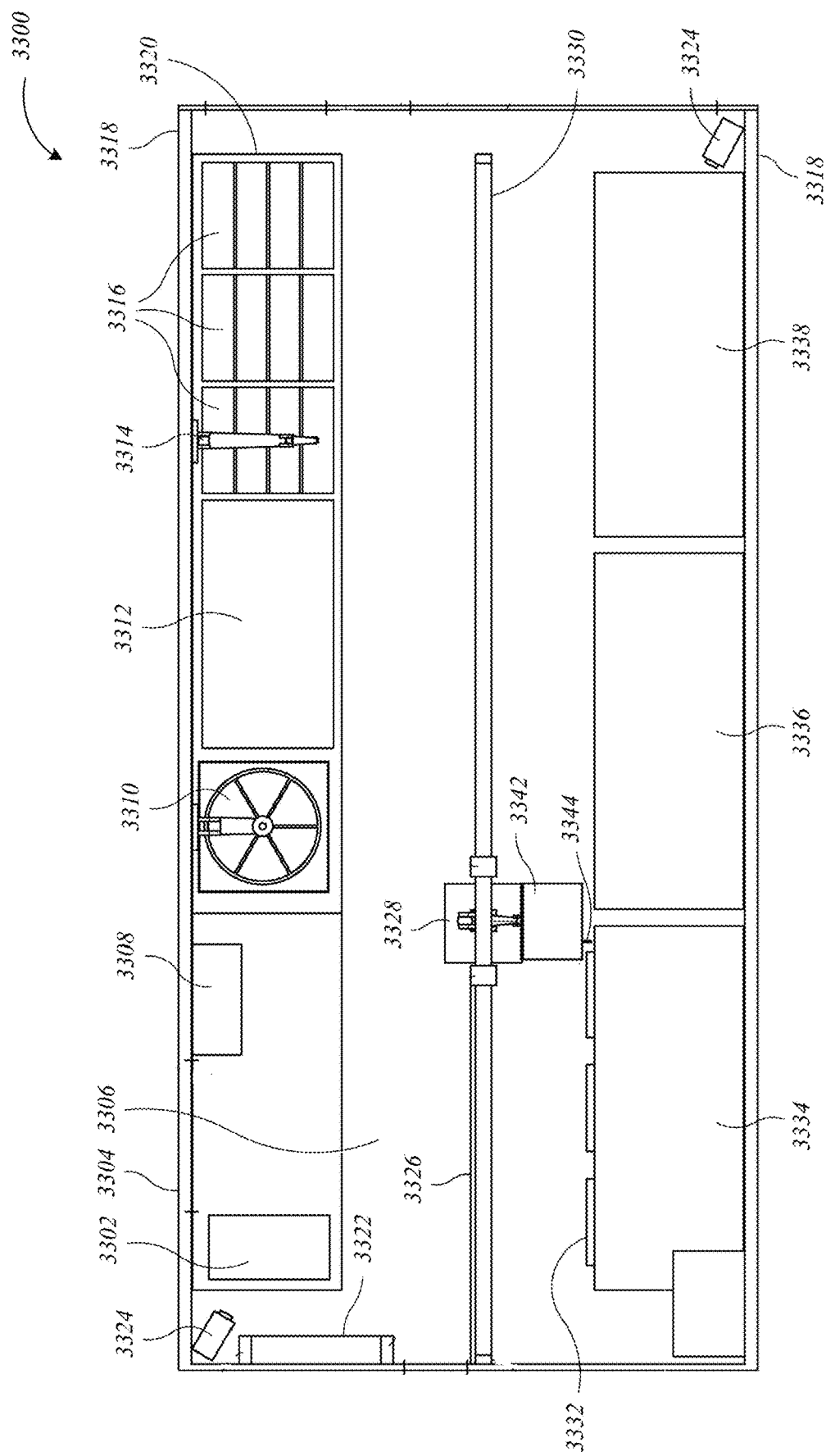
FIG. 33 is a top plan view of a consumable delivery vehicle with various consumable preparation devices and surfaces, according to at least one illustrated implementation.

FIG. 33 is a top plan view of a consumable delivery vehicle with various consumable preparation devices and surfaces, according to at least one illustrated implementation.

Diagram 3300 shows a layout of the cargo area of a vehicle that includes a service window 3322. The cargo area further includes a transfer robot 3328 that is selectively movable on a rail 3330 along the length of the cargo area. The transfer robot 3328 may be operable to place food items into and retrieve items from ovens 3332 in racks 3334. The transfer robot 3328 may be operable to place the food items onto a food conveyor 3312 proximate a dispensing robot 3314. The dispensing robot 3314 may be operable to dispense one or more toppings onto the food item, which may then be conveyed via the conveyor 3312 towards and onto the cutting surface for the cutter 3310. In some implementations, a human operator may be notified to transition the food item onto the cutting surface for the cutter 3310. In other implementations, a robot, such as the transfer robot 3328, may transition the food item onto the cutting surface for the cutter 3310. The cutter 3310 may cut the food item, which may then be placed into a container. In some implementations, the human operator may be notified to place a new food container base onto the cutting surface to receive the food item before the cutter 3310 is activated to cut the food item. The operator may be notified to remove the food container base, and supported food item, to place a top onto the food container base, thereby preparing the food container for delivery to the customer. In further implementations, a non-food dispenser 3308 may be located proximate the cutter 3310, such as, for example, between the cutter 3310 and the service window 3322. The non-food dispenser 3308 may dispense one or more non-food items (e.g., utensils or napkins) into or onto the container before the container is provided to the operator or delivered to a customer. In some implementations, the non-food dispenser 3308 may include a printer that may be used to adhere one or more labels to the container identifying information relevant to the enclosed order (e.g., food item, recipient, address and/or delivery destination, time order placed, time food item prepared). In some cases, dispensing, transfer, conveyance of food items may be adjusted based on determined travel and environmental information (estimated measured, etc.). For example, a sealed food conveyor may be used when vehicle vibrations or sway are high based on road conditions. Additionally or alternatively, food item transfer processes and/or equipment may be slowed down to accommodate travel information leading to vehicle conditions at edges of operational parameters (high road tilt, vehicle sway or vibration, etc.). Additionally or alternatively, multifunctional equipment (e.g., a food processor, blender, cooking unit like conventional bread machines) may be selected and used for a food preparation process to reduce food item spillage, spoilage, etc. to accommodate expected or measured travel information.

In some implementations, racks 3336, 3338 may be located on one side of the oven rack 3334, whereas one or more of the toppings holders 3316 (in holding rack 3320), cutter 3310, and dispensing robots 3314, may be located on the opposite side of the rack 3334. As such, the food item may be retrieved from the rack 3336 or 3338 to be loaded via a first door to the oven 3332, and then ejected and/or retrieved from the second side of the oven to be transferred to a food preparation and/or packaging device. In some implementations, the cargo area may be used to prepare food items on-demand. Such an implementation may be used, for example, when the vehicle is to be used as a food truck to be positioned on the side of a road or in a parking lot (e.g., a parking lot of a sports stadium on game day) to sell food items to customers. In an on-demand situation, the cargo area may include one or more racks 3336, 3338 and a service counter 3304. The racks 3336, 3338 may be secured to one or more anchor rails and/or retractable bolts located along the interior side wall 3318. The racks 3336, 3338 may be coupled to one or more power outlets, water ports, waste fluid ports, air ports, and/or communications ports located along the interior side wall 3318. The racks 3336, 3338 may include a plurality of slots arranged along multiple columns and rows, each of which may be sized and shaped to hold a partially prepared food item (e.g., a parbaked shell for pizza). In some implementations, one or more of the racks 3336, 3338 may be a refrigerated enclosure such that the partially prepared food items are kept refrigerated to thereby preserve the freshness and extend the shelf-life of the partially prepared food items.

In other implementations, the racks 3336, 3338 may have wheels or casters, to enable the racks 3336, 3338 to be loaded into the cargo area of the vehicle for further processing and dispatch to delivery destinations. The wheels may optionally be driven by one or more electric motors via one or more drive trains. The transfer robot 3328 may be operable to retrieve a partially prepared food item from one of the slots of the racks 3336, 3338 and place the partially prepared food item onto the conveyor 3312 proximate the dispensing robot 3314. The dispensing robot 3314 may be operable to dispense one or more toppings onto the partially prepared food item. The transfer robot 3314 may then retrieve the topped, partially prepared food item from the conveyor 3312 to be placed into one of the ovens 3332 in the rack 3334 to be fully baked. After the item has been fully baked the transfer robot 3328 may retrieve the food item from the oven to be processed as described above. In some instances, an on-board control system and/or a remote control system may track information related to the contents of each oven and/or racks 3336, 3338 that has been loaded into the vehicle. For example, the on-board control system and/or the remote control system may track for each oven and/or slot in the racks 3336, 3338 the type of food item (e.g., parbaked shell, pepperoni pizza, etc.), the size of the food item, and/or the time that the food item was placed in the racks 3336, 3338 or oven 3332.

In some instances, the on-board control system and/or the remote control system may communicate with one or more other systems to determine the overall time that a food item has been placed in the racks 3336, 3338 or oven 3332, including time before the racks 3336, 3338 or oven 3332 was loaded into the vehicle. In some implementations, the on-board control system may not load all of the ovens 3332 with food items for preparation at any one time. Instead, the on-board control system may keep at least some of the ovens 3332 empty to process on-demand orders. In other implementations, at least some of the ovens 3332 may be kept empty in order to process and prepare food items that are different and have different cooking parameters than food items currently being prepared. The on-board control system and/or the remote control system may set a time limit for keeping each food item within the racks 3336, 3338 or oven 3332. If the time limit expires for one of the food items, the on-board control system and/or the remote control system may alert the operator or customer to discard the food item. The on-board control system and/or the remote control system may require that the user provide an input to confirm that the identified food item has been discarded. Such input may include, for example, pressing a switch associated with the oven 3332 containing the food item to be discarded or acknowledging a prompt on a computer screen.

In some implementations, the on-board control system and/or the remote control system may have access to one or more sensors or imagers that may indicate that the operator has removed the identified food item. Such sensors may include, for example, one or more images (e.g., cameras 3324) that may be used to visually confirm that the oven is empty and/or that the food item has been placed in a waste basket. Such sensors may also include sensors on the oven door that can detect when the door to the oven 3332 has been opened. The cargo area may also include an operator area 3306 where an operator can stand during an on-demand operation. The operator area 3306 may be separated from the area used by the transfer robot 3328 by a wall 3326 that runs at least partially along the length of the cargo area. The operator area 3306 may be around the service counter 3304 and proximate the service window 3322. In such a situation, the service counter 3304 may be built into the cargo area 300. In other implementations, the service counter may be selectively movable from the cargo area and may therefore be secured to one or more anchor rails and/or retractable bolts located along the interior side wall 3318. In some implementations, the service counter 3304 may include a sink 3302 or other wash basin that is sized and dimensioned to provide a wash area for an operator in the operator area 3306. The sink may be fluidly coupled to a water tank and a waste fluid tank via one or more water ports and waste fluid ports included along the interior side wall 3318.

Figure 34A:
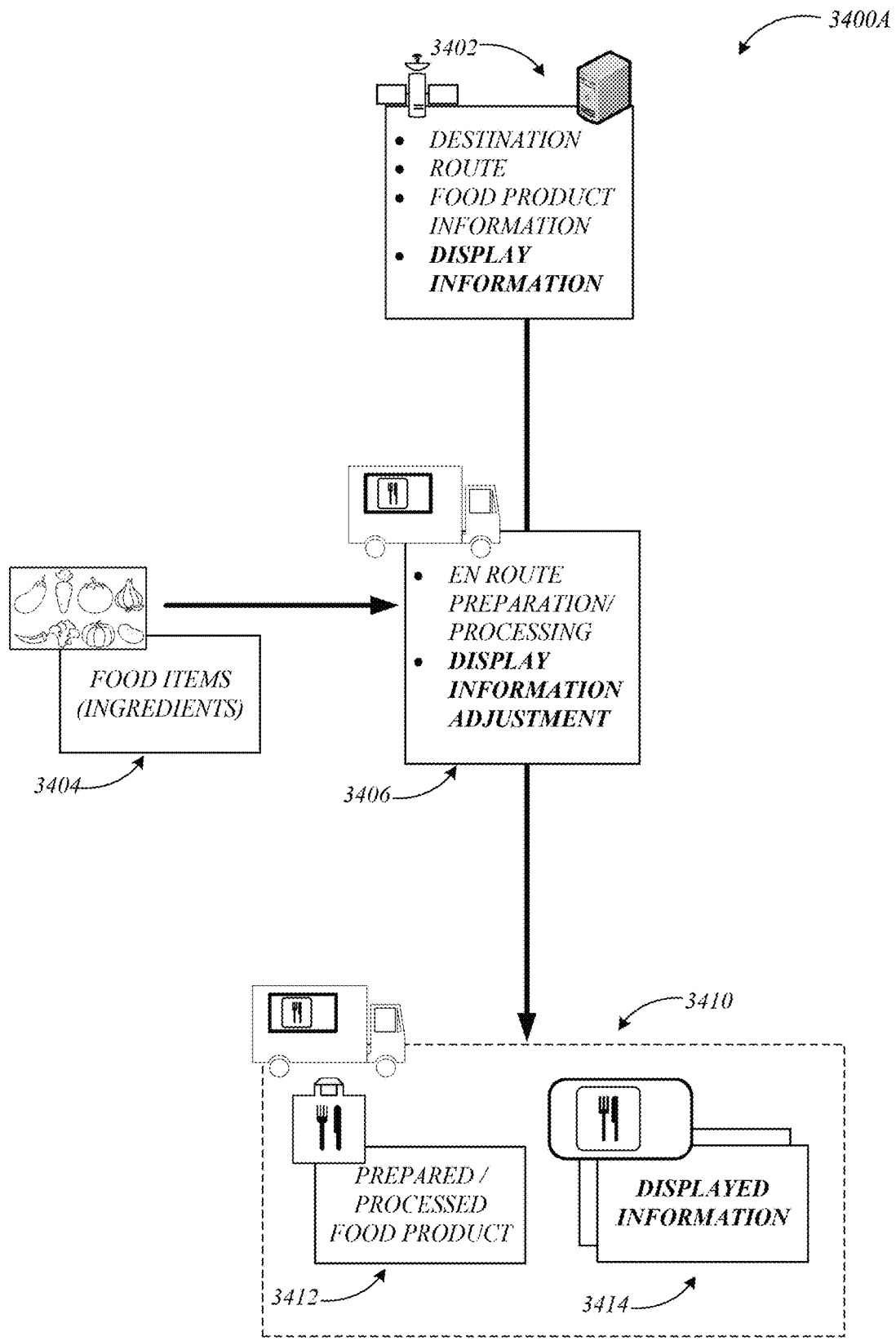
FIG. 34A is a high-level block diagram for an example consumable delivery system with context sensitive display, according to at least one illustrated implementation.

FIG. 34A is a high-level block diagram for an example consumable delivery system with context sensitive display, according to at least one illustrated implementation.

Diagram 3400A shows a remote control system 3402 managing routing, en route preparation, and information display associated with a consumable delivery vehicle. The remote control system 3402 may receive information from the vehicle such as sensor information, location information, etc., process the information, and provide information to an on-board controller of the vehicle 3406 such as destination, route selection, food product (preparation) information, and display information. The vehicle 3406 may receive ingredients 3404 from a source. An on-board controller of the vehicle 3406 may manage operations of the robotic devices to prepare the food items according to timing requirements of the travel route. In some examples, the on-board controller may receive travel information, food item information, and/or food product information from the remote control system 3402. Travel information may include any one or more of one or more delivery destinations, one or more potential routes between delivery destinations, road condition information for the potential routes, traffic condition information for the potential routes, licensing information, vehicle information, and/or weather condition information for the potential routes. The food items information may include source information, quantity information, quality information, and/or type information associated with ingredients for the food product to be prepared. The food product information may include quantity information, quality information, type information, and/or packaging information associated with the food product to be prepared.

The on-board controller may communicate with one or more servers of the remote control system and/or with other resources such as a global positioning system server via wired media such as a wired network or direct-wired connection, or wireless media such as acoustic, radio frequency (RF), microwave, infrared (IR) and other wireless media (e.g., terrestrial based or satellite based). In some cases, a backend system including a number of servers and other general purpose of special purpose devices (e.g., a satellite) communicating over a network may collect the travel information, food item information, and/or food product information, and provide travel and/or food preparation/processing instructions to the on-board controller. In other cases, the on-board controller may receive part or all of the information and generate the instructions itself.

In some examples, food items or ingredients for the food products may be received by the delivery vehicle all at a starting station or at various intermediary waypoints, Similarly, prepared food products may be delivered all to a delivery destination or at some of the intermediary waypoints as well. In other examples, updated traffic information or delivery instructions may be received while en route. For example, the vehicle may be instructed to deliver the prepared food products to a new delivery destination. Upon receiving the updated information, food preparation steps and their timing may be adjusted to ensure the food product(s) is properly prepared timely for arrival at the delivery destination. En route preparation may include a multi-step process, where operational parameters (e.g., temperature for heating or cooling a food item, water pressure for washing a food item, slicing or blending speeds, etc.) and timing of each step may be determined and/or adjusted based on travel route parameters such as road conditions, weather conditions, traffic congestion, expected arrival time, etc. Weather conditions may include one or more temperature, humidity, altitude, winds, wave size, etc. Road conditions may include one or more of road curvatures, road tilt (or expected vehicle tilt), construction, road roughness, etc.

In addition to delivering prepared/processed food products and other consumables to a destination 3410, the vehicle may also include one or more exterior displays to display consumable related information 3414 such as menus, branding information, pricing information, advertisements, etc. In some examples, the displayed information 3414 may be adjusted based on aspects of the environment around the vehicle at the delivery destination. Some aspects of the environment may be detected by sensors on the vehicle or around the vehicle and raw sensor data may be used to determine/adjust the displayed information. For example, time, location, weather conditions (e.g., temperature, humidity, wind), light levels, noise levels, etc. may be used as raw sensor data. In other examples, sensor data may be processed to infer/determine further aspects of the environment and adjust the displayed information. The inferred/computed aspects may include a detected language, a detected accent, a number of people in a vicinity of the vehicle, an estimated age of the people in the vicinity of the vehicle, an estimated size of the people in the vicinity of the vehicle, an ethnicity of the people in the vicinity of the vehicle, a gender of the people in the vicinity of the vehicle, a focus of a gaze of one or more people in the vicinity of the vehicle, and/or a mood of the people in the vicinity of the vehicle.

In one example scenario, image sensors may detect that more than a predefined threshold of the number of people around the vehicle are 4 ft or shorter. The system may infer from this detection that a majority of the people around the vehicle are children. Consequently, children's menus and advertisements may be displayed on the vehicle. In another example scenario, sound detection devices may detect a particular language in a vicinity of the are (for example, Chinese). Hence, the system may infer that the vehicle is at a location where Chinese ethnicity is prevalent or a group of Chinese tourists are in the area. The displayed information may be switched to Chinese foods and/or the language of the displayed menu may be changed attracting more customers. In yet another example scenario, the vehicle may be near a beach. During afternoon hours and further based on detected noise levels, the system may infer that families with children are the majority of the people around the vehicle and display accordingly family menus and advertisements. Once the night arrives, the composition of the crowd may change to a majority younger couples enjoying a romantic stroll along the beach. Detecting the change based on sounds levels, time, and possibly through image capture, the system may change the displayed menus and other information to match the characteristics of the changing crowd.

In a more complex scenario, image sensors may detect not only people in the vicinity and their characteristics (e.g., height, gender, hair color, etc.), people's gazes may be analyzed and people who focus on the vehicle may be detected. The displayed information may be adjusted based on the characteristics of the people whose gaze focuses on the vehicle. For example, if the people focusing on the vehicle are determined to be elderly (based on hair color, facial features, etc.), according menu items may be displayed.

Figure 34B:
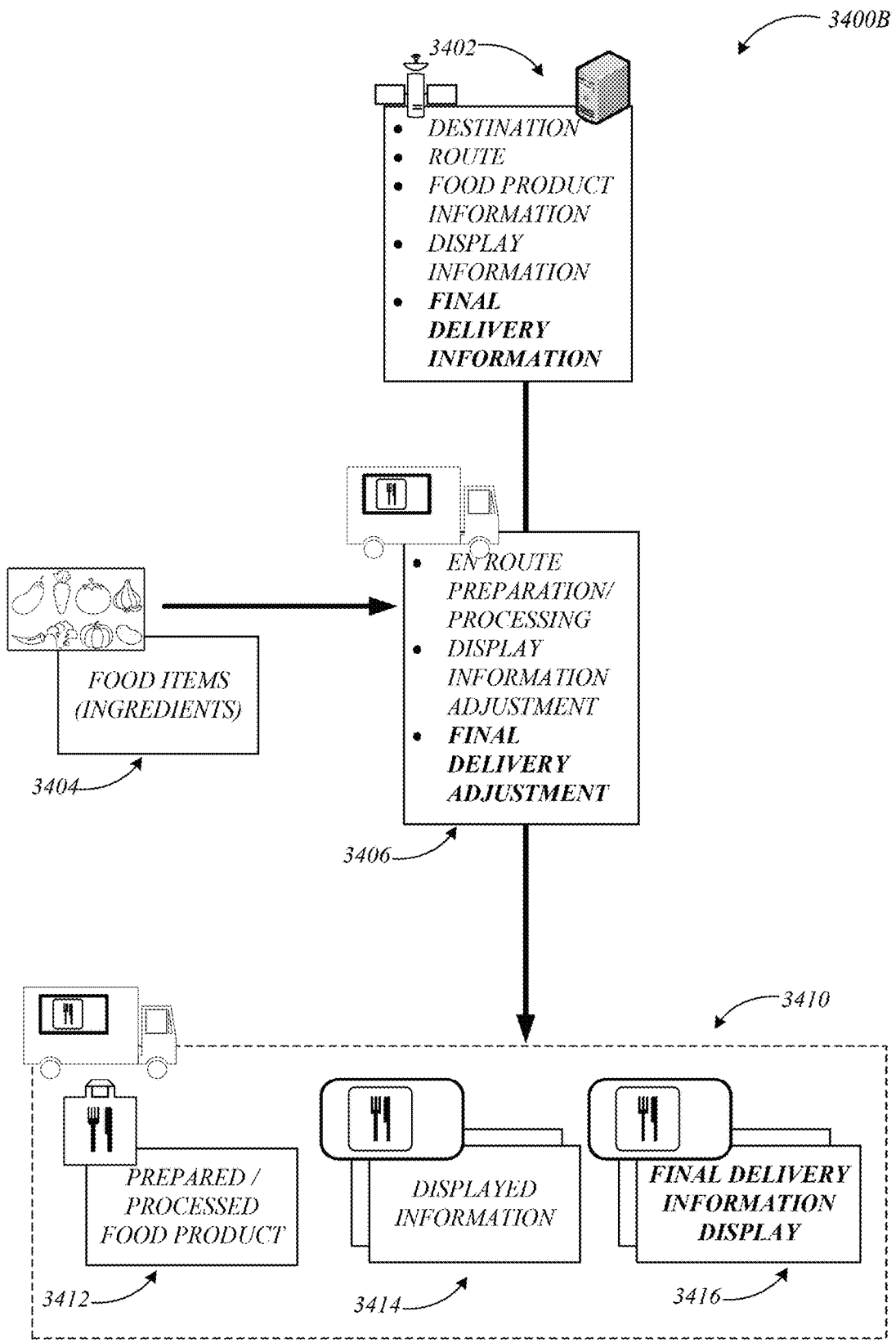
FIG. 34B is a high-level block diagram for an example consumable delivery system with display of information to delivery people at a destination of a consumable delivery vehicle through a context sensitive display, according to at least one illustrated implementation.

FIG. 34B is a high-level block diagram for an example consumable delivery system with display of information to delivery people at a destination of a consumable delivery vehicle through a context sensitive display, according to at least one illustrated implementation.

As in FIG. 34A, diagram 3400B of FIG. 34B shows a remote control system 3402 managing routing, en route preparation, and information display associated with a consumable delivery vehicle. The remote control system 3402 may receive information from the vehicle such as sensor information, location information, etc., process the information, and provide information to an on-board controller of the vehicle 3406 such as destination, route selection, food product (preparation) information, and display information. The vehicle 3406 may receive ingredients 3404 from a source. An on-board controller of the vehicle 3406 may manage operations of the robotic devices to prepare the food items according to timing requirements of the travel route. In some examples, the on-board controller may receive travel information, food item information, and/or food product information from the remote control system 3402. At a destination 3410, the vehicle may deliver prepared/processed food products and other consumables 3412, display information 3414 associated with the delivered consumables, etc.

In some examples, the delivery vehicle 3406 may be used as a delivery hub at the destination 3410 and final deliveries may be made by people and/or drones to residences, businesses, schools, hospitals, and similar locations from the vehicle. In such a scenario, one or more displays on the vehicle may also be configured to display final delivery information 3416 to the final delivery people. In such cases, the remote control system 3402 may collect information associated with the final deliveries (route information, order updates, etc.), process and coordinate with the on-board controller final delivery adjustments, which may be reflected in the displayed final delivery information 3416.

A consumable delivery system as described herein presents a distribution model, where a vehicle with en route preparation capabilities arrives at a destination with completely or semi-prepared food products and other consumables, which may then be provided directly to customers at the vehicle (e.g., through a vending window) and/or delivered to final destinations by drones and/or final delivery people. Also referred to as the "last mile" delivery, the final deliveries may present several challenges including timing, efficient delivery of orders, adjustment of overall preparation and delivery process, etc. To improve an overall efficiency of the delivery system, various steps of the en route preparation, travel timing of the delivery vehicle, selection of the destination for the delivery vehicle (as a hub for final deliveries), route selection for the final deliveries, etc. may be adjusted based on timing and type of orders, road conditions, etc.

In some examples, the final delivery people may be ride-share service drivers. In other examples, the final delivery people may utilize various forms of transportation such as vans, cars, motorcycles, bicycles, and similar ones. By providing up-to-date information and instructions to the final delivery people on one or more displays on the vehicle, the system may reduce wait times and, consequently, delivery times, reduce mistakes, and enhance the final delivery efficiency. For example, the displayed information may let a final delivery person know that the order they are waiting for includes hot items. That way, the final delivery person may have an insulated hot item carrier bag ready avoiding a cooling of the hot food product during final delivery. In another example scenario, multiple orders to be delivered by the same final delivery person may be ranked by the system according to order type and delivery timing. The ranking may be displayed to the final delivery person at the time of picking up the orders. In a further example scenario, some of the orders may include consumables with delivery restrictions such as age, time of day, or location (e.g., alcohol). The displayed final delivery information may inform the final delivery person about the restrictions for the specific orders allowing compliance with regulatory requirements.

Non-limiting examples of final delivery information may include a ranking of orders to be picked up from the vehicle by the final delivery people, line-up instructions for the final delivery people to pick up the plurality of orders, an indication of a type of carrier bag to be used by the final delivery people, or one or more of road condition information, traffic information, or suggested routes for the final deliveries. The vehicle display may also present a status, a type, a price, and/or a delivery restriction for the orders to be delivered. In some cases, information associated with a branding, a menu, a pricing, or an advertisement displayed for direct delivery customers as described in conjunction with FIG. 34A may be displayed on alternative displays on the vehicle at the same time as the final delivery information. In other cases, the two types of information may be displayed in an alternating manner on the same display.

Airborne or land-based drones (robotic transportation devices) may be used to deliver some of the final delivery orders along with or in place of the final delivery people.

Figure 35A:
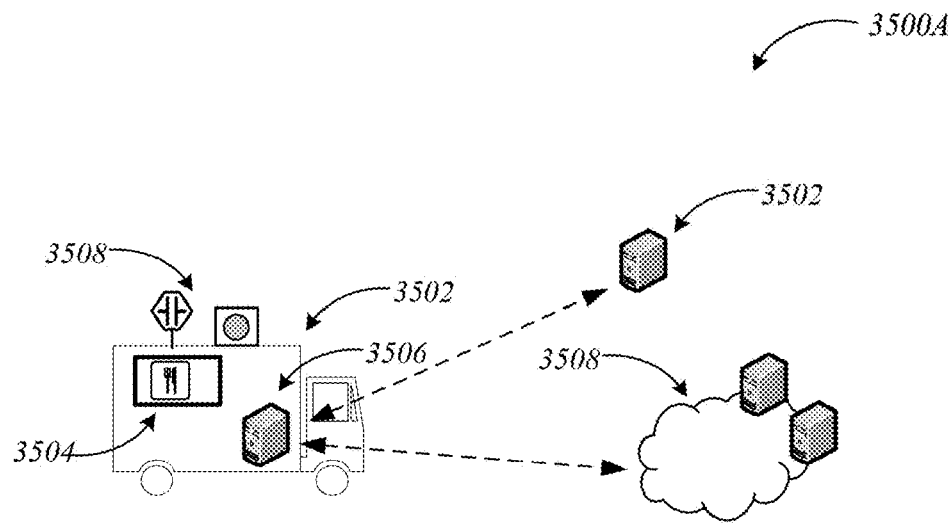
FIGS. 35A and 35B include block diagrams that illustrate different sensor and processing configurations for a consumable delivery vehicle with context sensitive display, according to at least one illustrated implementation.
Figure 35B:
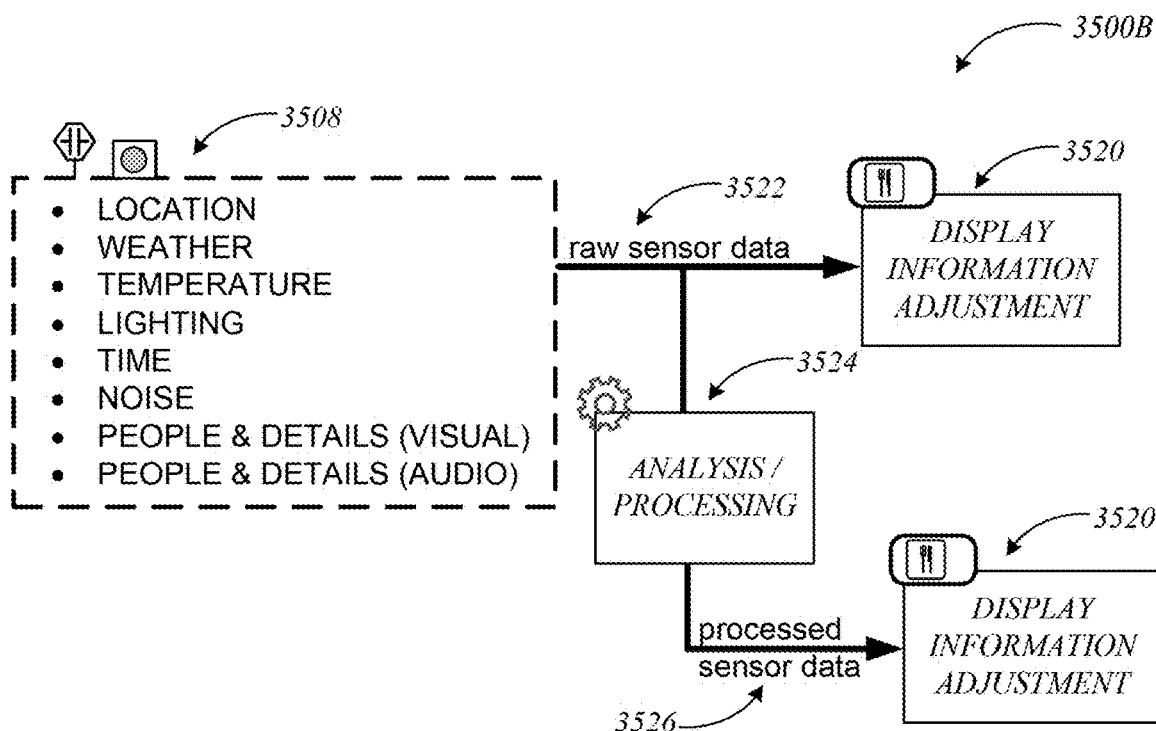

FIGS. 35A and 35B include block diagrams that illustrate different sensor and processing configurations for a consumable delivery vehicle with context sensitive display, according to at least one illustrated implementation.

Diagram 3500A shows a consumable delivery vehicle 3502 with en route preparation and context sensitive display 3504 in multiple processing configurations. According to one example configuration, the vehicle may receive sensor data from sensors 3508, process the sensor data at an on-board controller 3506, and determine/modify the information to be displayed on the context sensitive display 3504.

According to another configuration, the on-board controller 3506 may transmit at least a portion of the sensor data and any other relevant information (e.g., location of the vehicle, food preparation status, etc.) to a remote controller 3512 and receive instructions based on the transmitted information. The on-board controller 3506 may then manage the content displayed on the context sensitive display 3504 based on the received instructions. In some cases, the entire analysis/processing may be performed at the remote controller 3512 and the on-board controller 3506 may issue control signals to the display based on received instructions. In other cases, the on-board controller 3506 and the remote controller 3512 may share portions of the processing and analysis tasks.

In a further configuration, the on-board controller 3506 may communicate with a plurality of servers over a cloud-based system 3514 and receive instructions or share processing tasks with the plurality of servers. In the latter scenario, some of the information such as location, time, weather conditions, road/traffic conditions, etc. may also be provided by some of the servers of the cloud-based system 3514.

The conceptual diagram 3500B shows how sensors 3508 may capture data associated with location, weather, temperature, lighting, time, noise levels, and people (through visual or audio detection). Such raw sensor data 3522, especially data like time, location, temperature, and noise levels may be used directly to determine an adjustment 3520 (selection and/or modification) of the displayed information. In other examples, the raw sensor data 3522 may be analyzed and processed (3524) resulting in processed sensor data 3526. The processed sensor data 3526 may include inferences or more detailed information about the environment around the delivery vehicle. For example, ages, genders, cultural background, etc. of the people around the vehicle may be inferred from visual and audio captures as discussed herein. Time of day or location of the vehicle may be used to infer an expected category of people around the vehicle, thus allowing selection of appropriate content to be displayed on the vehicle display monitor. Various examples of such analyses and inferences are discussed above in conjunction with FIGS. 34A and 34B. The processed sensor data 3526 may also be used to determine an adjustment 3520 (selection and/or modification) of the displayed information.

Figure 36:
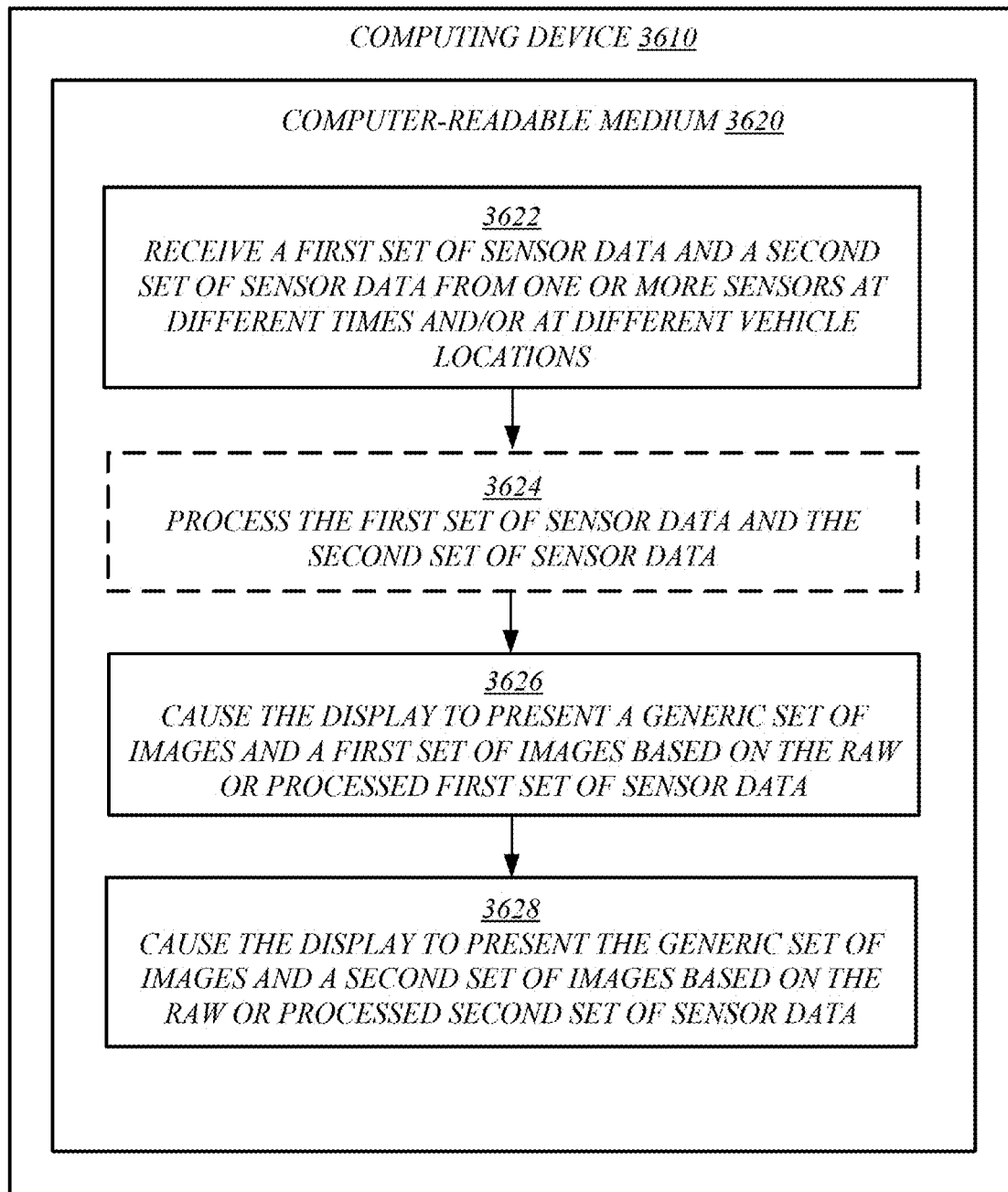
FIG. 36 is a flow diagram for a process of consumable delivery with context sensitive display, according to at least one illustrated implementation.

FIG. 36 is a flow diagram for a process of consumable delivery with context sensitive display, according to at least one illustrated implementation.

Example methods may include one or more operations, functions, or actions as illustrated by one or more of blocks 3622, 3624, 3626, and 3628, which may in some embodiments be performed by a computing device such as the computing device 3610 in FIG. 36 and/or other general purpose and specialized devices communicatively coupled to the computing device 3610. Such operations, functions, or actions in FIG. 36 and in the other figures, in some embodiments, may be combined, eliminated, modified, and/or supplemented with other operations, functions or actions, and need not necessarily be performed in the exact sequence as shown. The operations described in the blocks 3622-3628 may be implemented through execution of computer-executable instructions stored in a computer-readable medium such as a computer-readable medium 3620 of the computing device 3610.

An example process for consumable delivery with context sensitive display may begin with block 3622, "RECEIVE A FIRST SET OF SENSOR DATA AND A SECOND SET OF SENSOR DATA FROM ONE OR MORE SENSORS AT DIFFERENT TIMES AND/OR AT DIFFERENT VEHICLE LOCATIONS", where sensor data associated with time, location, temperature, humidity, captured images, and/or captured audio from sensors on the vehicle or at a destination location for the vehicle may be received at an on-board controller or a remote controller system. The sensors may include a location sensor, a temperature sensor, a humidity sensor, a wind sensor, a light sensor, an image sensor, or a sound sensor.

Block 3622 may be followed by optional block 3624, "PROCESS THE FIRST SET OF SENSOR DATA AND THE SECOND SET OF SENSOR DATA", where the on-board controller and/or the remote controller system may analyze and process the received sensor data. The processed sensor data may include one or more of a detected language, a detected accent, a number of people in a vicinity of the vehicle, an estimated age of the people in the vicinity of the vehicle, an estimated size of the people in the vicinity of the vehicle, an ethnicity of the people in the vicinity of the vehicle, a gender of the people in the vicinity of the vehicle, a focus of a gaze of one or more people in the vicinity of the vehicle, or a mood of the people in the vicinity of the vehicle.

Optional block 3624 may be followed by block 3626, "CAUSE THE DISPLAY TO PRESENT A GENERIC SET OF IMAGES AND A FIRST SET OF IMAGES BASED ON THE RAW OR PROCESSED FIRST SET OF SENSOR DATA", where a display on the vehicle may present images associated with a branding, a menu, a pricing, and/or an advertisement based on the raw or processed first set of sensor data.

Block 3626 may be followed by block 3628, "CAUSE THE DISPLAY TO PRESENT THE GENERIC SET OF IMAGES AND A SECOND SET OF IMAGES BASED ON THE RAW OR PROCESSED SECOND SET OF SENSOR DATA", where the display on the vehicle may present another set of images associated with a different branding, a different menu, a different pricing, and/or a different advertisement based on the raw or processed second set of sensor data. For example, the display may present a children's menu of food items with corresponding prices upon detection of a majority of people around the vehicle being below a height threshold (e.g., 4 ft). After some time, the sensors may detect a change (increase) in the average height of people around the vehicle inferring a majority of the people are now adults. Thus, the display may change the presented content to an adult menu with corresponding prices.

The operations included in the process described above are for illustration purposes. Consumable delivery with context sensitive display may be implemented by similar processes with fewer or additional operations, as well as in different order of operations using the principles described herein. The operations described herein may be executed by one or more processors operated on one or more computing devices, one or more processor cores, and/or specialized processing devices, among other examples.

Figure 37:
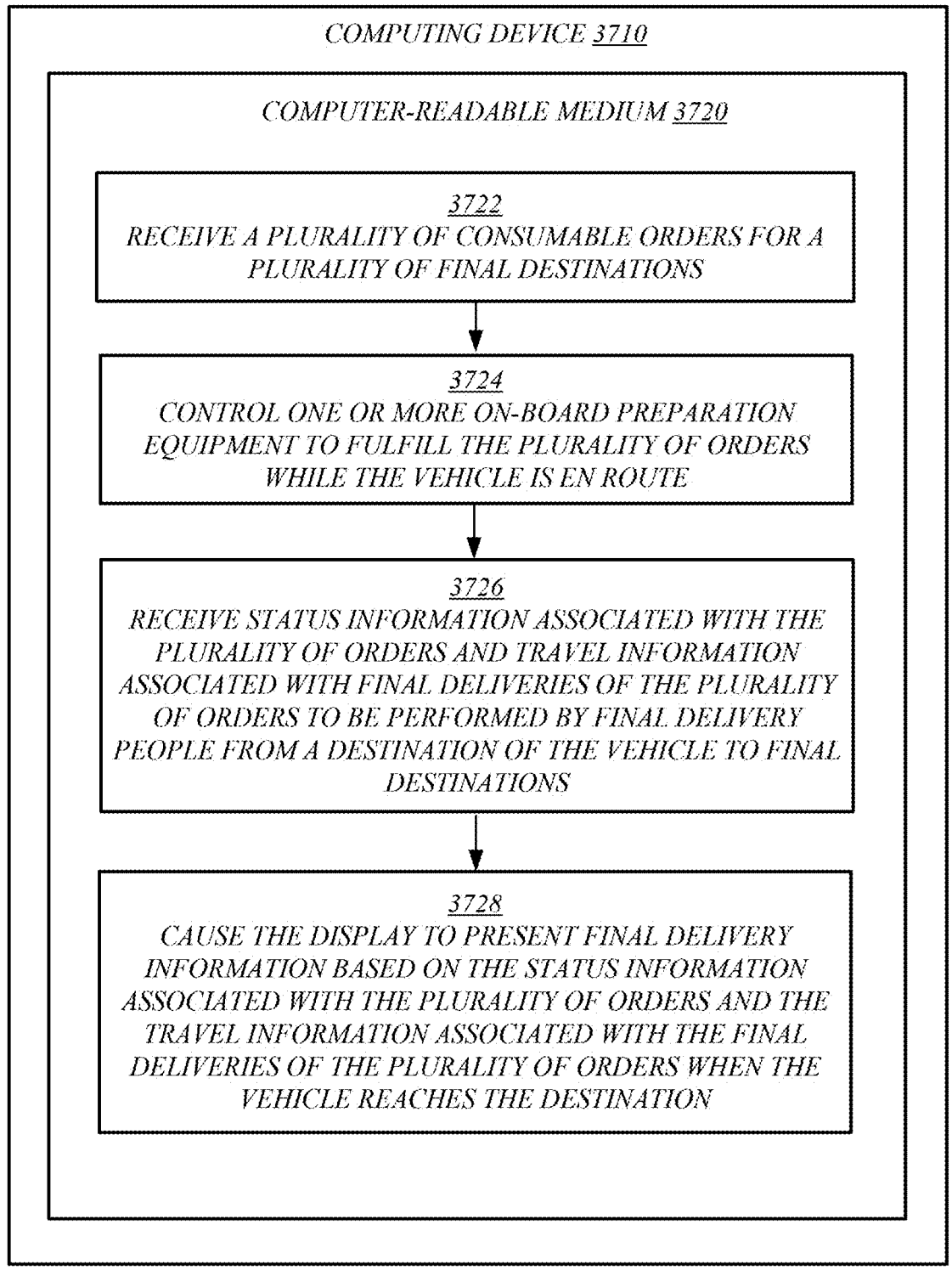
FIG. 37 is a flow diagram for a process of display of information to delivery people at a destination of a consumable delivery vehicle through a context sensitive display, according to at least one illustrated implementation.

FIG. 37 is a flow diagram for a process of display of information to delivery people at a destination of a consumable delivery vehicle through a context sensitive display, according to at least one illustrated implementation.

Example methods may include one or more operations, functions, or actions as illustrated by one or more of blocks 3722, 3724, 3726, and 3728, which may in some embodiments be performed by a computing device such as the computing device 3710 in FIG. 37 and/or other general purpose and specialized devices communicatively coupled to the computing device 3710. Such operations, functions, or actions in FIG. 37 and in the other figures, in some embodiments, may be combined, eliminated, modified, and/or supplemented with other operations, functions or actions, and need not necessarily be performed in the exact sequence as shown. The operations described in the blocks 3722-3728 may be implemented through execution of computer-executable instructions stored in a computer-readable medium such as a computer-readable medium 3720 of the computing device 3710.

An example process for display of information to delivery people at a destination of a consumable delivery vehicle through a context sensitive display may begin with block 3722, "RECEIVE A PLURALITY OF CONSUMABLE ORDERS FOR A PLURALITY OF FINAL DESTINATIONS", where orders to be delivered to residences, businesses, schools, hospitals, and similar locations may be received by an on-board controller of a delivery vehicle or a remote control system. The delivery vehicle may be configured to prepare the consumables while en route, then park at a destination and be used as a hub for final delivery people who deliver the prepared consumables from the vehicle to the final destinations. The orders may be for hot food products, cold food products, configurable meal kits, or other consumables such as alcohol, tobacco, or cannabis products.

Block 3722 may be followed by block 3724, "CONTROL ONE OR MORE ON-BOARD PREPARATION EQUIPMENT TO FULFILL THE PLURALITY OF ORDERS WHILE THE VEHICLE IS EN ROUTE", where the on-board controller (directly or based on instructions from the remote control system) may control operations of food preparation equipment to prepare, store, and package the consumables including any hot or cold food products. In some cases, updates to orders may be received while the vehicle is en route, and the on-board controller may manage the preparation equipment to execute the updates. The preparation equipment may be autonomous (robotic), semi-autonomous, or manual. In case of manual equipment, the on-board controller may display instructions for personnel on displays inside the vehicle associated with the use of the equipment.

Block 3724 may be followed by block 3726, "RECEIVE STATUS INFORMATION ASSOCIATED WITH THE PLURALITY OF ORDERS AND TRAVEL INFORMATION ASSOCIATED WITH FINAL DELIVERIES OF THE PLURALITY OF ORDERS TO BE PERFORMED BY FINAL DELIVERY PEOPLE FROM A DESTINATION OF THE VEHICLE TO FINAL DESTINATIONS", where the on-board controller or the remote control system may receive information about (or determine) a status of each received order (e.g., when the order will be completed). In some examples, the controller(s) may also receive travel information such as road conditions, weather conditions, traffic conditions, etc. for the final delivery routes. The information may be used by the controller(s) to determine estimation of arrival times, adjustment of order preparation, estimation of optimal final delivery routes, etc.

Block 3726 may be followed by block 3728, "CAUSE THE DISPLAY TO PRESENT FINAL DELIVERY INFORMATION BASED ON THE STATUS INFORMATION ASSOCIATED WITH THE PLURALITY OF ORDERS AND THE TRAVEL INFORMATION ASSOCIATED WITH THE FINAL DELIVERIES OF THE PLURALITY OF ORDERS WHEN THE VEHICLE REACHES THE DESTINATION", where a display on the delivery vehicle may be used to provide status information, instructions, and other useful information (collectively "final delivery information") to the final delivery people. Based on the received and analyzed order status information and final delivery travel information, the final delivery information may include a status, a type, and/or a price of each of the plurality of orders. The final delivery information may also include a ranking of orders to be picked up from the vehicle by the final delivery people, line-up instructions for the final delivery people to pick up the plurality of orders, an indication of a type of carrier bag to be used by the final delivery people, or one or more of road condition information, traffic information, or suggested routes for the final deliveries.

The operations included in the process described above are for illustration purposes. Display of information to delivery people at a destination of a consumable delivery vehicle through a context sensitive display may be implemented by similar processes with fewer or additional operations, as well as in different order of operations using the principles described herein. The operations described herein may be executed by one or more processors operated on one or more computing devices, one or more processor cores, and/or specialized processing devices, among other examples.

In some instances, a vehicle may be outfitted with suitable equipment and provisions to service two or more sectors, for instance preparing a first type of cuisine at one time and preparing a second, different, type of cuisine at another time type at another time. As described herein, the ability to effortlessly update associated signage enhances the ability to cross between multiple sectors or consumer segments. For example, a first set of signage may be presented for a first type of cuisine at a first time, for instance at a first location, while a second set of signage, different than the first set of signage may be presented for a second type of cuisine at a second time, for instance at a second location, different from the first location. The signage can, for example, include a menu of available items (e.g., food items such as entrees, beverages, appetizers, desserts), prices, ingredients, nutritional information, and/or compliance with dietary restrictions.

An order mix of items vendable by a vehicle may be adjusted based on a context in which the vehicle operates, as represented by contextual information. Additionally or alternatively, signage carried by a vehicle may be adjusted based on a context in which the vehicle operates, as represented by contextual information. Additionally or alternatively, a point-of-sale (POS) system carried by a vehicle may be adjusted based on a context in which the vehicle operates, as represented by contextual information. Contextual information can include any one, more or a combination of: a defined geographic area, a defined temporal specification (e.g., date, day, time), a defined event, a defined event type, or a defined demographic aspect (e.g., total number, speed, dress, age composition, nationality, race, height) of people in a proximity of the vehicle, location of people relative to the vehicle, direction of gaze of people in a proximity of the vehicle, body posture of people in a proximity of the vehicle, and, or weather. For example, a vehicle may be stocked with two or more order mixes, and may travel to a location and vend a first order mix at a first time and a second order mix at a second time, before returning to be restocked. The vehicle may remain at a first location during the first and the second times, or may travel from the first location at the first time to a second location at a second time.

A vehicle may be summarized as including: a body that separates an interior of the vehicle from an exterior of the vehicle, the body having at least one exterior surface; at least one display visible from the exterior of the vehicle; an image-based detection system operable to detect contextual information in a vicinity of the vehicle; and at least one controller communicatively coupled to the image-based detection system, the at least one controller including at least one set of processor circuitry and at least one nontransitory processor-readable medium that stores at least one of processor-executable instructions or data which, when executed by the at least one set of processor circuitry, cause the at least one set of processor circuitry to cause the at least one display to: present a first set of images when the vehicle is in a first defined context as represented by a first set of contextual information, the first set of contextual information including data related to a first focus of a gaze of a person in the vicinity of the vehicle; and present a second set of images when the vehicle is in a second defined context represented by a second set of contextual information, the second set of contextual information including data related to a second focus of a gaze of a person in the vicinity of the vehicle, the second set of images different than the first set of images and the second defined context different from the first defined context.

Each of the first and the second sets of contextual information may include at least one of a defined geographic area, a defined location of an assembly of people, a defined temporal specification, a defined event, and a defined event type. The first focus of a gaze may be different from the second focus of a gaze. The first set of contextual information may further include data related to a first demographic criterion, and the second set of contextual information may further include data related to a second demographic criterion, the first demographic criterion different from the second demographic criterion. The first demographic criterion and the second demographic criterion may include a height of a person in the vicinity of the vehicle. The first demographic criterion and the second demographic criterion may include an age of a person in the vicinity of the vehicle. The first demographic criterion and the second demographic criterion may include a nationality of a person in the vicinity of the vehicle. The first demographic criterion and the second demographic criterion may include an ethnicity of a person in the vicinity of the vehicle. The first demographic criterion and the second demographic criterion may include clothing of a person in the vicinity of the vehicle. The first set of images may include a first set of menu items and the second set of images may include a second set of menu items.

The image-based detection system may include a number of cameras and an image recognition system, the cameras positioned on the vehicle to capture images of an external environment about at least a portion of the exterior of the vehicle, the image recognition system which includes at least one graphics processing unit processor that compares images captured by the cameras to reference images of at least one of a location template, a demographic criterion template, and a gaze direction template. The at least one display may be carried on the exterior surface of the vehicle. The at least one display may include a flexible fabric applied over a portion of the vehicle. The at least one display may include a first display visible from a first side of the vehicle and a second display visible from a second side of the vehicle, the second side of the vehicle opposed across a width of the vehicle from the first side of the vehicle. The at least one display may include any one or more of an light emitting diode (LED) display, an organic light emitting diode (OLED) display, an electronic paper (e-paper, e-ink) display, an electroluminescent display (ELD), or a plasma display panel (PDP) display.

A method of operation in a vehicle may be summarized as, the vehicle comprising at least one display visible from an exterior of the vehicle, the method including: presenting a first set of images by the at least one display when the vehicle is in a first defined context as represented by a first set of contextual information, the first set of contextual information including data related to a first focus of a gaze of a person in a vicinity of the vehicle; and presenting a second set of images by the at least one display when the vehicle is in a second defined context represented by a second set of contextual information, the second set of contextual information including data related to a second focus of a gaze of a person in the vicinity of the vehicle, the second set of images different than the first set of images and the second defined context different from the first defined context.

Each of the first and the second sets of contextual information may include at least one of a defined geographic area, a defined location of an assembly of people, a defined temporal specification, a defined event, and a defined event type. The first focus of a gaze may be different from the second focus of a gaze. The first set of contextual information may further include data related to a first demographic criterion, and the second set of contextual information may further include data related to a second demographic criterion, the first demographic criterion different from the second demographic criterion. The first demographic criterion and the second demographic criterion may include a height of a person in the vicinity of the vehicle. The first demographic criterion and the second demographic criterion may include an age of a person in the vicinity of the vehicle. The first demographic criterion and the second demographic criterion may include a nationality of a person in the vicinity of the vehicle. The first demographic criterion and the second demographic criterion may include an ethnicity of a person in the vicinity of the vehicle. The first demographic criterion and the second demographic criterion may include clothing of a person in the vicinity of the vehicle.

Presenting a first set of images may include presenting a first set of menu items and presenting the second set of images may include presenting a second set of menu items.

The method of operation in a vehicle may further include presenting a generic set of images by the at least one display in addition to the first set of images when the vehicle is in the first defined context and presenting the generic set of images by the at least one display in addition to the second set of images when the vehicle is in the second defined context.

The method of operation in a vehicle may further include autonomously determining when the vehicle is in the first defined context, and presenting the first set of images may be in response to determining that the vehicle is in the first defined context.

The method of operation in a vehicle may further include autonomously determining when the vehicle approaches within a defined threshold of the first defined context, and presenting the first set of images may be in response to determining that the vehicle is approaching within the defined threshold of the first defined context.

Various embodiments of the devices and/or processes via the use of block diagrams, schematics, and examples have been set forth herein. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any computer readable medium for use by or in connection with any computer and/or processor related system or method. In the context of this document, a memory is a computer readable medium that is an electronic, magnetic, optical, or other another physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer readable medium" can be any means that can store, communicate, propagate, or transport the program associated with logic and/or information for use by or in connection with the instruction execution system, apparatus, and/or device. The computer readable medium can be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CDROMs, digital tape, and computer memory; and transmission type media such as digital and analog communication links using TDM or IP based communication links (e.g., packet links).

From the foregoing it will be appreciated that, although specific embodiments have been described herein for purposes of illustration, various modifications may be made without deviating from the spirit and scope of the teachings. Accordingly, the claims are not limited by the disclosed embodiments.

The invention claimed is:

1. A delivery vehicle of consumable goods with en route preparation, the vehicle comprising:
    a body that includes at least one exterior surface;
    a display visible from an exterior of the vehicle;
    one or more sensors; and
    a controller communicatively coupled to the display and the one or more sensors, the controller configured to:
        receive a first set of sensor data and a second set of sensor data from the one or more sensors, the first set of sensor data and the second set of sensor data including first and second physical context data of the delivery vehicle;
        cause the display to present a third set of images and a first set of images based on the first set of sensor data, the first set of images being based on the first physical context data; and
        cause the display to present the third set of images and a second set of images based on the second set of sensor data, the second set of images being based on the second physical context data;
    wherein the first physical context data and the second physical context data comprise demographic information of people in a proximity of the vehicle; and
    wherein the delivery vehicle is configured to prepare the consumable goods based on at least one of the first set of sensor data and the second set of sensor data.

2. The vehicle of claim 1, wherein the first set of sensor data and the second set of sensor data are received at one or more of different times or different vehicle locations.

3. The vehicle of claim 2, wherein the controller is further configured to:
    transmit at least a portion of the first set of sensor data and at least a portion of the second set of sensor data to a remote computing device to be processed;
    receive the portion of the first set of sensor data and the portion of the second set of sensor data from the remote computing device;
    cause the display to present the third set of images and the first set of images based on the processed portion of the first set of sensor data; and cause the display to present the third set of images and the second set of images based on the processed portion of the second set of sensor data.

4. The vehicle of claim 1, wherein the one or more sensors comprise one or more of a location sensor, a temperature sensor, a humidity sensor, a wind sensor, a light sensor, an image sensor, or a sound sensor.

5. The vehicle of claim 1, wherein the controller is further configured to:
receive at least a portion of the first set of sensor data and at least a portion of the second set of sensor data from one or more other sensors at a destination location for the vehicle.

6. The vehicle of claim 1, wherein the controller is further configured to:
receive at least a portion of the first set of sensor data and at least a portion of the second set of sensor data wirelessly from one or more of a remote server, a satellite based system, or a special purpose computing device.

7. The vehicle of claim 1, wherein the first set of images and the second set of images are associated with one or more of a logo, a menu, a pricing, or an advertisement for goods or services.

8. The vehicle of claim 1, wherein the display includes one or more of a light emitting diode (LED) display, an organic light emitting diode (OLED) display, an electronic paper (e-paper, e-ink) display, an electroluminescent display (ELD), or a plasma display panel (PDP) display.

9. The vehicle of claim 1, wherein the delivery vehicle is configured to prepare the consumable goods by combining ingredients collected at a source.

10. A method to display information on a delivery vehicle of consumable goods with en route preparation, the method comprising:
receiving, at a controller, a first set of sensor data and a second set of sensor data from one or more sensors associated with the vehicle, the first set of sensor data and the second set of sensor data including first and second physical context data of the delivery vehicle;
causing, by the controller, a display visible from an exterior of the vehicle to present a third set of images and a first set of images based on the first set of sensor data as the vehicle approaches or is at a delivery destination, the first set of images being based on the first physical context data; and
causing, by the controller, the display visible from the exterior of the vehicle to present the third set of images and a second set of images based on the second set of sensor data as the vehicle approaches or is at the delivery destination, the second set of images being based on the second physical context data;
wherein the first physical context data and the second physical context data comprise demographic information of people in a proximity of the vehicle; and
wherein the consumable goods are prepared in the delivery vehicle based on at least one of the first set of sensor data and the second set of sensor data.

11. The method of claim 10, wherein the first set of sensor data and the second set of sensor data include one or more of time, location, temperature, or humidity.

12. The method of claim 11, wherein processing the first set of sensor data and the second set of sensor data comprises:
transmitting at least a portion of the first set of sensor data and at least a portion of the second set of sensor data to a remote computing device to be processed;
receiving the portion of the first set of sensor data and the portion of the second set of sensor data from the remote computing device;
causing the display to present the third set of images and the first set of images based on the processed portion of the first set of sensor data; and
causing the display to present the third set of images and the second set of images based on the processed portion of the second set of sensor data.

13. The method of claim 10, wherein receiving the first set of sensor data and the second set of sensor data from the one or more sensors associated with the vehicle comprises:
receiving at least a portion of the first set of sensor data and at least a portion of the second set of sensor data from one or more sensors on the vehicle; and
receiving at least another portion of the first set of sensor data and at least another portion of the second set of sensor data from one or more other sensors at the destination location for the vehicle.

14. The method of claim 10, wherein receiving the first set of sensor data and the second set of sensor data from the one or more sensors associated with the vehicle comprises:
receiving at least a portion of the first set of sensor data and at least a portion of the second set of sensor data from one or more sensors on the vehicle; and
receiving at least another portion of the first set of sensor data and at least another portion of the second set of sensor data wirelessly from one or more of a remote server, a satellite based system, or a special purpose computing device.

15. The method of claim 10, wherein causing the display to present the third set of images, the first set of images, and the second set of images comprises:
causing the display to present images associated with one or more of a logo, a menu, a pricing, or an advertisement for goods or services.

16. The method of claim 10, wherein the consumable goods are prepared in the delivery vehicle by combining ingredients collected at a source.

17. A delivery system of consumable goods, the system comprising:
a remote control system configured to manage routing, en route preparation of the consumable goods, and information display of a delivery vehicle of the consumable goods; and
the delivery vehicle comprising:
a body that includes at least one exterior surface, wherein an interior of the vehicle is equipped with one or more preparation devices and one or more preparation surfaces of the consumable goods;
a display visible from an exterior of the vehicle;
one or more sensors;
a communication system wirelessly coupled to the remote control system; and
an on-board controller communicatively coupled to the display, the communication system, and the one or more sensors, the controller configured to:
receive a first set of sensor data and a second set of sensor data from the one or more sensors at one or more of different times or different vehicle locations, the first set of sensor data and the second set of sensor data including first and second physical context data of the delivery vehicle;
transmit the first set of sensor data and the second set of sensor data to the remote control system;
receive instructions from the remote control system;

cause the display to present a third set of images and a first set of images based on a first set of instructions, the first set of instructions being based on the first physical context data; and cause the display to present the third set of images and a second set of images based on a second set of instructions, the second set of instructions being based on the second physical context data;

wherein the first physical context data and the second physical context data comprise demographic information of people in a proximity of the vehicle;

wherein the first set of instructions are generated by the remote control system based on the first set of sensor data and the second set of instructions are generated by the remote control system based on the second set of sensor data; and wherein the delivery vehicle is configured to prepare the consumable goods based on at least one of the first set of sensor data and the second set of sensor data.

18. The system of claim 17, wherein the on-board controller is further configured to:

receive at least a portion of the first set of sensor data and at least a portion of the second set of sensor data from one or more other sensors at a destination location for the vehicle.

19. The system of claim 17, wherein the first set of sensor data and the second set of sensor data include one or more of time, location, temperature, humidity, captured images, or captured audio.

20. The system of claim 17, wherein the remote control system is further configured to:

receive one or more of time, location, or weather data from one or more of a remote server, a satellite based system, or a special purpose computing device; and generate the first set of instructions and the second set of instructions based on the received one or more of time, location, or weather data.

21. The system of claim 17, wherein the first set of images and the second set of images are associated with one or more of a logo, a menu, a pricing, or an advertisement for goods or services.

22. The system of claim 17, wherein the display includes one or more of a light emitting diode (LED) display, an organic light emitting diode (OLED) display, an electronic paper (e-paper, e-ink) display, an electroluminescent display (ELD), or a plasma display panel (PDP) display.

23. The system of claim 17, wherein the delivery vehicle is configured to prepare the consumable goods by combining ingredients collected at a source.

\* \* \* \* \*